United States Patent
de Graaff et al.

(10) Patent No.: US 9,265,377 B2
(45) Date of Patent: *Feb. 23, 2016

(54) COFFEE BEVERAGE SYSTEM, COFFEE BEAN PACKAGING CARTRIDGE FOR USE WITH SAID SYSTEM, METHOD OF PREPARING A BEVERAGE, METHOD FOR BREWING COFFEE, METHOD OF SUPPLYING COFFEE BEANS, CARTRIDGE FOR COFFEE BEAN MATERIAL, METHOD OF SUPPLYING COFFEE BEAN MATERIAL

(75) Inventors: Gerbrand Kristiaan de Graaff, Hillegom (NL); Ivo van Os, Utrecht (NL); Christiaan Johannes Maria Moorman, Moergestel (NL); Joseph Theodoor Knitel, De Meern (NL)

(73) Assignees: Koninklijke Douwe Egberts B.V., Utrecht (NL); Koninklijke Philips Electronics N.V., Eindhoven (NL)

( * ) Notice: Subject to any disclaimer, the term of this patent is extended or adjusted under 35 U.S.C. 154(b) by 45 days.

This patent is subject to a terminal disclaimer.

(21) Appl. No.: 13/587,726

(22) Filed: Aug. 16, 2012

(65) Prior Publication Data

US 2013/0095218 A1     Apr. 18, 2013

Related U.S. Application Data

(63) Continuation of application No. PCT/NL2011/050115, filed on Feb. 17, 2011.

(30) Foreign Application Priority Data

Feb. 17, 2010  (WO) ................ PCT/NL2010/050077
Feb. 22, 2010  (NL) ..................................... 2004274
Aug. 17, 2010  (NL) ..................................... 2005238
Aug. 26, 2010  (NL) ..................................... 2005278
Aug. 26, 2010  (NL) ..................................... 2005280

(51) Int. Cl.
*A47J 31/42*     (2006.01)
*B65B 3/04*      (2006.01)
(Continued)

(52) U.S. Cl.
CPC . *A47J 31/42* (2013.01); *A23F 5/26* (2013.01); *A47J 42/50* (2013.01); *B65B 1/12* (2013.01)

(58) Field of Classification Search
CPC ............. A23F 5/26; A47J 31/42; A47J 42/50; A47J 31/40; B65B 1/12
USPC ............ 99/286, 280, 285; 141/386, 108, 344, 141/67, 311 R, 1; 426/433, 518
See application file for complete search history.

(56) References Cited

U.S. PATENT DOCUMENTS 1,604,058 A * 10/1926 Mager .............................. 99/286
3,981,234 A    9/1976 Nelson et al.
(Continued)

FOREIGN PATENT DOCUMENTS

CN     1413340     4/2003
CN     2684712     3/2005
(Continued)

OTHER PUBLICATIONS

European Patent Office, Annex to Form 2004, Communication pursuant to Rule 71(3) EPC for Application No. 11154896.2, dated Dec. 13, 2013, 2 pages.
(Continued)

*Primary Examiner* — Dana Ross
*Assistant Examiner* — Ket D Dang
(74) *Attorney, Agent, or Firm* — Foley & Lardner LLP

(57) ABSTRACT

Cartridge for holding and supplying coffee bean material. The cartridge includes a housing enclosing an interior volume. The housing has an outlet for releasing the coffee bean material from the interior volume and for supplying the coffee bean material to an external apparatus. The cartridge further includes a conveyor for transporting the coffee bean material towards the outlet. The conveyor include a moveable structure for contacting the coffee bean material. The moveable structure is, at least partly, present in the interior volume. The conveyor further include manually operable actuation component for manually actuating the moveable structure. The manually operable actuation component is, at least partly, provided outside of the interior volume.

188 Claims, 35 Drawing Sheets

(51) Int. Cl.
  *A23L 1/28* (2006.01)
  *A23F 5/26* (2006.01)
  *B65B 1/12* (2006.01)
  *A47J 42/50* (2006.01)

(56) References Cited

U.S. PATENT DOCUMENTS

| | | | |
|---|---|---|---|
| 4,326,114 A | | 4/1982 | Gerling et al. |
| 4,555,984 A | * | 12/1985 | Yamashita ............... 99/286 |
| 4,644,856 A | | 2/1987 | Borgmann |
| 4,843,956 A | | 7/1989 | Lashlee |
| 4,876,953 A | | 10/1989 | Imamura et al. |
| 4,936,515 A | | 6/1990 | Poag |
| 5,094,153 A | | 3/1992 | Helbling |
| 5,217,108 A | | 6/1993 | Newnan |
| 5,241,898 A | | 9/1993 | Newnan |
| 5,267,507 A | * | 12/1993 | Enomoto ............... 99/286 |
| 5,338,409 A | | 8/1994 | Heierli |
| 5,386,944 A | | 2/1995 | Knepler |
| 5,463,934 A | | 11/1995 | Locati |
| 5,632,449 A | | 5/1997 | Sandolo |
| 6,067,894 A | | 5/2000 | Eugster |
| 6,339,985 B1 | * | 1/2002 | Whitney ............... 99/286 |
| 7,013,796 B2 | | 3/2006 | Smit |
| 7,051,646 B2 | | 5/2006 | Della Pietra et al. |
| 8,047,124 B2 | | 11/2011 | Lin |
| 8,382,017 B2 | | 2/2013 | Bich |
| 8,383,180 B2 | | 2/2013 | Vastardis |
| 8,439,235 B2 | | 5/2013 | Mih et al. |
| 8,776,671 B2 | * | 7/2014 | Van Os et al. ............... 99/286 |
| 2002/0092941 A1 | | 7/2002 | Henderson et al. |
| 2002/0129712 A1 | | 9/2002 | Westbrook et al. |
| 2002/0153438 A1 | | 10/2002 | Glucksman et al. |
| 2003/0025012 A1 | | 2/2003 | Lassota |
| 2004/0025703 A1 | | 2/2004 | Ming |
| 2004/0173101 A1 | | 9/2004 | Steckhan |
| 2005/0258287 A1 | | 11/2005 | Rohde |
| 2007/0062378 A1 | | 3/2007 | Glucksman et al. |
| 2007/0137495 A1 | * | 6/2007 | Talbert ............... 99/286 |
| 2007/0295752 A1 | | 12/2007 | Morin et al. |
| 2008/0098901 A1 | * | 5/2008 | Lee ............... 99/286 |
| 2009/0127363 A1 | | 5/2009 | Malykke |
| 2009/0145302 A1 | * | 6/2009 | Dutertre et al. ............... 99/289 R |
| 2009/0165655 A1 | | 7/2009 | Aonuma |
| 2010/0080886 A1 | | 4/2010 | Hourizadeh |
| 2010/0308141 A1 | * | 12/2010 | Bich ............... 241/30 |
| 2013/0095218 A1 | | 4/2013 | De Graaff et al. |
| 2013/0095219 A1 | * | 4/2013 | de Graaff et al. ............... 426/433 |
| 2013/0101717 A1 | * | 4/2013 | de Graaff et al. ............... 426/433 |
| 2013/0115351 A1 | | 5/2013 | Van Os et al. |

FOREIGN PATENT DOCUMENTS

| | | | |
|---|---|---|---|
| CN | 2684713 | 3/2005 | |
| CN | 1830369 | 9/2006 | |
| CN | 201005518 | 1/2008 | |
| DE | 29 26 389 | 1/1981 | |
| DE | 203 00 928 | 5/2004 | |
| DE | 203 00 933 | 5/2004 | |
| DE | 20300 93 3 | 5/2004 | |
| DE | 10 2007 0088 | 8/2008 | |
| DE | 102007008 90 0 | 10/2008 | |
| EP | 0 182 137 | 5/1986 | |
| EP | 0 452 214 | 10/1991 | |
| EP | 0 543 591 | 5/1993 | |
| EP | 0 605 750 A1 | 7/1994 | |
| EP | 0 766 943 | 4/1997 | |
| EP | 0 804 894 | 11/1997 | |
| EP | 1 700 549 | 9/2006 | |
| EP | 2 067 421 | 6/2009 | |
| EP | 2 403 386 | 1/2012 | |
| FR | 2565088 | 12/1985 | |
| GB | 2 447 678 | 9/2008 | |
| JP | 57-194178 | 11/1982 | |
| JP | 07-505328 | 6/1995 | |
| JP | H07-505328 | 6/1995 | |
| JP | 2003-518676 | 6/2003 | |
| WO | WO-94/07401 | 4/1994 | |
| WO | WO-00/27262 | 10/2000 | |
| WO | WO-01/48711 | 7/2001 | |
| WO | WO-2004/023956 | 3/2004 | |
| WO | WO-2009/046771 | 4/2009 | |
| WO | WO 2009046771 A1 * | 4/2009 | ............ A47J 42/02 |
| WO | WO-2010/095937 | 8/2010 | |

OTHER PUBLICATIONS

European Patent Office, Communication of Intention to Grant for European Patent Application No. 11154896.2-1656, dated Dec. 13, 2013, 5 pages.
European Patent Office, Description, Claims, and Drawings for European Patent Application No. 11154896, printed Nov. 15, 2013, 91 pages.
European Search Report for European Application No. 11154887.1, dated Jan. 2, 2012, 8 pages.
International Search Report for PCT/NL2011/050115, mailed Dec. 27, 2011, 6 pages.
International Search Report for PCT/NL2010/050077, mailed Aug. 5, 2010, 6 pages.
English-language machine translation of Abstract, JP-57-194178, Mitsubishi Heavy Ind Ltd (Nov. 29, 1982).
English-language machine translation of Abstract, JP-H07-505328 (Jun. 15, 1995).

* cited by examiner

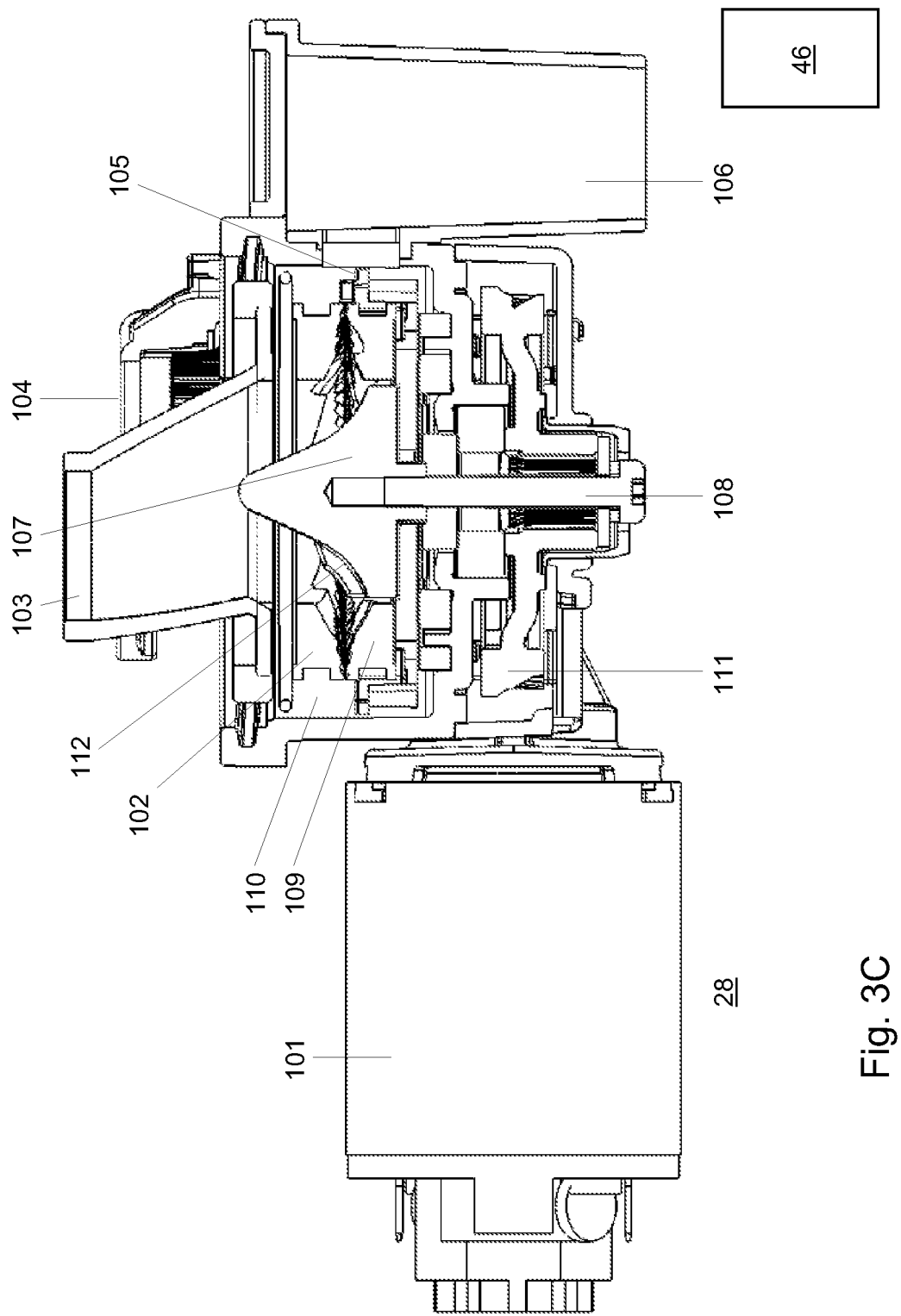

COFFEE BEVERAGE SYSTEM, COFFEE BEAN PACKAGING CARTRIDGE FOR USE WITH SAID SYSTEM, METHOD OF PREPARING A BEVERAGE, METHOD FOR BREWING COFFEE, METHOD OF SUPPLYING COFFEE BEANS, CARTRIDGE FOR COFFEE BEAN MATERIAL, METHOD OF SUPPLYING COFFEE BEAN MATERIAL

CROSS-REFERENCE TO RELATED APPLICATIONS

The present application is a continuation of International Patent Application Serial No. PCT/NL2011/050115 filed on Feb. 17, 2011 which claims priority to International Patent Application Serial No. PCT/NL2010/050077 filed on Feb. 17, 2010 and Netherlands Application Nos. NL2004274 filed on Feb. 22, 2010, NL2005238 filed on Aug. 17, 2010, NL2005278 filed on Aug. 26, 2010, and NL2005280 filed on Aug. 26, 2010—the full disclosures of all applications listed above are hereby incorporated herein by reference in their entireties.

BACKGROUND

The invention relates to a coffee beverage system. In such a known system roasted coffee beans in packaging cartridges can be connected to the coffee brewing apparatus that includes a grinding mechanism.

The present invention is concerned with a system for in a versatile way preparing a coffee beverage that enables the user more control over the supply of coffee bean material. Alternatively it is an object of the invention to at least provide the public with a useful choice in obtaining cartridges for holding and supplying coffee bean material.

Thereto the invention provides a cartridge for holding and supplying coffee bean material, including a housing enclosing an interior volume in which the coffee bean material can be held, the housing having an outlet for releasing the coffee bean material from the interior volume and for supplying the coffee bean material to a hosting external apparatus, wherein the cartridge further includes conveyor means for transporting the coffee bean material towards the outlet, wherein the conveyor means include a moveable structure that is, at least partly, present in the interior volume for contacting the coffee bean material, and wherein the conveyor means further include manually operable actuation means that are, at least partly, provided outside of the interior volume for manually actuating the moveable structure. By means of the manually operable actuation means, the moveable structure can be moved from outside the interior volume. In this way a force can be applied to the coffee bean material, e.g. for forcing the coffee bean material to the outlet. Alternatively a blockage for movement of the coffee bean material by another force, such as gravity, to the outlet can be removed by moving the moveable structure. In these ways, a user can control the supply of coffee bean material to the external apparatus, e.g. a grinder.

The term 'external apparatus' is to be interpreted broadly, and may refer to an apparatus that in use is assembled with the cartridge. However, preferably, the cartridge is removable from the external apparatus. Such removal preferably can be carried out by the user relatively easily, for example within a minute.

Unless stated otherwise, in the description and claims coffee bean material is understood to be burnt/roasted coffee beans. Coffee bean material in the description and claims may be understood to cover also fragmented coffee beans, that is, coffee bean fragments. These coffee bean fragments are still to be ground for extracting a desired coffee beverage. Coffee bean material in the description and claims may be understood to cover also grounded coffee beans that do not necessarily require grinding for extracting a desired coffee beverage. The coffee beans are for instance broken, before they are packaged in the cartridge. In an embodiment, the coffee beans of at least a part of the coffee beans in the cartridge are individually divided into about ten or less, in particular about fifteen or less, more particularly about thirty fragments or less. One coffee bean fragment then comprises for instance one-tenth part, in particular one-fifteenth part, more particularly one-thirtieth part or more of a coffee bean. For instance, the coffee bean fragments comprise at most a half or a quarter of a coffee bean. The fragments may e.g. have mutually similar weights. An advantage of the use of coffee bean fragments compared with whole coffee beans can be that coffee bean fragments can be supplied to the grinder relatively simply. This is because the coffee bean fragments are relatively small and hence can slide relatively easily through in the interior volume of the cartridge and through the external apparatus and/or will block the outlet less easily. As the coffee beans may beforehand have been divided into fragments, though not ground, in the meantime comparatively more coffee bean surface can come into contact with any ambient air than would be case with whole coffee beans. On the other hand, less coffee bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean material may also be understood to include a plurality of fragmented coffee beans, that is, which is still to be ground for preparing the desired coffee beverage.

Compared to the canister proposed by WO 2004/023956, the cartridge shows an additional advantage. The canister proposed by WO 2004/023956 is suitable only for a single serving of coffee beans due to the uncontrolled supply of coffee beans to the grinder, so that the storage compartment of the coffee beans will be emptied completely. The present cartridge however offers the possibility of multiple servings from a single cartridge, because of the better control of supply of the coffee bean material. This may enable for example the supply of more cups of coffee from the same cartridge. It may also be more economical in terms packaging, waste control, and logistics.

In an embodiment, the conveyor means include a rotatable element, such as a rotatable axle, that is at least partly located inside the interior volume. Such a rotatable element offers the possibility to provide a compact structure inside the housing, thus substantially preventing an unnecessary increase of a volume occupied by the cartridge.

In an embodiment, the actuation means are arranged for rotating the rotatable element. Preferably, the actuation means include a crank handle connected to the rotatable element.

In an embodiment, the rotatable element is at least partly formed as a conveyor screw. Preferably, the moveable structure includes a threaded bore through which the conveyor screw is engaged. Such a structure may be compact while at the same time providing the possibility for rather accurate control of the supply of coffee bean material to the outlet.

Preferably, the cartridge includes a blocking element for substantially preventing movement of the moveable structure 18 inside the interior volume 8 in a direction transverse to an axis of rotation of the rotatable element. If the rotatable element is at least partly formed as the conveyor screw, and if the moveable structure includes the threaded bore through which the conveyor screw is engaged, the blocking element may prevent that the moveable structure rotates when the conveyor screw is rotated. The blocking element may be especially useful if the moveable structure and the housing are shaped for allowing movement of the moveable structure with respect to the housing in a direction transverse to the axis of rotation of the rotatable element, e.g. if the housing is substantially cylindrically shaped and an axis of symmetry of the cylinder extends substantially in parallel with the axis of rotation of the rotatable element. The blocking element may e.g. be rigidly attached to an interior side of the housing. The blocking element may e.g. be formed as a ridge that extends along the interior side of the housing, preferably in a direction along which the rotatable element extends. In use the ridge may engage with a notch that may be provided in the moveable structure.

In an embodiment, the moveable structure and the housing are shaped for blocking movement of the moveable structure with respect to the housing in a direction transverse to the axis of rotation of the rotatable element, e.g. if the housing is substantially rectangularly shaped. Then, the blocking element may be omitted.

In an embodiment, the moveable structure is rigidly connected to the rotatable element. As a result, the moveable element in use rotates together with the rotatable element. Preferably, the moveable structure is provided with at least one first aperture, e.g. a plurality of first apertures, for letting the coffee bean material pass there through. Preferably, the cartridge is provided with at least one second aperture, e.g. a plurality of second apertures, that is positioned, in use, above or below the at least one first aperture and that offers entrance to the outlet, wherein, as a result of rotating the rotatable element, the at least one aperture can be aligned with the at least one second aperture. As a result of aligning the at least one aperture with the at least one second aperture, a certain amount of coffee bean material may move, e.g. fall, towards the outlet and out of the interior volume. Thus, by repeatedly aligning the at least one aperture with the at least one second outlet, the supply of coffee bean material can be controlled. Preferably, the at least one second aperture is formed by the outlet. It may thus be clear that, in this or other embodiments, the outlet may comprise a plurality of apertures, e.g. comprising the at least one second aperture. The plurality of apertures that may form the outlet may or may not be mutually interconnected.

In an embodiment, the moveable structure includes a plunger.

Preferably, the cartridge is further provided with a barrier in the interior volume arranged for hindering passage of the coffee bean material towards the outlet. Such a barrier may substantially prevent uncontrolled movement of coffee bean material towards the outlet.

Preferably, the barrier includes a valve for hindering passage of the coffee bean material towards the outlet. Such a valve may substantially prevent uncontrolled movement of coffee bean material towards the outlet. Preferably, the valve includes a flexible element that is deformed when the valve is opened.

In an embodiment, the barrier includes an internal wall spaced apart from, in use, a top part of the housing, wherein the conveyor means are arranged for moving the coffee bean material through a space between the, in use, top part of the housing and the internal wall. The internal wall may, in use, form a barrier for coffee bean material to reach the outlet. By moving the coffee bean material upwards by means of the moveable structure, the coffee bean material may be transported over the internal wall. In this way, the coffee bean material may reach the outlet.

Preferably, the internal wall separates a first part of the interior volume from a second part of the interior volume, wherein the moveable structure is arranged in the first part of the interior volume, and wherein the outlet can be reached via the second part of the interior volume.

In an embodiment, the moveable structure is resiliently attached to the cartridge by means of a resilient member, so that the moveable structure is moveable by means of the actuation means repeatably between a first position and a second position while deforming the resilient member, e.g. from the first position to the second position while deforming the resilient member and vice versa. In use, deformation of the resilient member may e.g. occur during movement from the first position to the second position. During movement back from the second position to the first position, i.e. "vice versa", the deformation of the resilient member may be decreased or may even be completely cancelled. As a result, the resilient member promotes movement of the moveable structure from the second position back to the first position. As a result, a may suffice by applying a force on the actuation means substantially in only one direction. This facilitates relatively easy operation of the actuation means.

Preferably, the cartridge is provided in the interior volume with a passage for the coffee bean material towards the outlet, wherein in the second position the passage is at least partly obstructed or restricted by the moveable structure and in the first position the passage is obstructed or restricted less by the moveable structure than in the second position and optionally is not obstructed or restricted by the moveable structure. However, alternatively, in the first position the passage is at least partly obstructed by the moveable structure and in the second position the passage is obstructed less by the moveable structure than in the first position and optionally is not obstructed by the moveable structure.

Preferably, the first position is located, in use, above or below the second position. Preferably, at least part of the coffee bean material is located, in use, above, or below, the moveable structure. If the first position is located above the second position, and at least part of the coffee bean material is located above the moveable structure, moving the moveable structure repeatedly between the first position to the second position, may result in a shaking motion of the coffee bean material. During movement from the second position to the first position, the coffee bean material may move, in use, upwards, driven by the resiliently deformable member. During movement from the first position to the second position, the coffee bean material may move, in use, downwards, driven by gravity. Such a shaking motion is considered advantageous, as it may promote movement of the coffee bean material through the interior volume towards the first position.

Preferably, the resiliently deformable member is elastically resiliently deformable. The resiliently deformable member may e.g. be a spring. The resiliently deformable member may e.g. comprise an elastic material, such as a rubber material.

In an embodiment, the external apparatus is provided with an external drive member.

In an embodiment, the cartridge is provided with a recess in the housing for receiving the external drive member of the external apparatus. In this way, the cartridge, although being manually operable, can be used in combination with an external apparatus provided with an external drive member. Such an external drive member may be arranged for driving conveyor means of an alternative cartridge.

The recess may e.g. be arranged for coupling the external drive member to the cartridge for driving the conveyor means. As a result, the external drive member may be used for driving the conveyor means. E.g., the external drive member may be used for driving the conveyor means additionally to the possibility to actuate the conveyor means by means of the manually operable actuation means.

Alternatively the recess may e.g. be arranged for preventing mechanical contact between the external drive member and the cartridge. For example, the housing may be closed in the recess. In this way it is enabled that the cartridge may be used in combination with the external apparatus that is provided with the external drive member, while the cartridge can also be used in combination with another external apparatus that is not provided with the external drive member.

In an embodiment, the cartridge is provided in combination with the external apparatus, wherein the external drive member is received in the recess, wherein the recess is dimensioned for preventing mechanical contact between the cartridge and the external drive member.

Preferably, the cartridge is provided in combination with the external apparatus, wherein the conveyor means are positioned for preventing, in use, driving of the conveyor means by means of the external drive member. However, alternatively, the conveyor means may be positioned for establishing, in use, driving of the conveyor means by means of the external drive member of the external apparatus.

In an embodiment, the external apparatus is a grinder for grinding the coffee bean material.

It is a further object of the present invention to provide an improved method for holding and supplying coffee bean material that enables controlling the supply of coffee beans. Alternatively it is an object of the invention to at least provide the public with a useful choice when holding and supplying coffee bean material.

Thereto the invention provides a method of supplying coffee bean material from a cartridge to an external apparatus, including holding the coffee bean material in a housing that encloses an interior volume of the cartridge, and releasing the coffee bean material from the interior volume through an outlet of the housing, wherein the method further includes transporting the coffee bean material by means of conveyor means towards the outlet, wherein transporting the coffee bean material includes contacting the coffee bean material by means of a moveable structure of the conveyor means that is, at least partly, present in the interior volume, the method further including actuating the moveable structure by means of manually operable actuation means of the conveyor means that are, at least partly, provided outside of the interior volume. By actuating the moveable structure by manually applying a force to the actuation means at a position outside the interior volume, a force can be applied to the coffee bean material. As a result, transporting the coffee bean material to the outlet can be established. Alternatively a blockage for movement of the coffee bean material by gravity to the outlet can be removed by actuating the moveable structure. In these ways, a user can control the supply of coffee bean material to the external apparatus, e.g. a grinder.

In an embodiment, the method may be carried out by using a cartridge according to the invention. In this way, one or more advantages related to the cartridge can be realised in practice.

The invention further relates to a coffee beverage system including a first coffee bean packaging cartridge. In particular the invention relates to a system for preparing coffee wherein the first coffee bean packaging cartridge is arranged for holding and supplying multiple servings of coffee beans and wherein the system comprises a grinder for grinding the beans and a brewing device for brewing coffee on the basis of ground coffee obtained by means of the grinder.

It is known to pack roasted coffee beans in containers that can be connected to coffee brewing apparatus that include a grinding mechanism. For such systems to be efficient the containers have often been designed to hold between 1 kg and 3 kg of coffee beans.

The patent application EP 0 804 894 A2 discloses such a coffee dispensing and brewing apparatus that comprises components for dispensing a predetermined amount of coffee to a brew basket, the components including a hopper (container) for holding a supply of coffee beans and an auger device communicating with the hopper for portioning coffee beans in a predetermined amount to a coffee grinder. The apparatus further includes a brew basket holding assembly for releasably holding the brew basket in a region adjacent a passageway to the grinder and a hot water making and delivery system for distributing a predetermined volume of hot water from a hot water holding tank to the region during a brewing cycle. The grinder motor has a right angle power transmission that couples the motor to the grinder with the motor being located below the grinder and adjacent a vertical side of the holding tank. As is clearly shown in the figures of this patent application, the coffee and brewing apparatus is a rather large machine.

A coffee beverage system is known from WO 2010/095937 which discloses a coffee beverage system including a coffee bean packaging cartridge and a coffee brewing apparatus. The coffee beans packaging cartridge includes a container holding coffee beans and transportation means adapted for enabling transportation of the coffee beans towards an exit opening of the cartridge. The coffee brewing apparatus comprises a grinder for grinding the coffee beans from the cartridge and a brewing device for brewing coffee on the basis of ground coffee obtained by means of the grinder. The system is further provided with a metering chamber for receiving coffee beans which are transported with the aid of the transportation means into the metering chamber. In use the metering chamber will hold a predetermined amount of coffee beans. The coffee brewing apparatus is provided with a motor for driving the transportation means so that the dose or amount of coffee beans is determined by the operation of the motor. This dose can be set and delivered by additional means which make the coffee beverage system relatively expensive and complex. So, with this known system a user who is making coffee is not able to easily adjust an amount of beans that is supplied to the grinder assembly during grinding.

Accordingly it is an object of the present invention to propose a system for preparing coffee beverages of the above referred to kind, which may be more compact. In a more general sense it is thereby an object of the invention to overcome or ameliorate at least one of the disadvantages of the prior art. It is also an object of the present invention to provide alternative structures which may be less cumbersome in assembly and operation and which moreover can be made relatively inexpensively.

Accordingly it is another object of the present invention to provide an improved system with a device for holding and supplying coffee beans, which enables controlling the supply of coffee beans in an easy and relatively cheap manner. Alternatively it is an object of the invention to at least provide the public with a useful choice in obtaining coffee bean packaging cartridges for holding and supplying coffee beans.

Unless stated otherwise, in the description and claims coffee beans are understood to be burnt/roasted coffee beans. Coffee beans in the description and claims may be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

To this end according to the invention there is provided a coffee beverage system. The coffee beverage system comprises a first coffee bean packaging cartridge and a coffee brewing apparatus. The first coffee been packaging cartridge is removable connected to the coffee brewing apparatus and it is arranged for holding and supplying multiple servings of coffee beans. It includes a container comprising an interior volume and at least one exit opening defining a coffee bean outlet, the interior volume holding coffee beans and transportation means adapted for enabling transportation of the coffee beans from the interior volume towards the exit opening of the first coffee bean packaging cartridge. The coffee apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder. The system is further provided with a metering chamber for receiving coffee beans which are transported with the aid of the transportation means into the metering chamber. Preferably after being filled the metering chamber will hold a dosed amount of coffee beans. The metering chamber comprises a bottom portion which forms a part of the grinder. The bottom portion is arranged in the coffee apparatus for rotating around an axis extending in a vertical direction. The system is arranged such that upon activation of the grinder the bottom portion is rotating around the vertical axis for transporting the coffee beans from the metering chamber into the grinder and for grinding the coffee beans. The use of a bottom portion of the metering chamber, which is part of the grinder and which rotates for emptying the metering chamber also results in a decreased height of the system compared to the alternative option of providing a separate bottom plate of the metering chamber and a separate grinder.

The system is further provided with a second coffee bean packaging cartridge which is also removably connectable to the coffee brewing apparatus. The second coffee bean packaging cartridge is arranged for being filled with and holding and supplying coffee beans. The second coffee bean packaging cartridge includes a container comprising an interior volume and at least one exit opening defining a coffee bean outlet, the interior volume being arranged for holding coffee beans. The second coffee bean packaging cartridge further has transportation means adapted for enabling transportation of the coffee beans from the interior volume towards the exit opening of the second coffee bean packaging cartridge. The second coffee bean packaging cartridge is adapted to the coffee brewing apparatus so that, if the second coffee bean packaging cartridge is connected to the coffee brewing apparatus, coffee beans which are transported with the aid of the transportation means of the second coffee bean packaging cartridge towards the exit opening of the second coffee bean packaging cartridge can be received by the coffee brewing apparatus via the entrance opening for preparing coffee, wherein the transportation means of the second coffee bean packaging cartridge are configured to be actuated independently from the coffee brewing apparatus.

The metering chamber may be divided in a first chamber portion which is part of the respective cartridge, i.e. either the first or second one which is or has been connected to the brewing apparatus, and a second chamber portion which is part of the coffee brewing apparatus. The division of the metering chamber over the cartridge and the brewing apparatus enables to provide an even more compact coffee beverage system.

In this regard it can be advantageous for emptying the metering chamber that the bottom portion has a conical shape such that the bottom portion extends downwardly in a direction extending perpendicular to and away from the vertical axis.

It is further advantageous for the coffee beverage system according to the invention that the first chamber portion comprises the exit opening and the second chamber portion comprises the entrance opening and that the exit opening extends above the entrance opening. This provides a metering chamber which can be made relatively inexpensive.

The metering chamber may be arranged for receiving a portion of coffee beans corresponding to a dosed amount of coffee beans which is preferably necessary for preparing a single serving of coffee beverage. The transportation means may comprise a part which is movable relative to the metering chamber for effectively transporting the coffee beans towards the metering chamber upon driving of said transportation means. The coffee brewing apparatus may be provided with a motor and a vertically extending drive shaft wherein said drive shaft may be releasable connected with the transportation means of the first coffee bean packaging cartridge for driving and thereby moving the transportation means upon rotation of the drive shaft by means of the motor. The movable part may comprise a bottom and/or a plurality of vanes, which rotates around a further vertical axis upon driving the transportation means.

Furthermore, the transportation means may comprise a downwardly extending bottom wall for transporting the coffee beans towards the metering chamber under the influence of gravity. Alternatively, the transportation means may comprise a downwardly extending bottom wall for transporting the coffee beans towards the metering chamber under the influence of gravity only.

The first chamber portion may be provided with a top wall which limits the volume of the metering chamber in an upwardly vertical direction wherein the bottom portion of the second chamber portion limits the volume of the metering chamber in a downwardly vertical direction.

Alternatively or additionally, the first chamber portion may be provided with an upstanding side wall comprising an inlet opening for entering the coffee beans by means of the transportation means into the metering chamber.

It is further advantageous for the coffee beverage system according to the invention, when the transportation means are arranged for transporting the coffee beans at least in a horizontal direction for transporting the coffee beans into the metering chamber and/or towards the inlet opening of the metering chamber.

The grinder may be positioned centrically with respect to the second chamber portion. It may comprise a conical part lying in the direction of the vertical axis, wherein the conical part rotates around the vertical axis upon driving the grinder. The grinder may be driven by a motor. The drive shaft and the grinder may be driven by different motors.

The coffee brewing apparatus may comprise connection means for the removable connection to the respective coffee bean packaging cartridge. The connection means may comprise a recess at an upper side of the coffee brewing apparatus, the recess being surrounded by a side wall and being configured for receiving a corresponding part protruding from a lower side of the respective coffee bean packaging cartridge. The side wall may protrude from the upper side of the coffee brewing apparatus and be covered by a housing.

According to an embodiment of the present invention, the side wall comprises openings for receiving bayonet elements of the respective coffee bean packaging cartridge. The respective coffee bean packaging cartridge should be inserted into the recess such that the bayonet elements are inserted in the openings and then rotated in order to be connected to the coffee brewing apparatus. The side wall may comprise blocking elements for impeding a further rotation of the respective coffee bean packaging cartridge, when it has reached its final position. In this way, the user can easily and reliably mount the cartridge on the coffee brewing apparatus. Preferably, the coffee bean packaging cartridge should be rotated approximately 50 degrees in order to reach its final position. The connection between the cartridge and the coffee brewing apparatus may be a snap connection.

Furthermore, the recess may comprise rotatable protruding edges at its center, which are fixed at the end of the driving shaft.

The vertical axis around which the bottom portion of the second chamber portion is rotatable may run centrically through the bottom portion of the second chamber portion. The bottom portion may extend downwardly in a direction extending perpendicular to and away from the vertical axis all around the vertical axis.

The respective coffee bean packaging cartridge may comprise closing means for closing the coffee bean outlet when the coffee bean packaging cartridge is not connected to the coffee brewing apparatus. In this way it is avoided that coffee beans fall out of the coffee bean packaging cartridge when it is not connected to the coffee brewing apparatus.

The closing means may be configured for opening the coffee bean outlet when the coffee bean packaging cartridge is connected to the coffee brewing apparatus.

The closing means comprises a closure member at the bottom side of the container comprising the coffee bean outlet and a rotatable closing disk having an opening. In order to connect the respective coffee bean packaging cartridge to the coffee brewing apparatus the opening of the rotatable closing disk may be brought in a position aligned with the coffee bean outlet.

The closure member may comprise a pair of fletching arms and the closure disk comprises a detent, which in the closed position is caught behind the fletching arms.

The exit opening may be associated with a removable sealing element sealing the interior volume prior to activation of the respective cartridge wherein preferably said sealing element prevents gasses to escape from the respective cartridge. The beverage system may comprise means for disrupting and displacing the sealing element, preferably when the cartridge is connected to the brewing apparatus for the first time. The sealing element may be a sealing membrane.

The system may be arranged such that, in use, the grinding device is activated for emptying the metering chamber and for grinding the coffee beans collected and/or held in the metering chamber. The grinding device may be activated longer than is required for emptying or at least substantially completely emptying the metering chamber and for grinding all the coffee beans collected in the metering chamber. In this way, the emptying of the metering chamber is reliably performed. Previous to the emptying of the metering chamber and the grinding of the coffee beans, in a first step the transportation means of the first coffee bean packaging cartridge may be driven for filling the metering chamber with coffee beans. The transportation means may be driven longer than is required for completely filling or at least substantially completely filling the metering chamber with coffee beans. In this way, the dosing of the metering chamber with coffee beans is reliably performed.

The coffee brewing apparatus may be provided with a control device for controlling the first motor and/or the grinder for performing these steps. The control device may control the brewing device wherein the control device may be arranged such that, in use, in a step which follows after that the emptying and grinding step is completed the brewing device is brewing coffee based on the ground coffee and heated water heated by a heating device of the coffee brewing apparatus. The volume of the metering chamber may be such that if it is completely filled with coffee beans the amount of beans corresponds with one dose of coffee beans for preparing a cup of coffee. The one dose of coffee beans may comprise 5-11, preferably 6-8 grams of coffee beans.

According to the invention the coffee bean packaging cartridge can also be designed to be (re)fillable with coffee beans by the consumer. Preferably the coffee bean packaging cartridge is filled with coffee beans and is not designed to be refillable with coffee beans. In that case the cartridge is a packaging for the coffee beans to be sold in a shop.

According to a further embodiment, the system further comprises a sensor arranged for detecting if the respective coffee bean packaging cartridge is connected to the coffee brewing apparatus. The sensor is configured to signal a result of the detection to the controller. The sensor may be a switch, for example a micro switch. The respective coffee bean packaging cartridge comprises a protruding part for activating the switch when it is connected to the coffee brewing apparatus. The protruding part may be located below or above one of the bayonet elements and may activate the switch when the respective coffee bean packaging cartridge reaches its final position. The switch may be located in an opening in the sidewall surrounding the recess at the upper side of the coffee brewing apparatus, the protruding part activating the switch through the opening. The switch may be hidden behind horizontal wall segments in the side wall and the opening may be a slit between the horizontal wall segments, the protruding part fitting in the slit. The control device may be arranged for controlling the first motor and the grinder so that they can be activated only if it has been detected that the respective coffee bean packaging cartridge is present. In this way, it is ensured that the system works with coffee bean packaging cartridges especially designed thereto. These cartridges may be sold by the manufacturer of the system filled with coffee beans of an elevated quality, thereby guaranteeing the end consumer a good flavor coffee beverage.

The system may further comprise an insert piece that is removable connectable to the coffee brewing apparatus in lieu of a respective coffee bean packaging cartridge, preferably in a same or similar way as a respective coffee bean packaging cartridge by using means for connecting the insert piece to the coffee brewing apparatus, which are the same or similar as the means used for connecting a respective coffee bean packaging cartridge to the coffee brewing apparatus. In this case, the insert piece comprises bayonet elements and a protruding part, preferably located below or above one of the bayonet elements, for activating the switch when the insert piece is connected to the coffee brewing apparatus. Since the detection of a connected coffee bean packaging cartridge and the insert piece is executed in the same way, the control device of the coffee brewing apparatus does not see any difference between these two situations. This means that the functionality of the coffee brewing apparatus is also the same.

The purpose of connecting an insert piece to the coffee brewing apparatus may be twofold. It is usable for unlocking the coffee brewing apparatus, so that the motor(s) and the grinder(s) may be activated, also if no coffee bean packaging cartridge is connected thereto. This is useful for service and maintenance.

Alternatively, the insert piece may be used for supplying the coffee brewing apparatus with coffee beans, because the coffee bean packaging cartridges are designed not to be refillable. A favorable embodiment of an insert device for this purpose comprises a cavity having an interior volume and at least one exit opening defining a coffee bean outlet, the interior volume being arranged for receiving coffee beans. The insert piece further comprises closing means for closing the coffee bean outlet when the insert piece is not connected to the coffee brewing apparatus or not connected to the coffee brewing apparatus in its final position. The closing means are configured for opening the coffee bean outlet when the insert piece is connected to the coffee brewing apparatus in its final position. A user fills the cavity with coffee beans when the insert piece is connected to the coffee brewing apparatus in an entry position and then rotates the insert piece to its final position, resulting in the coffee beans to enter the coffee brewing apparatus to be ground.

Preferably the respective coffee bean packaging cartridge is filled with coffee beans. In particular advantageous the respective coffee bean packaging is filled with one dose of coffee beans, however, alternatively the respective coffee bean packaging may be filled with multiple servings of coffee beans.

Advantageously, the system may be arranged such that upon activation of the grinder the bottom portion is rotating around the vertical axis for transporting the dose of coffee beans from the metering chamber into the grinder and for grinding the coffee beans. The bottom part with the conical shape may lie in the direction of the first vertical axis, wherein the conical part rotates around the first vertical axis upon driving the grinder. The grinder may comprise a lower grinding disk extending around the bottom portion and an upper grinding disk extending above the lower grinding disk. The grinder may be rotationally driven by a second motor, resulting in the rotation of the bottom part with the conical shape and the lower grinding disk. Upon driving the bottom portion and lower grinding disk coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

The grinder may be a no contamination grinder, wherein after grinding the coffee beans and supplying the ground coffee to the coffee brewing device, substantially no ground coffee remains. As a result, when a cartridge is replaced by one with a different blend, the coffee of the new blend is not contaminated by the previously used blend.

The second chamber portion may comprise about 100-X % of the volume of the metering chamber and the first chamber portion may comprise about X % of the volume of the metering chamber wherein X is in the range of 2-50, preferably in the range of 5-40, more preferably in the range of 15-30. By placing a larger part of the metering chamber in the brewing apparatus a further decrease in the height of the beverage system may be obtained. This may be an issue, for example in case that the beverage system is to be placed on a kitchen sink under a cupboard.

Since in accordance with the invention the transportation means of the second coffee bean packaging cartridge are configured to be actuated manually, the user is enabled to control the amount of beans that is supplied in an easy way, by manually actuating the transportation means until the desired amount is reached.

In an embodiment the transportation means of the second coffee bean packaging cartridge include a moveable structure that is, at least partly, present in the interior volume for contacting the coffee beans, and wherein the transportation means further include manually operable actuation means that are, at least partly, provided outside of the interior volume for manually actuating the moveable structure. By means of the manually operable actuation means, the moveable structure can be moved from outside the interior volume. In this way a force can be applied to the coffee beans, e.g. for forcing the coffee beans to the outlet. Alternatively a blockage for movement of the coffee beans by another force, such as gravity, to the outlet can be removed by moving the moveable structure. In these ways, a user can control the supply of coffee beans to the coffee brewing apparatus.

In an embodiment the transportation means of the second coffee bean packaging cartridge include a rotatable element, such as a rotatable axle, that is at least partly located inside the interior volume. Such a rotatable element offers the possibility to provide a compact structure inside the container, thus substantially preventing an unnecessary increase of a volume occupied by the first coffee bean packaging cartridge.

In an embodiment the actuation means are arranged for rotating the rotatable element. Preferably the actuation means include a crank handle connected to the rotatable element.

In an embodiment the rotatable element is at least partly formed as a conveyor screw. Preferably the moveable structure includes a threaded bore through which the conveyor screw is engaged. Such a structure may be compact while at the same time providing the possibility for rather accurate control of the supply of coffee bean material to the outlet.

In an embodiment the moveable structure is rigidly connected to the rotatable element, and wherein the moveable structure is provided with at least one first aperture for letting the coffee beans pass there through, wherein the second coffee bean packaging cartridge is provided with at least one second aperture that is positioned, in use, above or below the at least one first aperture and that offers entrance to the outlet, wherein, as a result of rotating the rotatable element, the at least one aperture can be aligned with the at least one second aperture. Preferably the second aperture is formed by the outlet. As a result, the moveable element in use rotates together with the rotatable element. As a result of aligning the at least one aperture with the at least one second aperture, a certain amount of coffee beans may move, e.g. fall, towards the outlet and out of the interior volume. Thus, by repeatedly aligning the at least one aperture with the at least one second outlet, the supply of coffee beans can be controlled. It may thus be clear that, in this or other embodiments, the outlet may comprise a plurality of apertures, e.g. comprising the at least one second aperture. The plurality of apertures that may form the outlet may or may not be mutually interconnected.

In an embodiment the moveable structure includes a plunger.

Preferably the second coffee bean packaging cartridge is further provided with a barrier in the interior volume arranged for hindering passage of the coffee beans towards the outlet. Such a barrier may substantially prevent uncontrolled movement of coffee beans towards the outlet.

Preferably the barrier includes a valve for hindering passage of the coffee beans towards the outlet. Such a valve may substantially prevent uncontrolled movement of coffee beans towards the outlet. Preferably, the valve includes a flexible element that is deformed when the valve is opened.

In an embodiment the barrier includes an internal wall spaced apart from, in use, a top part of the container, wherein the transportation means are arranged for moving the coffee beans through a space between the, in use, top part of the container and the internal wall. The internal wall may, in use, form a barrier for coffee beans to reach the outlet. By moving the coffee beans upwards by means of the moveable structure, the coffee beans may be transported over the internal wall. In this way, the coffee beans may reach the outlet.

Preferably the internal wall separates a first part of the interior volume from a second part of the interior volume, wherein the moveable structure is arranged in the first part of the interior volume, and wherein the outlet can be reached via the second part of the interior volume.

In an embodiment the moveable structure of the second coffee bean packaging cartridge is resiliently attached to the second coffee bean packaging cartridge by means of a resilient member, so that the moveable structure is moveable by means of the manually operable actuation means repeatably between a first position and a second position while deforming the resilient member, e.g. from the first position to the second position while deforming the resilient member and vice versa. In use, deformation of the resilient member may e.g. occur during movement from the first position to the second position. During movement back from the second position to the first position, i.e. "vice versa", the deformation of the resilient member may be decreased or may even be completely cancelled. As a result, the resilient member promotes movement of the moveable structure from the second position back to the first position. As a result, it is sufficient to apply a force on the actuation means substantially in only one direction. This facilitates relatively easy operation of the actuation means.

Preferably the second coffee bean packaging cartridge is provided in the interior volume with a passage for the coffee beans towards the outlet, wherein in the second position the passage is at least partly obstructed by the moveable structure and in the first position the passage is obstructed less by the moveable structure than in the second position and optionally is not obstructed by the moveable structure. However, alternatively, in the first position the passage is at least partly obstructed by the moveable structure and in the second position the passage is obstructed less by the moveable structure than in the first position and optionally is not obstructed by the moveable structure.

Preferably, the first position is located, in use, above or below the second position. Preferably, at least part of the coffee beans is located, in use, above the moveable structure of the second coffee bean packaging cartridge. If the first position is located above the second position, and at least part of the coffee beans is located above the moveable structure, moving the moveable structure repeatedly between the first position to the second position, may result in a shaking motion of the coffee beans. During movement from the second position to the first position, the coffee beans may move, in use, upwards, driven by the resiliently deformable member. During movement from the first position to the second position, the coffee beans may move, in use, downwards, driven by gravity. Such a shaking motion is considered advantageous, as it may promote movement of the coffee beans through the interior volume towards the first position.

In an embodiment, the second bean packaging cartridge is provided with a recess in the container or housing for receiving the drive shaft of the coffee brewing apparatus. In this way, the second bean packaging cartridge, although being manually operable, can be used in combination with a coffee brewing apparatus provided with a drive member, such as a motor. Such a drive shaft may be arranged for driving transportation means of an alternative coffee bean packaging cartridge. Preferably the container is closed in the recess.

Alternatively the recess may e.g. be arranged for preventing mechanical contact between the drive shaft and the cartridge. In this way it is enabled that the cartridge may be used in combination with the brewing apparatus or in addition another external apparatus that is provided with the drive member, while the cartridge can also be used in combination with another external apparatus that is not provided with an external drive member.

Preferably, the transportation means are positioned for preventing, in use, driving of the transportation means by means of the drive shaft of the coffee brewing apparatus.

In an embodiment the second coffee bean packaging cartridge comprises a scooper for holding and supplying the coffee beans, the scooper, when connected to the coffee brewing apparatus, being aligned with the entrance opening thereof, the scooper being configured to work also as transportation means by turning around its axis, thereby emptying the coffee beans into the entrance opening. The dosing of the amount of coffee beans to be supplied to the coffee brewing apparatus is very simple here, it is done by filling the scooper.

Preferably the second coffee bean packaging cartridge comprises a handle for manually turning the scooper.

According to an alternative embodiment the second coffee bean packaging cartridge comprises a hopper for holding the coffee beans. The hopper preferably has an outlet, which is aligned with the entrance opening of the coffee brewing apparatus, when the second coffee bean packaging cartridge is connected thereto. The transportation means advantageously comprise a closure plate, which in a first position at least to a large extent and preferably entirely closes the outlet, thereby hindering passage of the coffee beans towards the entrance opening and in a second position does not obstruct or not substantially obstruct the outlet and wherein the transportation means further include manually operable actuation means for actuating the closure plate from the first to the second position and vice versa. The amount of coffee beans supplied to the coffee brewing apparatus may be dosed by moving the closure plate of the transportation means between the first position, wherein coffee beans are supplied to the coffee brewing apparatus and the second position, wherein this is not the case.

Preferably the closure plate in the second position at least substantially delimits a first part of the interior volume of the hopper from a second part of the interior volume of the hopper, thereby hindering the passage of coffee beans from the first part to the second part. The amount in the second part corresponds to a single dose, which when the closure plate is in the first position, is provided to the coffee brewing apparatus.

Preferably the closure plate forms the first part of a virtual cylinder, the other part of the cylinder being open, wherein the manually operable actuation means are configured for rotating the closure plate to the first and second position, respectively. With each rotation, a dose of coffee beans corresponding to the second part of the interior volume of the hopper is supplied to the coffee brewing apparatus.

At least one of the first and second coffee bean packaging cartridges may comprise a funnel shaped holder for holding the coffee beans and an outlet for releasing the coffee beans from the holder. The outlet is positioned at an upper end of the funnel shaped holder and, when the coffee bean packaging cartridge is connected to the coffee brewing apparatus is aligned with the entrance opening thereof, wherein the transportation means are spiral shaped transportation means and, in use, rotatably actuated for driving the coffee beans out of the funnel shaped holder towards the outlet The amount of coffee beans supplied to the coffee brewing apparatus is in this case dependent on the time period that the spiral shaped conveyor means are rotated with coffee beans in the funnel shaped holder.

Preferably the spiral shaped conveyor means are formed by a spiral shaped trajectory for the coffee beans on the inner wall of the funnel, obtained by a spiral shaped protruding edge on the inner wall. The spiral shaped conveyor means may comprise a non-moving block element, impeding the coffee beans to continue rotating on the inner wall, thereby driving the coffee beans to follow the spiral shaped trajectory upwards towards the outlet. As a result, the coffee beans in the funnel shaped holder are driven steadily and reliably towards the outlet thereof.

According to a still further embodiment, at least one of the first and second coffee bean packaging devices is configured for shaking or vibrating the coffee beans to encourage flow thereof towards an outlet of the coffee bean packaging cartridge for releasing the coffee beans. In this way, an alternative manner of providing the coffee beans to the coffee brewing apparatus is obtained. Preferably the coffee bean packaging cartridge comprises a first module, which is a coffee bean package and a second module, which comprises a motor, the first module being removably connectable to the coffee brewing apparatus and the second module being removably connectable to the first module, when the first module is connected to the coffee brewing apparatus. As a result of this modular structure, the coffee beans of the first module may either be supplied to the coffee brewing apparatus due to the operation of the motor in the second module or, in case that the second module is not connected to the first module, due to operation of the transportation means present in the coffee brewing apparatus.

Still further, wherein the outlet of the coffee bean packaging cartridge is open when it is connected to the coffee brewing apparatus and closed when it is disconnected, and wherein the second module, preferably in a coffee bean refill mode, is connectable to the first module in lieu of the coffee brewing apparatus. Preferably, in the coffee bean refill mode, the second module is connected in a same or similar way to the first module as the coffee brewing apparatus, resulting in the outlet of the first module being open. As a result, the first module, i.e. the coffee bean package, may be refilled with coffee beans in a user friendly way.

According to a further aspect of the invention, a second coffee bean packaging cartridge is provided for use with the inventive system, the second coffee bean packaging cartridge being arranged for holding and supplying coffee beans and including transportation means adapted for enabling transportation of the coffee beans towards an outlet of the second coffee bean packaging cartridge, in particular towards entrance opening of a coffee brewing apparatus when it is connected thereto; the second coffee bean packaging cartridge comprising bayonet elements to be inserted into the openings of the side wall, which protrudes from the upper side of the coffee brewing apparatus, in particular for connecting the second coffee bean packaging cartridge to a coffee brewing apparatus, wherein the transportation means are configured to be actuated independently from the coffee brewing apparatus.

According to a still further aspect of the invention, a coffee bean packaging cartridge is provided for use with the inventive system, said coffee bean packaging cartridge being configured for shaking or vibrating the coffee beans to encourage flow thereof towards an outlet of the coffee bean packaging cartridge for releasing the coffee beans.

According to a still further aspect of the invention, a method of preparing a beverage by means of the inventive coffee beverage system is provided, the method comprising the following steps:

connecting the first coffee bean packaging cartridge to the coffee brewing apparatus, rotating the vertically extending drive shaft with the motor means thereby driving and moving the transportation means of the first coffee bean packaging cartridge for transporting the coffee beans towards the exit opening of the first coffee bean packaging cartridge;

grinding coffee beans which have entered the coffee brewing apparatus via the entrance opening thereof to produce ground coffee;

brewing coffee on the basis of ground coffee;

connecting the second coffee bean packaging cartridge to the coffee brewing apparatus thereof, actuating the transportation means of the second coffee bean cartridge for transporting the coffee beans towards the exit opening of the second coffee bean packaging cartridge independently from the coffee brewing apparatus;

grinding coffee beans which have entered the coffee brewing apparatus via the entrance opening thereof to produce ground coffee;

brewing coffee on the basis of ground coffee.

Preferably the method comprises the following steps: In a filling step the metering chamber may be filled with coffee beans for collecting coffee beans in the metering chamber. The metering chamber may be completely filled with coffee beans or at least substantially completely filled with coffee beans. In an emptying and grinding step the grinding device is activated for emptying the metering chamber and for grinding coffee beans collected in the metering chamber. The grinding device may be activated longer than is required for emptying or at least substantially completely emptying the metering chamber and for grinding all the coffee beans collected in the metering chamber.

The invention also relates to a cartridge of a coffee beverage system further including a coffee brewing apparatus wherein the coffee bean packaging cartridge can be removable connected to the coffee brewing apparatus, the coffee bean packaging cartridge being arranged for holding and supplying multiple servings of coffee beans, the coffee beans packaging cartridge including:

a container comprising an interior volume and at least one exit opening defining a coffee bean outlet, the interior volume holding coffee beans;

transportation means adapted for enabling transportation of the coffee beans from the interior volume towards the exit opening of the cartridge;

wherein the coffee brewing apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder, wherein the system is further provided with a metering chamber for receiving coffee beans which are transported with the aid of the transportation means into the metering chamber. Preferably the metering chamber is divided in a first chamber portion which is part of the cartridge and a second chamber portion which is part of the coffee brewing apparatus. Preferably, when the system is in use the metering chamber will hold a dosed amount of coffee beans. Preferably the transportation means comprise a part which is movable relative to the metering chamber for transporting the coffee beans towards the metering chamber upon driving of said transportation means. After the grinding, the brewing device may be activated for brewing coffee based on the ground coffee and on heated water.

According to a still further aspect of the invention, a method of supplying coffee beans from an inventive second coffee bean packaging cartridge to an external apparatus is provided, the method comprising the following steps:

holding the coffee beans in a container that encloses an interior volume of the second coffee bean packaging cartridge, releasing the coffee beans from the interior volume through the outlet of the container, transporting the coffee beans by means of the transportation means towards the outlet, wherein transporting the coffee beans includes contacting the coffee beans by means of the moveable structure of the transportation means, actuating the moveable structure by means of manually operable actuation means of the transportation means.

Further advantageous aspects of the invention will become clear from the appended description of preferred embodiments.

BRIEF DESCRIPTION OF THE DRAWINGS

The invention will now be described in reference to the accompanying drawings, in which:

FIG. 3C shows a cross sectional view of the grinder used in the coffee brewing apparatus according to FIG. 1;

DESCRIPTION OF EXEMPLARY EMBODIMENTS

Now with reference to FIGS. 1-10 exemplary embodiments of the coffee beverage system according to the invention will be described, and more in particular exemplary embodiments of a first coffee bean packaging cartridge and a coffee brewing apparatus of the inventive coffee beverage system will be described, wherein the first coffee bean packaging cartridge is removably connectable to the coffee brewing apparatus. As will be clear from the description given below the first coffee bean packaging cartridge is arranged for holding and supplying coffee beans.

Figure 1:
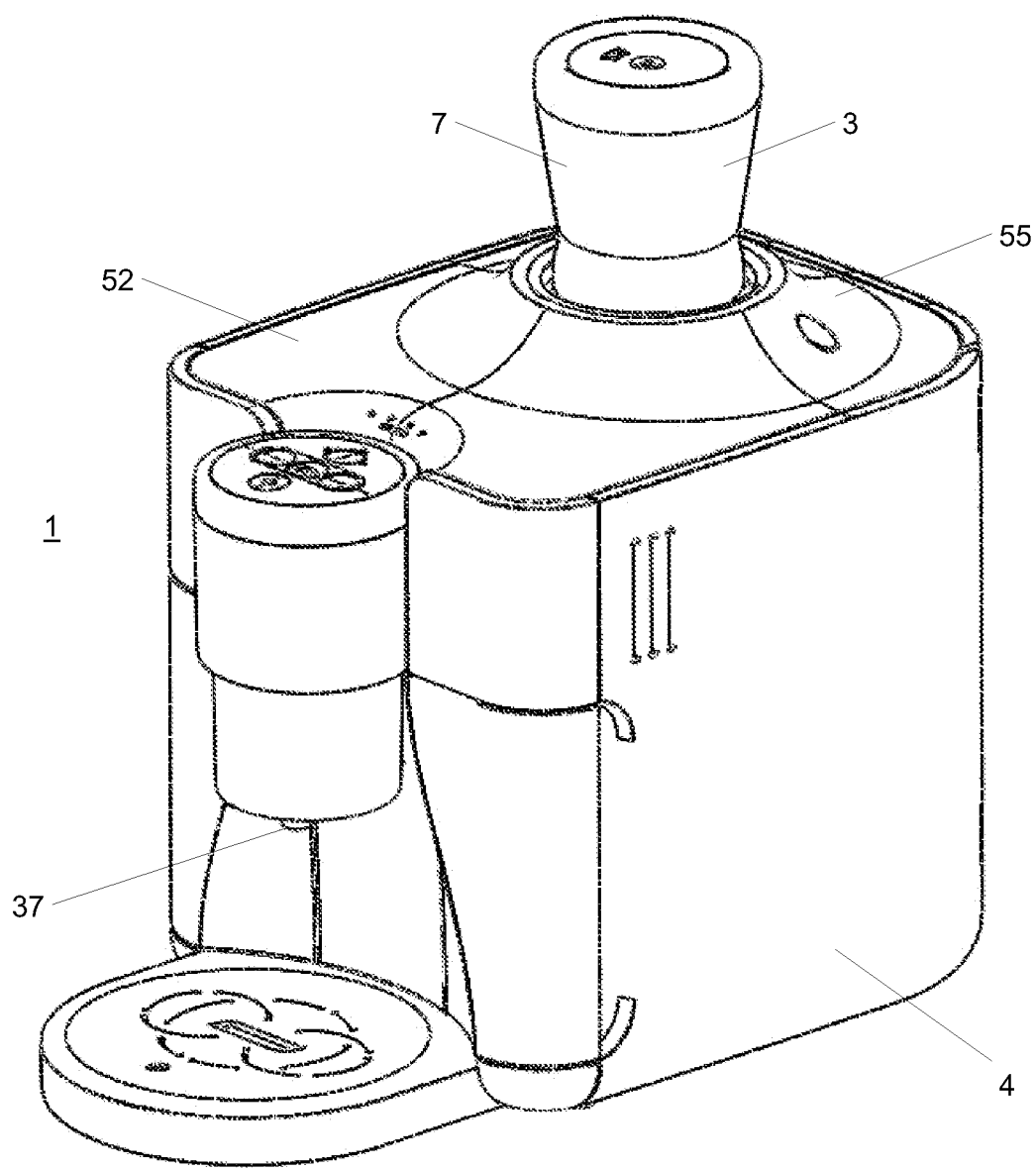
FIG. 1 shows a perspective view of an example of a coffee beverage system with a coffee bean packaging cartridge mounted to the coffee brewing apparatus.
Figure 2:
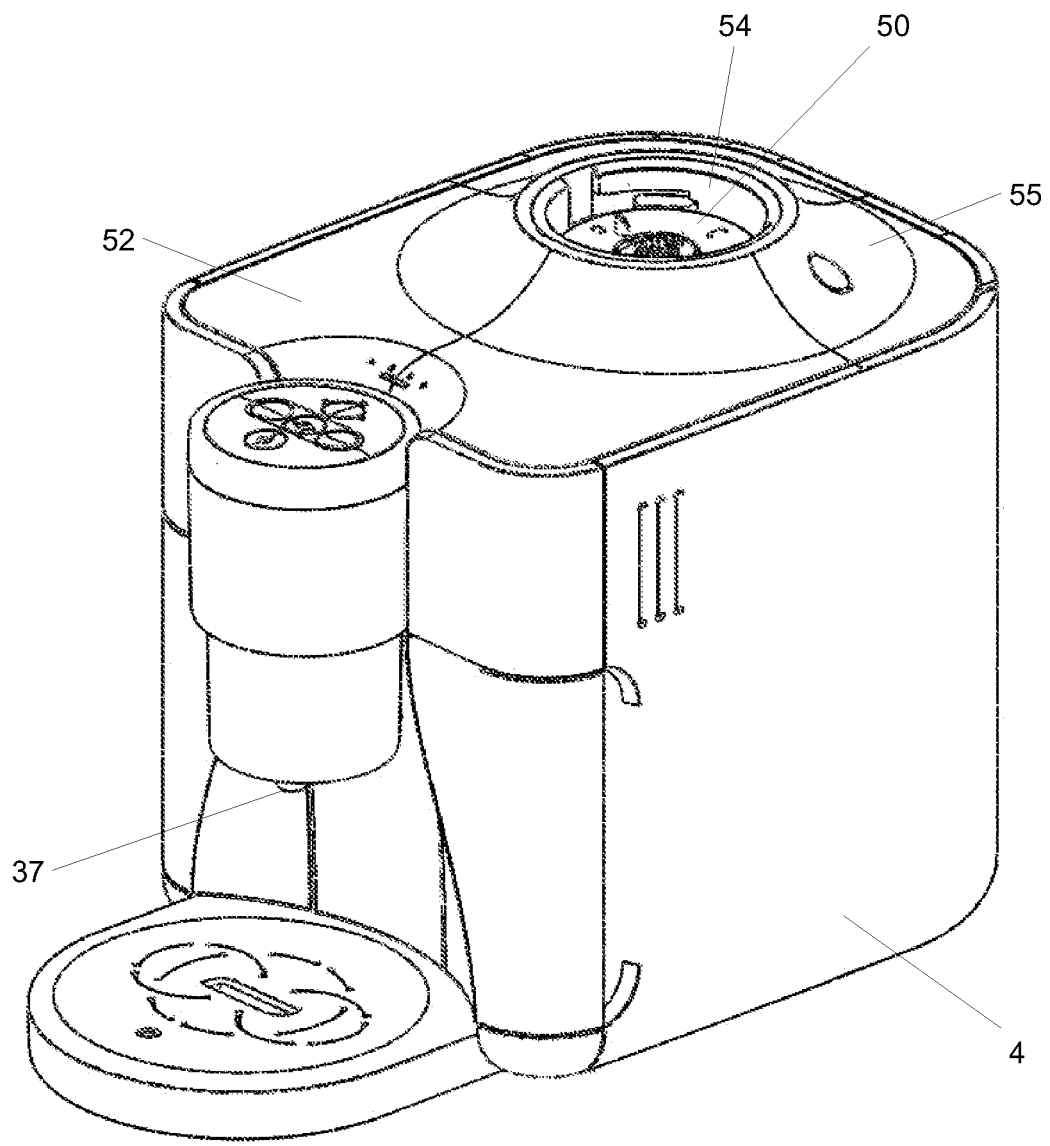
FIG. 2 shows a perspective view of the coffee beverage system without a coffee bean packaging cartridge mounted to the coffee brewing apparatus.

In FIG. 1 a system 1 for preparing coffee beverages is shown. The system 1 includes a first coffee bean packaging cartridge 3 and a coffee brewing apparatus 4. The first coffee bean packaging cartridge 3 is removably connected to the coffee brewing apparatus 4. FIG. 2 shows the coffee brewing apparatus 4 without the first coffee bean packaging cartridge 3 mounted thereon. The first coffee bean packaging cartridge 3 comprises a container 7 comprising an interior volume for containing coffee beans and an exit opening. These coffee beans are roasted and include generally roasted half beans. Preferably the coffee beans packaging cartridge 3 is closed airtight and/or under vacuum before it is placed on the coffee brewing apparatus 4. Also the first coffee bean packaging cartridge 3 can be in the form of a disposable packaging, so that it can be thrown away after it has been emptied.

Figure 3A:
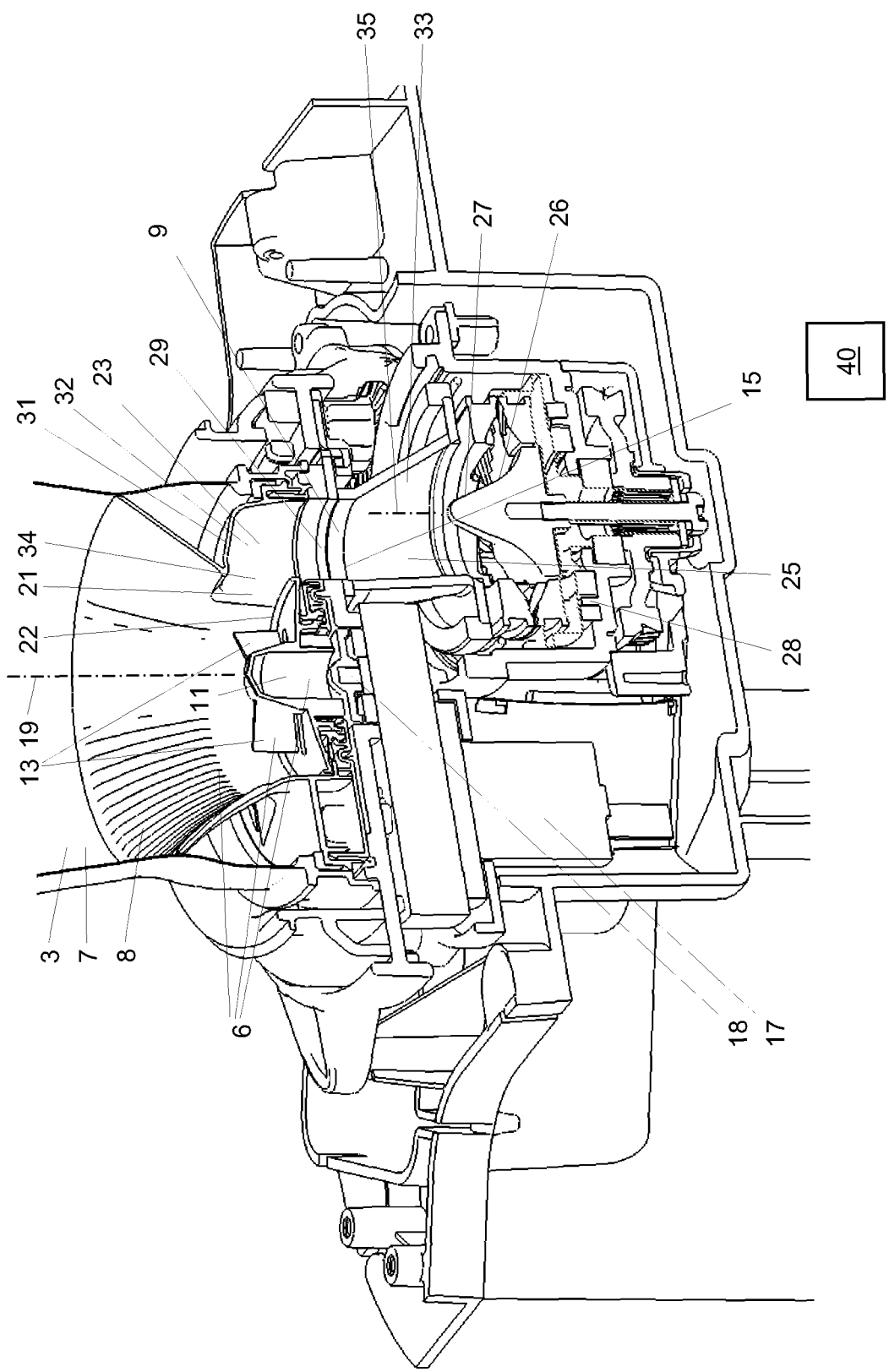
FIG. 3A shows a cross sectional view of a part of the coffee brewing apparatus according to FIG. 1 in perspective.

Referring now to FIG. 3A, the coffee beverage system will be described in more detail. The first coffee bean packaging cartridge 3 comprises transportation or transportation means 6 for enabling transportation of the coffee beans from the interior volume of the container 7 (only partially visible in FIG. 3A) towards the exit opening 29 of the first coffee bean packaging cartridge 3. The coffee brewing apparatus 4 is provided with an entrance opening 9 for receiving coffee beans which are transported by means of the transportation means 6 towards the exit opening 29. The exit opening 29 extends above the coffee bean entrance opening 9 of the coffee brewing apparatus 4.

A lower part of the container 7 comprises a funnel 8 which forms part of the transportation means 6. The beans of the first coffee bean packaging cartridge 3 are guided by means of the funnel 8 towards the exit opening 29 of the first coffee bean packaging cartridge 3. The transportation means 6 further comprise an impellor 11 having several flexible vanes 13. Upon driving the transportation means, in this example by rotating the impellor 11 around a second axis 19 extending in a vertical direction the coffee beans are transported towards the exit opening 29.

The system further comprises a metering chamber 15. The metering chamber is divided in a first chamber portion 23 which is part of the first coffee bean packaging cartridge 3 and a second chamber portion 25 which is part of the coffee brewing apparatus. The first chamber portion 23 is located above the second chamber portion 25. The first chamber portion 23 comprises the exit opening 29 of the first coffee bean packaging cartridge and the second chamber portion 25 comprises the entrance opening 9 of the coffee brewing apparatus 4. The first chamber portion 23 is provided with an upstanding side wall 32 comprising an inlet opening 21 for letting pass coffee beans into the metering chamber 15 which coffee beans are transported by means of the transportations means towards the exit opening 29 of the first coffee bean packaging cartridge 3. The transportation means are thus configured for transporting the coffee beans towards and into the metering chamber 15 of the coffee beverage system 1 upon driving of the transportation means. This driving is performed by means of a first motor 17 of the coffee brewing apparatus, driving a drive shaft 18 of the coffee brewing apparatus extending along the second vertical axis 19. Due to the driving, the impellor 11 and the vanes 13 rotate around the second vertical axis 19. In this way, the coffee beans are driven in a horizontal direction to the inlet opening 21 of the metering chamber 15. The first coffee bean packaging cartridge comprises a small trickle through edge 22 to avoid the uncontrolled entering of coffee beans in the metering chamber 15 when the impeller 11 is not rotating. The metering chamber 15 comprises the first chamber portion 23 in the first coffee bean packaging cartridge 3 and the second chamber portion 25 in the coffee brewing apparatus 4. The bottom 26 of the metering chamber 15 at least comprises a bottom portion 27 which is part of a grinder 28 for grinding coffee beans. The coffee beans leave the fist chamber portion 23 and thereby the first coffee bean packaging cartridge 3 via the exit opening 29 of the cartridge 3 and enter the second chamber portion 25 and thereby the coffee brewing apparatus via the entrance opening 9. The size of the metering chamber is limited by a top wall 31, the bottom 26 and the upstanding side wall 32. The upstanding side wall 32 comprises an upstanding side wall 34 of the first chamber portion and an upstanding side wall 33 of the second chamber portion. The second chamber portion comprises about 100-X % of the volume of the metering chamber and the first chamber portion comprises about X % of the volume of the metering chamber wherein X is in the range of 2-50, preferably in the range of 5-40, more preferably in the range of 15-30.

Figure 3B:
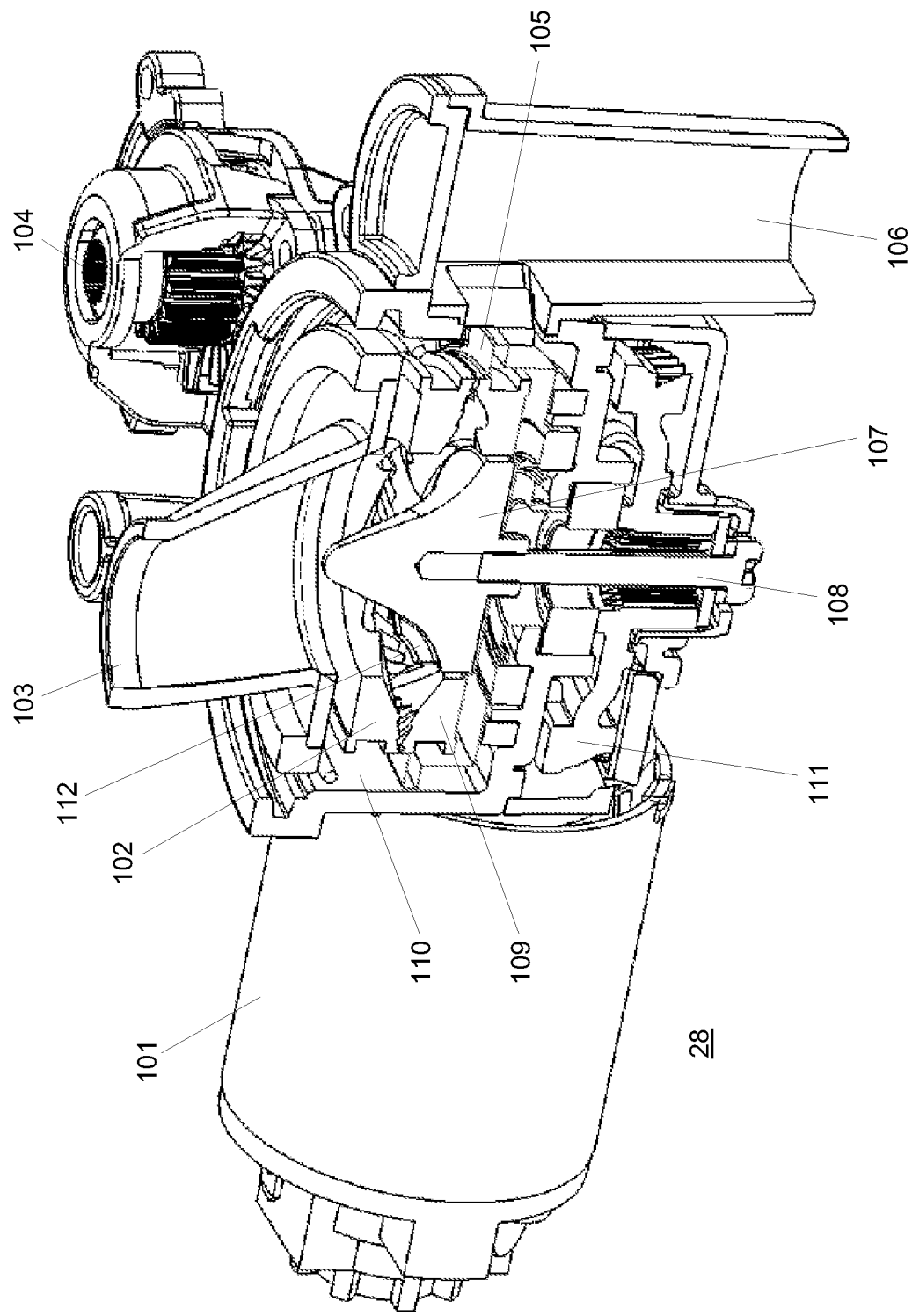
FIG. 3B shows a cross sectional view of the grinder used in the coffee brewing apparatus according to FIG. 1 in perspective.

The bottom part 27 of the metering chamber 15 has a conical shape such that the bottom portion extends downwardly in a direction extending perpendicular to and away from a first vertical axis 35. The grinder 28 in this example is positioned centrically with respect to the second chamber portion 25. Referring now to FIGS. 3B and 3C, the grinder 28 will be described in more detail. The grinder 28 comprises a second motor (grinder drive motor) 101 and an upper grinding disk/wheel 102, which may be ceramic or steel. The upper grinding disk/wheel is rotationally fixed in its position. Furthermore, the second chamber 103 of the metering chamber is shown (referred to by reference 25 in FIG. 3A), which works as dosing funnel. The grinder furthermore comprises a manual adjustment lock 104 to adjust the grind fineness setting by the consumer. The upper grinding disk 102 is moved up or down in respect to a lower grinding disk/wheel 109 when this key/lock is turned. When the adjustment lock is operated, the upper grinding disk moves up and down and the lower grinding disk stays in place. In this way the size of the grind at the exit of the grinding disks, i.e. where they almost touch the outside of the grinder, is determined. The grinder furthermore comprises an exit location 105 for ground coffee out of a circular transport channel 110 into a ground coffee chute 106. The ground coffee chute is a funnel pointing downwards into a brewing device 46 (schematically shown in FIG. 3C) of the coffee brewing apparatus, which is open on the top and placed exactly below this chute when grinding. A rotating drive cone 107 (referred to as bottom part with conical shape 27 of the metering chamber in FIG. 3A) is fixed on a main drive shaft 108. This cone ensures the movement and guidance of the beans out of the metering chamber into the grinding section consisting of the upper grinding disk 102 and the lower grinding disk 109, which may be ceramic or steel. The upper grinding disk 102 and the lower grinding disk 109 have a suitable milled shape for grinding the coffee beans, as is well known in the art. The main drive shaft drives the lower grinding disk 109 and the rotating drive cone 107. Thus the circular transport channel 110 is formed, which transports the ground coffee exiting out of the slit between upper and lower grinding disk to the exit location 105. The shape of the channel results in a "no contamination" grinder, wherein virtually no coffee beans/ground coffee remains after finishing the grinding. Furthermore, the grinder comprises a motor transmission/gear 111 and a cone protrusion 112 to force the beans between the grinder disks.

The lower grinding disk 109 extends around rotating drive cone 107 and the upper grinding disk 102 extends above the lower grinder disk 109. The grinder is rotationally driven by the motor 101 resulting in the rotation of the drive cone 107 and the lower grinding disk 109. Due to the shape of the cone protrusion 112 upon driving the drive cone 107 and the lower grinding disk coffee beans are moved in an outwardly extending radial direction between the lower grinding disk 109 and the upper grinding disk 102. Because a vertical distance between the lower grinding disk 109 and the upper grinding disk 102 decreases in the outwardly extending radial direction the beans are crunched and cut into ground coffee.

As explained, grinder 28 supplies ground coffee to the coffee brewing device 46 of the coffee beverage system. The coffee brewing device is arranged to receive a supply of water to extract a coffee beverage from the ground coffee. The coffee beverage is discharged from a coffee beverage exit 37 (FIGS. 1 and 2) from the coffee beverage system into a cup or like household receptacle. A water supply can be arranged to supply water to the coffee brewing device under pressure for espresso type coffee beverages or may provide a drip feed to the extraction system formed by coffee brewing device.

Before operating the coffee beverage system, the user has to connect the first coffee bean packaging cartridge 3 to the coffee brewing apparatus 4. FIGS. 4-9 show an example of connection means of the coffee beverage system, which are used for this purpose.

Figure 4A:
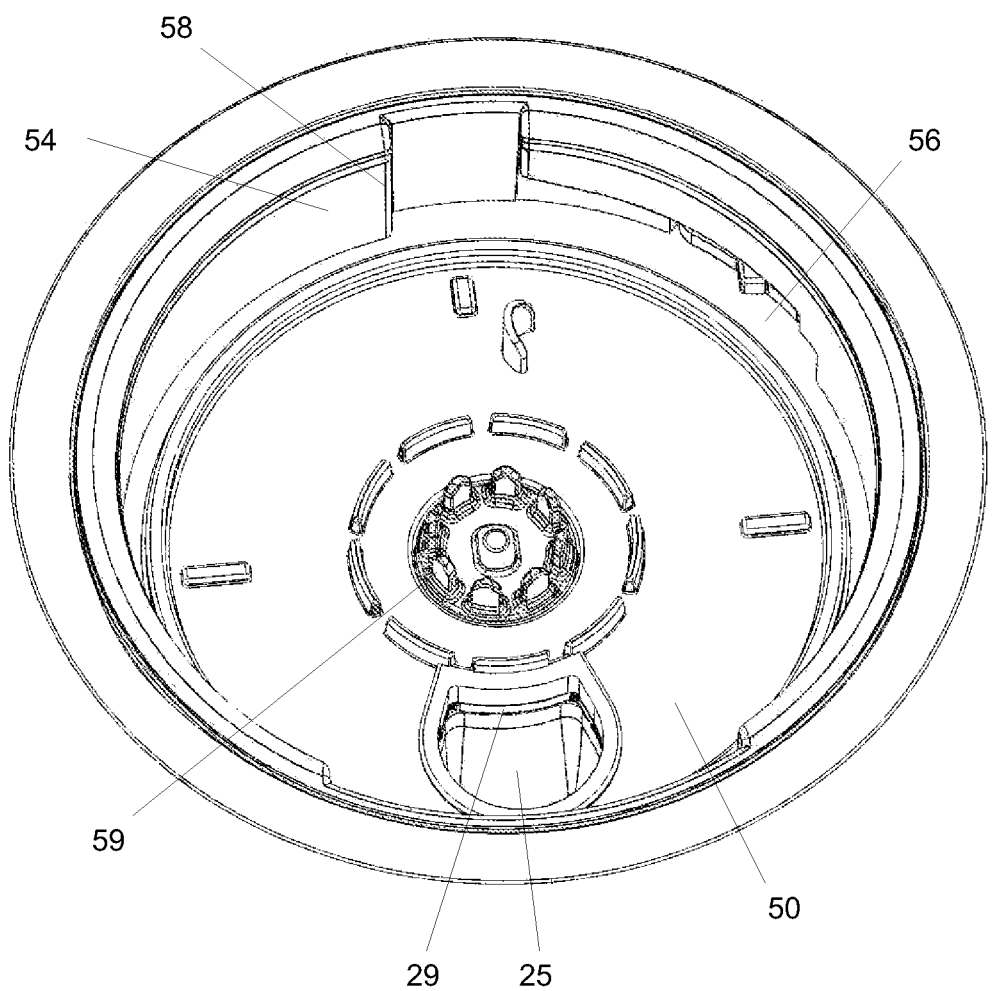
FIG. 4A shows a perspective detail view of the upper part of the coffee brewing apparatus of FIG. 2.
Figure 4B:
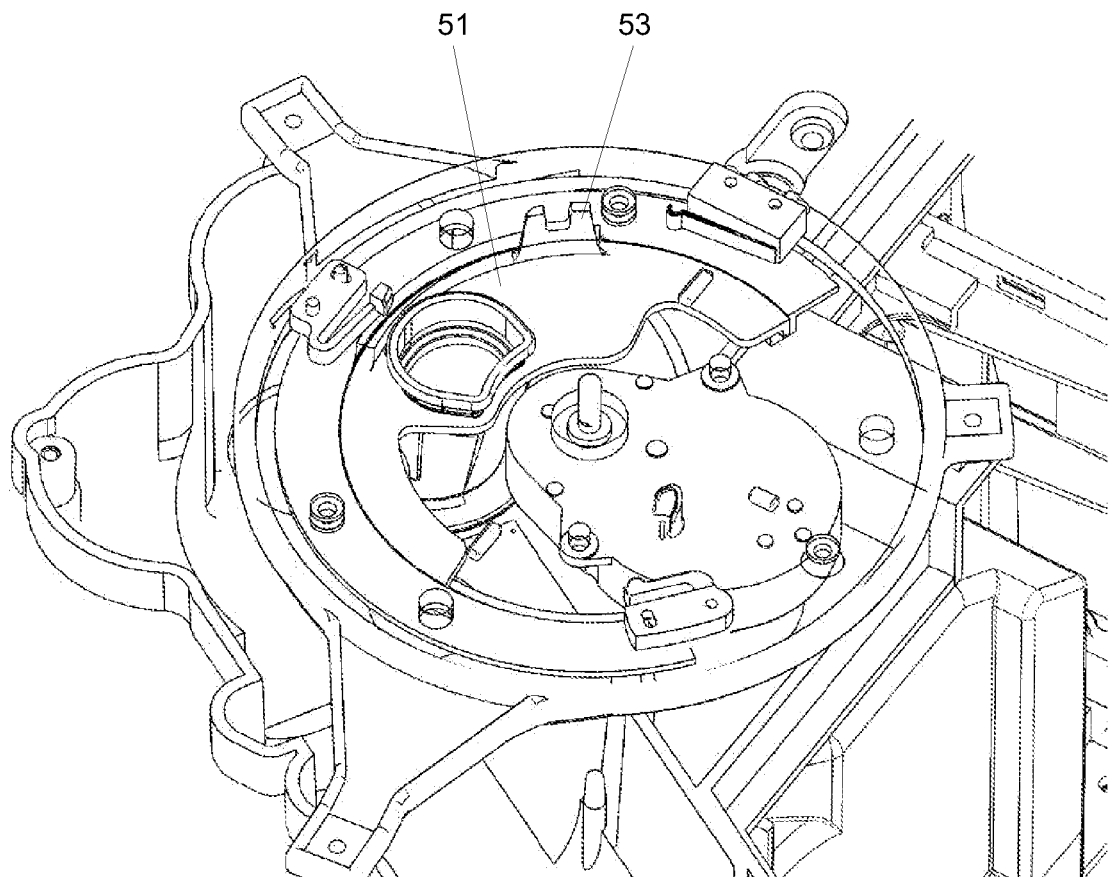
FIG. 4B shows a perspective detail view of the upper part of the coffee brewing apparatus of FIG. 2 with a closing plate in open position.

Referring now to FIG. 4A, the connection means comprise a recess 50 at an upper side 52 of the coffee brewing apparatus 4. The recess 50 is surrounded by a side wall 54 protruding from the upper side of the coffee brewing apparatus 4. The user should place the corresponding part, shown in FIGS. 5A, 5B, 6, 6B, 6C, 7A, 7B, 7C, 8 and 9, at a lower side of the first coffee bean packaging cartridge into the recess. The bayonet elements to be described later of the first coffee bean packaging cartridge should be placed in the corresponding openings 58 in the side wall 54 of the recess 50. The user should then rotate the cartridge over 50 degrees until reaching blocking elements 56 for impeding a further rotation of the first coffee bean packaging cartridge. At this position the exit opening 29 of the first chamber portion 23 is aligned with the coffee inlet (entrance opening) 9 of the second chamber portion 25. When the first coffee bean packaging cartridge 3 is removed from the coffee brewing apparatus, the second chamber portion 25 in the appliance is closed by means of an appliance closing plate 51 (FIG. 4B). The appliance closing plate 51 is being driven by a protrusion 1686 (FIG. 6C) on the neck of the first coffee bean packaging cartridge which slots into a keyhole 53 on the appliance closing plate as the first coffee bean packaging cartridge is being placed into the openings 58 in the side wall 54 of the recess 50. As the user rotates the cartridge over a 50 degrees angle during placement the closing disk in the consumable and the closing plate in the appliance are opened, simultaneously.

Figure 5A:
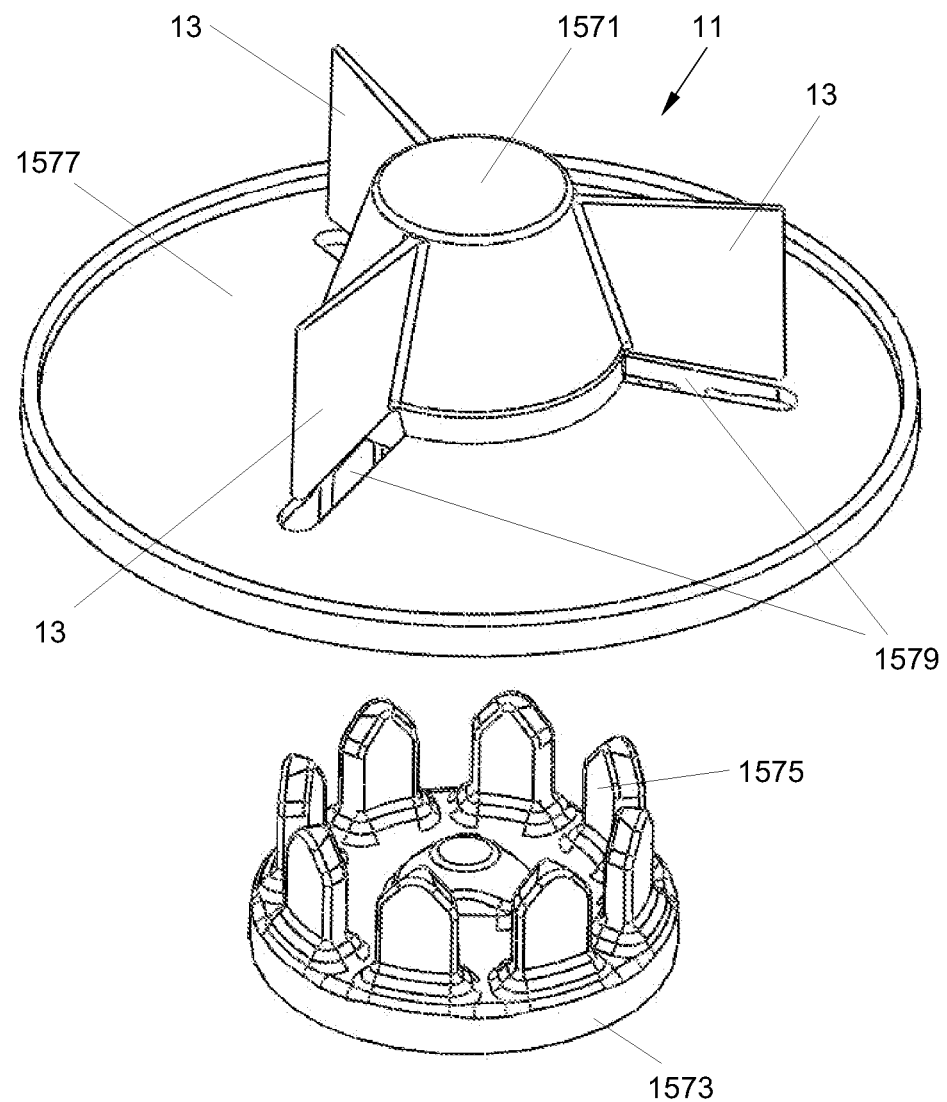
FIGS. 5A and 5B are two isometric exploded views of an impellor used in a first coffee bean packaging cartridge together with a drive shaft coupling end.
Figure 5B:
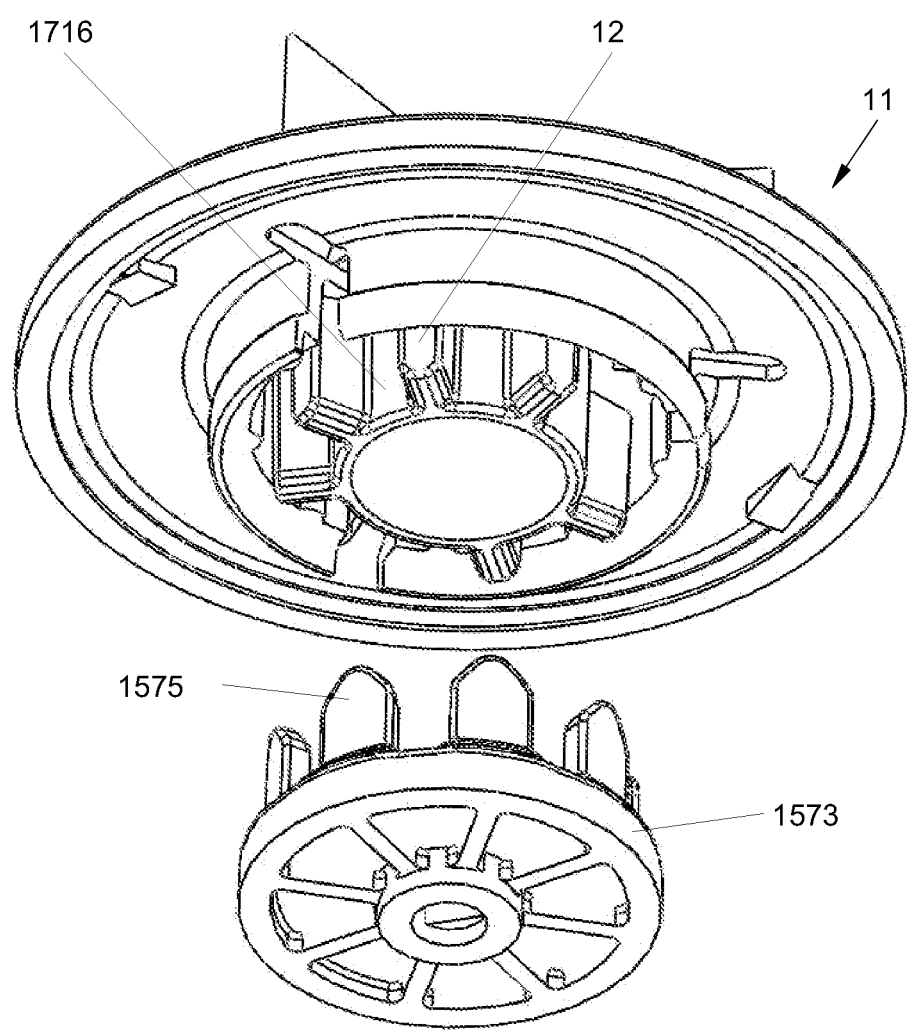

One suitable form of impellor 11 is shown in somewhat more detail in FIGS. 5A and 5B. To prevent the impellor 11 to get jammed by coffee beans that become locked between the perimeter aperture and radially extending vanes 13, such vanes 13 are preferably made from a resilient material. It is also possible to make the entire impellor 11 from a yieldable resilient material. The impellor 11 has a hollow hub portion engageable by a drive shaft end 1573 of a coffee brewing appliance. The drive shaft end 1573 may have a number of keys 1575 (preferably 4, 6 or 8) for engagement with corresponding protrusions, or keys in the interior of hollow hub 1571. To facilitate engagement of the impeller 11 and the drive shaft end upon placing of the first coffee bean packaging cartridge on the appliance the number of keys may differ between the drive shaft end 1573 and the hollow hub 1571. As illustrated in FIG. 5A the vanes 13 do not extend to the perimeter edge of the impeller 11, which may prevent beans from becoming jammed between the vanes 13 and the perimeter aperture. As indicated hereinabove the vanes may also be of a flexible material and to provide more flexibility to the vanes the vanes are conveniently also unattached to the impellor base 1577, by leaving a gap 1579. To fill the metering chamber some fifteen revolutions of the impeller 11 will normally suffice. However, to ensure filling under even adverse conditions, it may be convenient to allow for some extra revolutions such as thirty or twenty-five in total. For filling of the metering chamber (i.e. the dosing volume) the conveying impeller 11 including both the impellor base 1577 (bottom) and the vanes 13 is rotated with a rotational speed in the range of 100 to 500 rpm, and preferably between 250 and 300 rpm. Due to the centrifugal force created by the rotation of the impellor base 1577 and the rotation of the vanes the coffee beans are driven in an outward direction towards the inlet opening 21 of the metering chamber. Once the filling of the dosing volume has been accomplished, the appliance will switch from driving the impeller 11 to driving its grinder. With the impeller 11 immobilized the metering chamber will gradually empty into the grinder. Because the impeller 11 is inactive, no beans will escape from container 7, also because of the presence of the trickle through edge 22.

Figure 6A:
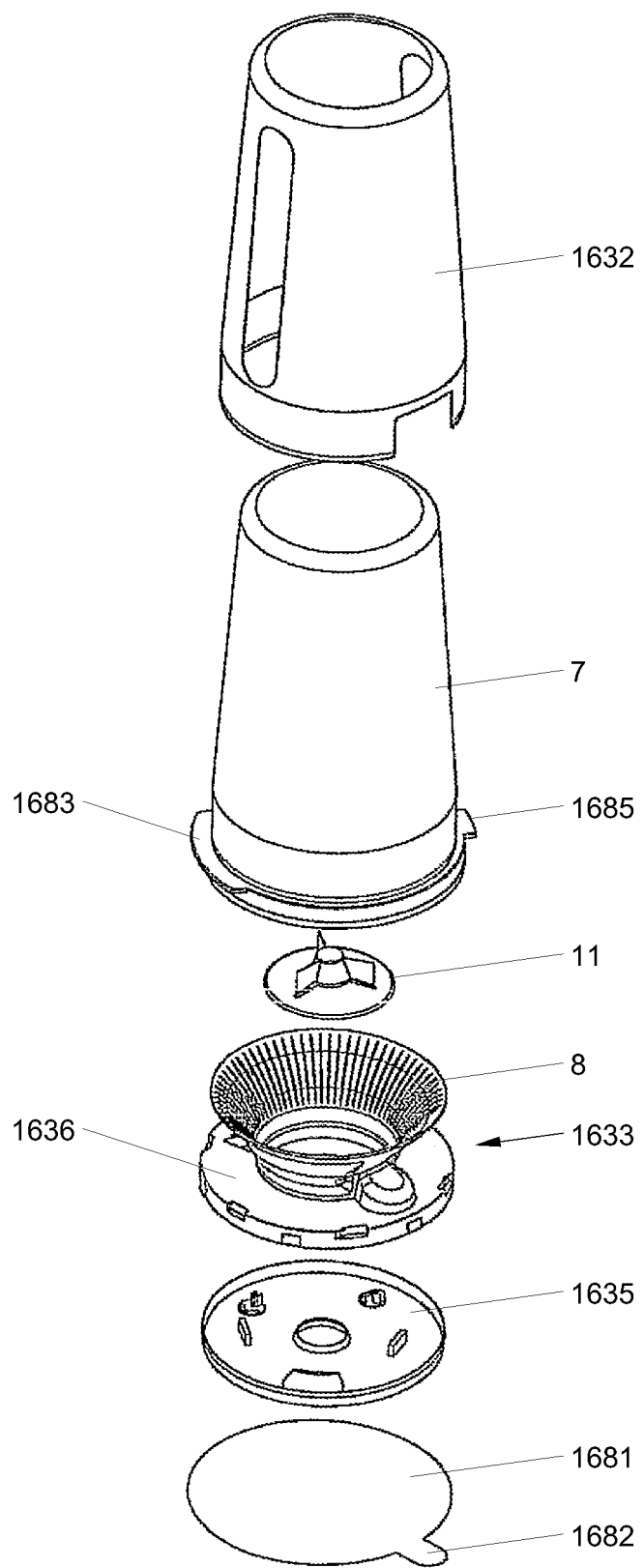
FIG. 6A is an exploded isometric view of a first coffee bean packaging cartridge to be mounted to the coffee brewing apparatus.
Figure 6B:
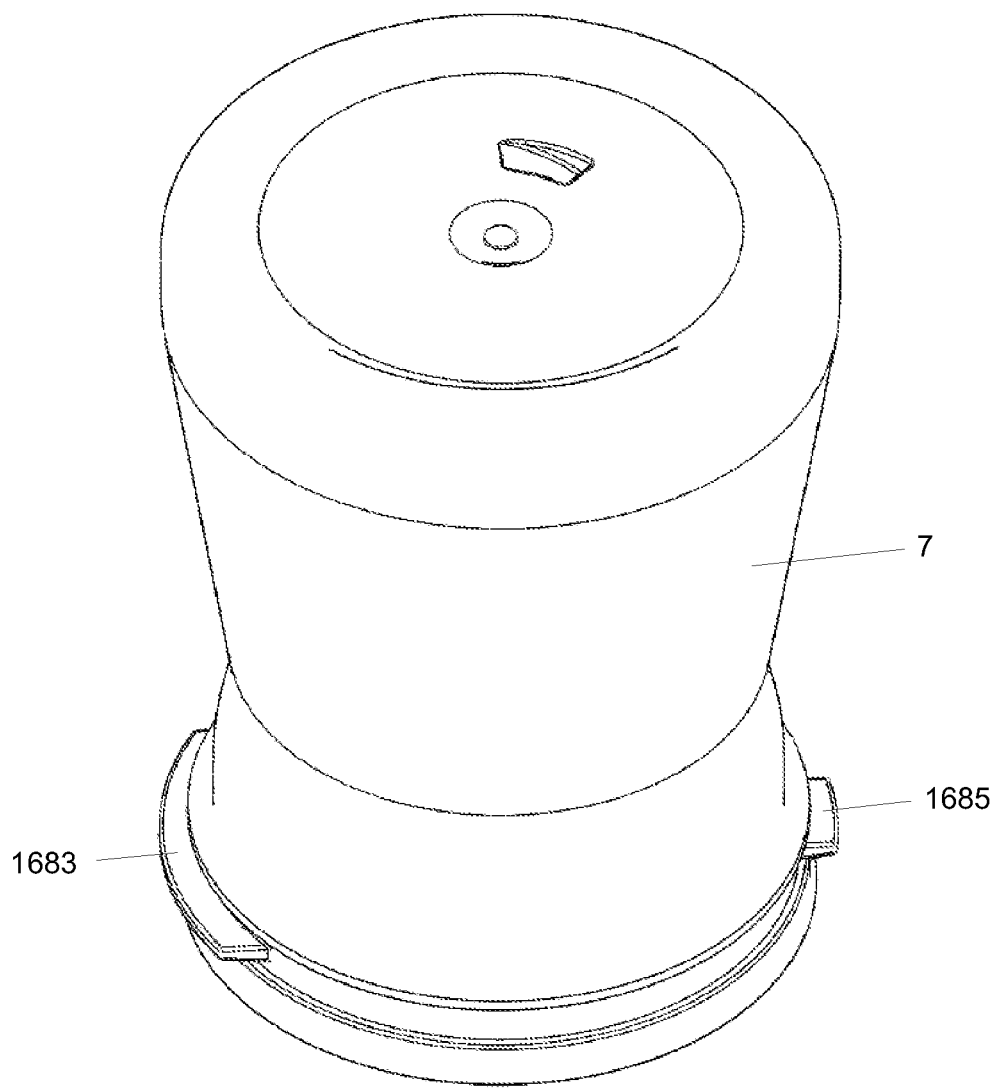
FIGS. 6B, 6C and 6D show different perspective views of the first coffee bean packaging cartridge shown in FIG. 6A.
Figure 6C:
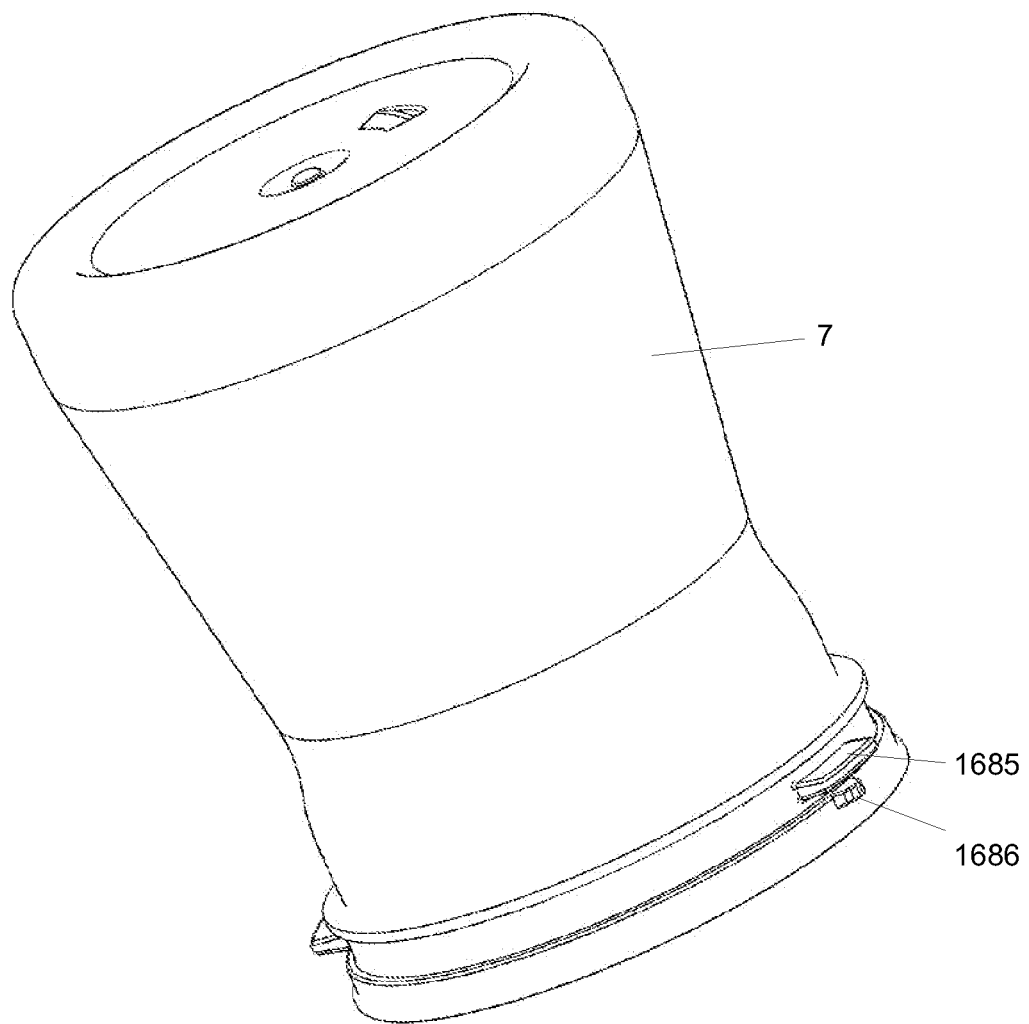

Referring to FIGS. 6A, 6B and 6C an example of the first coffee bean packaging cartridge 3 is shown in perspective and in an exploded view. This first coffee bean packaging cartridge includes the container 7 defining an interior volume for coffee beans. The container 7 is preferably made from a transparent material so that its contents can be seen. Optionally, the container 7 may be partially covered by an outer sleeve 1632 which may be printed with a description of the kind of coffee beans inside and may also be provided with a window to reveal a translucent portion of the container 7. The container 7 is also provided at a lower end thereof with bayonet formation 1683, 1685 for coupling with the openings 58 in the side wall 54 of the recess 50 of the coffee brewing apparatus 4. Inserted into an open bottom end of container 7 is a closure member 1633. The closure member 1633 has the ribbed funnel 8 for guiding coffee beans towards the impeller 11 and a base flange 1636. A rotatable closure disk 1635 is rotatably connectable with respect to the base flange 1636 of the closure member 1633. The closure member 1633 and the rotatable closure disk together form an interface between the first coffee bean packaging cartridge and the coffee brewing apparatus. The assembled first coffee bean packaging cartridge can be sealed against deterioration from the ambient air by a sealing membrane 1681 that attaches to the perimeter edge of the container 7. The sealing membrane and barrier foil 1681 may again be equipped with a conventional one-way pressure relief valve for venting excess pressure from gases emanated from freshly roasted beans to the exterior of the first coffee bean packaging cartridge. Preferably such a venting valve should open at a pressure of between 0.1 bar and 0.5 bar to prevent deformation of the container by inflation. To facilitate removal of the sealing membrane 1681 before placing the cartridge on a brewing apparatus, a pulling tab 1682 may be provided.

Figure 7A:
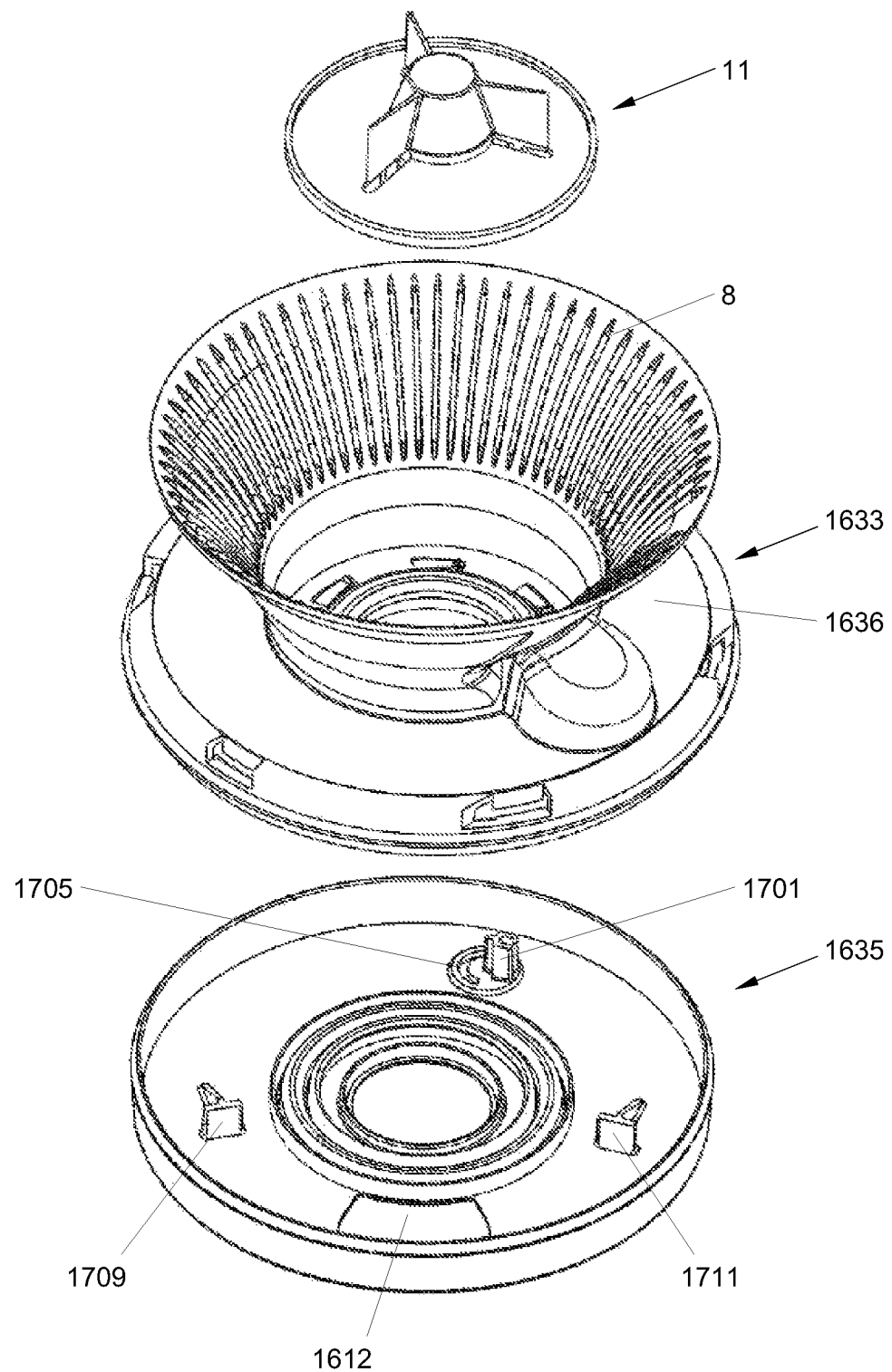
FIG. 7A is a detailed exploded isometric view of the bottom part of the first coffee bean packaging cartridge of FIG. 6.
Figure 7B:
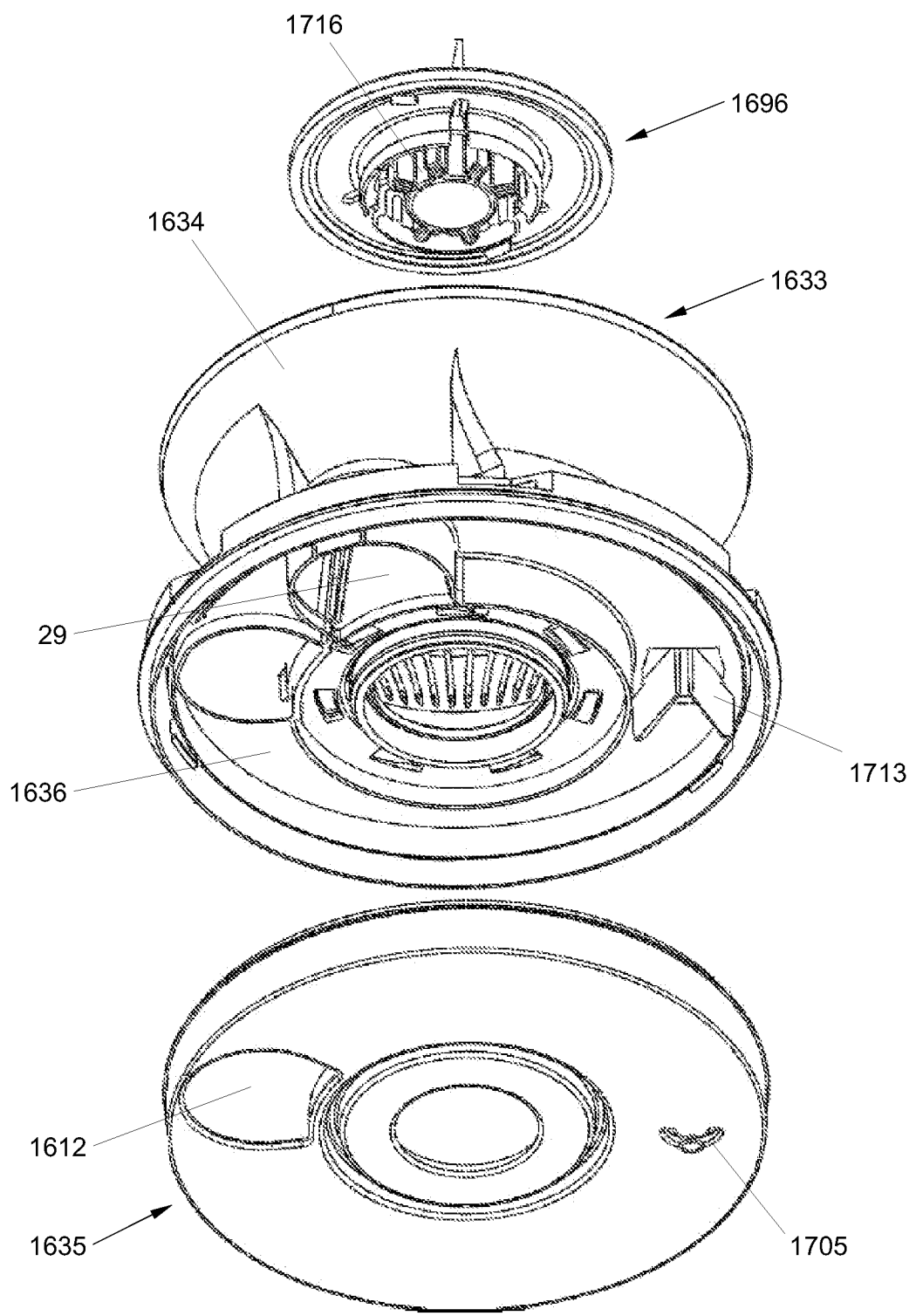
FIG. 7B is a detailed exploded view of the bottom part of FIG. 7A as seen in an opposite direction.
Figure 7C:
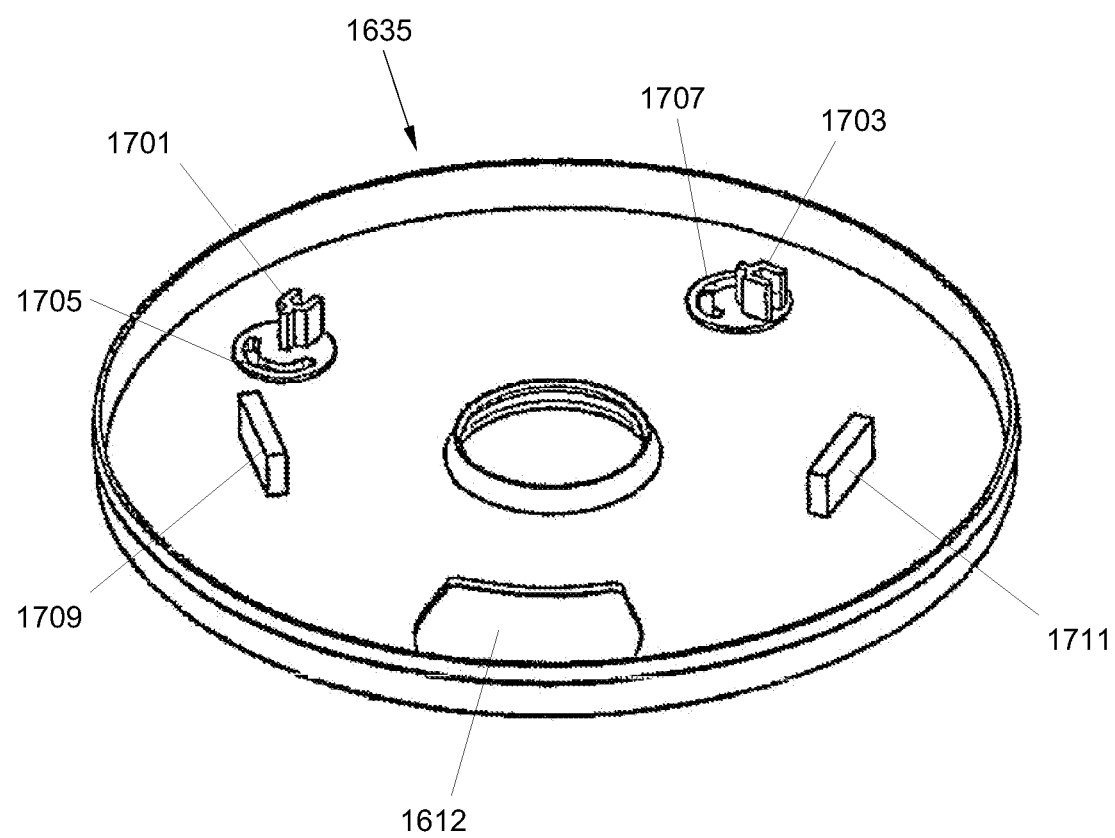
FIG. 7C is a perspective view of a closing plate of the bottom part shown in FIGS. 7A and 7B.

The interface forming bottom parts of the first coffee bean packaging cartridge is separately shown in more detail in FIGS. 7A, 7B and 7C. The ribbing on funnel 8 as further seen in the exploded view of FIG. 7A is useful in preventing sticking of coffee beans to the surface of the funnel 8.

By appropriate spacing between the successive ribs on funnel 8 it is possible to minimise the contact surface between the beans and the funnel surface. As the skilled person will recognise, such ribbing is merely one of various ways to reduce the contact surface and protruding bulges may be equally effective. Also the inclination given to the funnel may be subject to variation, but an angle in excess of 30 degrees, up to 90 degrees has been found effective.

The rotatable closing disk 1635 has an aperture 1612, which upon appropriate rotation can register with the exit opening 29 of the closure member 1633 (see FIG. 7B). The closing disk 1635 on its upper surface has protruding therefrom a first detent 1701 and a second detent 1703 (see FIG. 7C). The first abutment is bordered by semi-circular slots 1705 and 1707, respectively. Additionally, protruding from the upper surface of the rotatable closing disk 1635 is a first abutment 1709 and a second abutment 1711 for limiting rotational movement in respect of the exit opening 29. Further provided on a bottom face of the base flange 1636 of the closure member 1633 is a first pair of latching arms 1713 and a second pair of latching arms (not shown). The first pair of flexible latching arms 1713 is positioned to cooperate with the first detent 1701 in the closed position of the rotatable closure disk 1635. The second detent 1703 and the second pair of flexible latching arms also cooperate together in the closed position of the closure disk 1635 and are optional.

Figure 8:
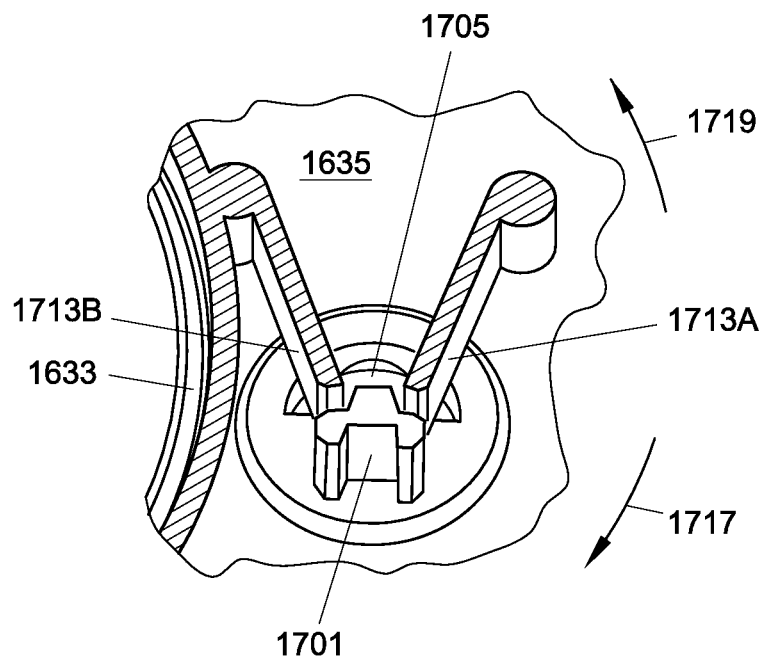
FIG. 8 is a cross-sectional detail of the assembled bottom part.

In reference to FIG. 8 it is shown how the first detent 1701 has been caught behind the converging flexible arms 1713A and 1713B of the first part of flexible arms. The position of the detent 1701, as shown in FIG. 8, has resulted from rotation of the closure disk 1635 in respect of the closure member 1633 in the direction of arrow 1717. Rotation in the opposite direction of arrow 1719 is effectively prevented by the flexible arms 1713A and 1713B engaging the first detent 1701. Accordingly when the first coffee bean packaging cartridge is in the closed position as determined in the partial cross-section of FIG. 8 it may be removed from the apparatus without any risk of spilling beans. Also this latching arrangement ensures that the cartridge is not accidentally opened by rotation of the closure disk 1635.

Figure 9:
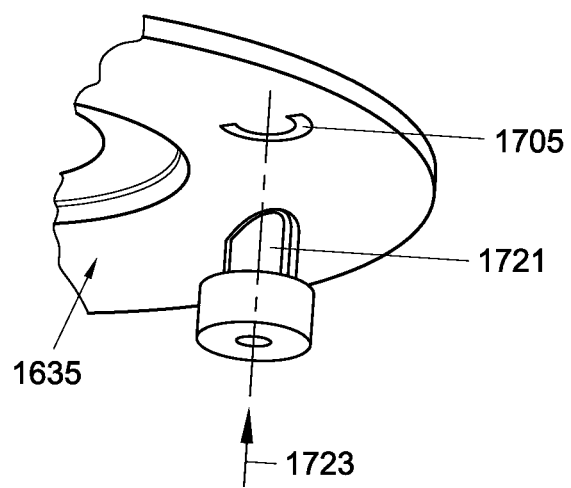
FIG. 9 is a bottom perspective detail of the bottom part of FIG. 7B with a delatching protrusion of the coffee brewing apparatus.

As shown in FIG. 9 an unlocking element 1721, which is part of the coffee brewing apparatus, can engage through the semi-circular slot 1705 in the direction of arrow 1723 when the first coffee bean packaging cartridge is placed on the appliance. The unlocking element 1721 has a V-shaped upper contour that forces apart the flexible arms 1713A and 1713B of the first pair of flexible arms 1713. This will then allow rotation of the closure disk 1635 in the direction of arrow 1719 by allowing the first detent 1701 to pass between the spread apart flexible arms 1713A and 1713B. This rotating movement is obtained by manually rotating the first coffee bean packaging cartridge with respect to the appliance to engage the bayonet means 1683, 1685 on the container 7 with the counter bayonet formations/blocking elements 56 on the brewing apparatus.

The operation of the second detent 1703 in respect of the second pair of flexible latching arms is identical and when optionally provided will give additional protection against accidental opening, when not engaged on a coffee brewing apparatus.

Referring to FIG. 4A again, the recess 52 comprises rotatable protruding edges 59 at its center, which are positioned at the end of the driving shaft 18 which is driven by the first motor 17. On these edges the corresponding openings 1716 at the bottom side of the first coffee bean packaging cartridge 3 should be placed. These openings 1716 are formed by a series of protrusions 12 on the bottom side of the impeller 11 (see FIG. 5B). The openings 1716 receive the edges 59 if the first coffee bean packaging cartridge is connected with the coffee brewing apparatus. Thus by rotating the edges 59 the impellor 11 is rotating too.

The upstanding side wall 54 of the recess 52 may be surrounded by a housing 55, as shown in FIGS. 1-2.

The coffee brewing apparatus comprises a control device unit (or controller) 40 schematically shown in FIG. 3, preferably a microprocessor for controlling the dosing, grinding and brewing process. Thereto, the controller may be connected to a sensor acting as a detection means for detecting an identification element such as a barcode or a RFID label of the first coffee bean packaging cartridge 3. Thereby the control device unit cannot only detect the presence or removal of the first coffee bean packaging cartridge 3, but also receive information about its contents and/or an identifier which identifies the first coffee bean packaging cartridge 3. Preferably the control unit controls the dosing, the grinding and the brewing (including water supply) in dependence on the identifier that was read by means of the sensor. It thus becomes possible for the control device unit to adjust the dosing, grinding and brewing process in accordance with the particular coffee bean product offered by the first coffee bean packaging cartridge 3. Such information can be supplied to the control unit by the identification element on the cartridge.

Figure 4C:
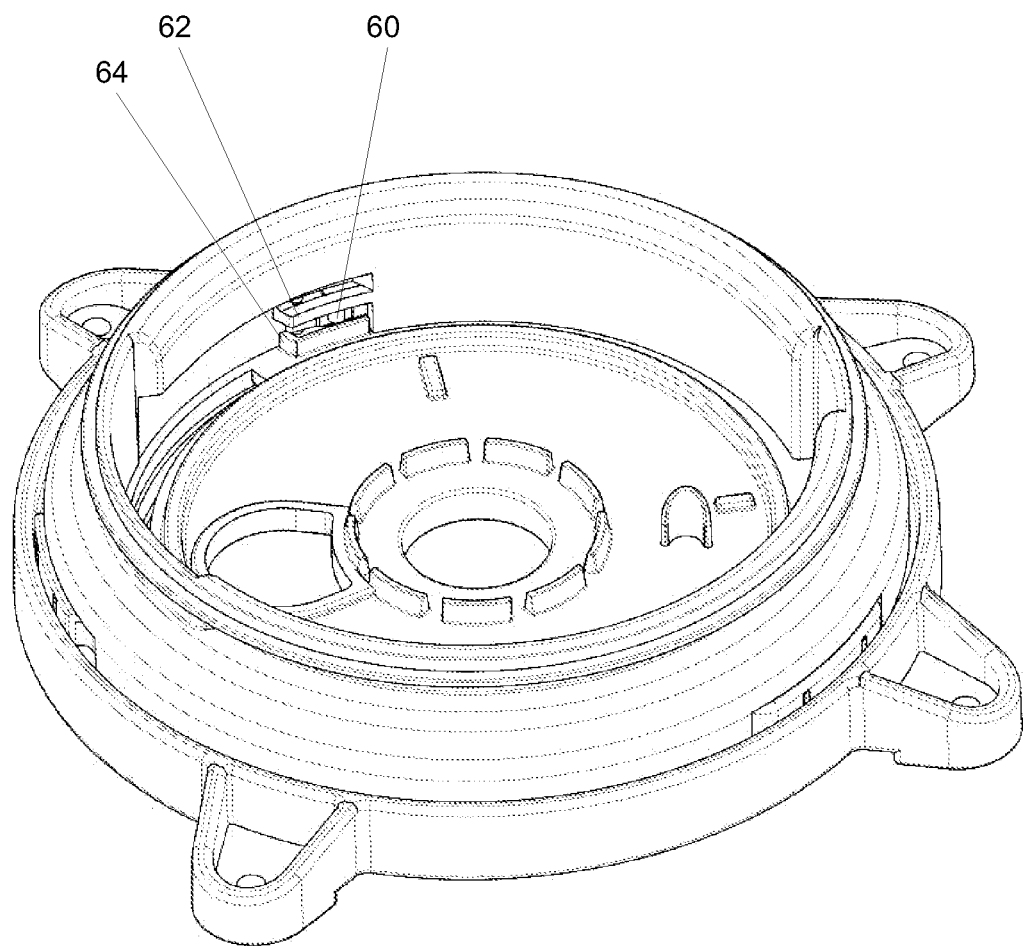
FIG. 4C shows a further perspective detail view of the upper part of the coffee brewing apparatus of FIG. 2.
Figure 6D:
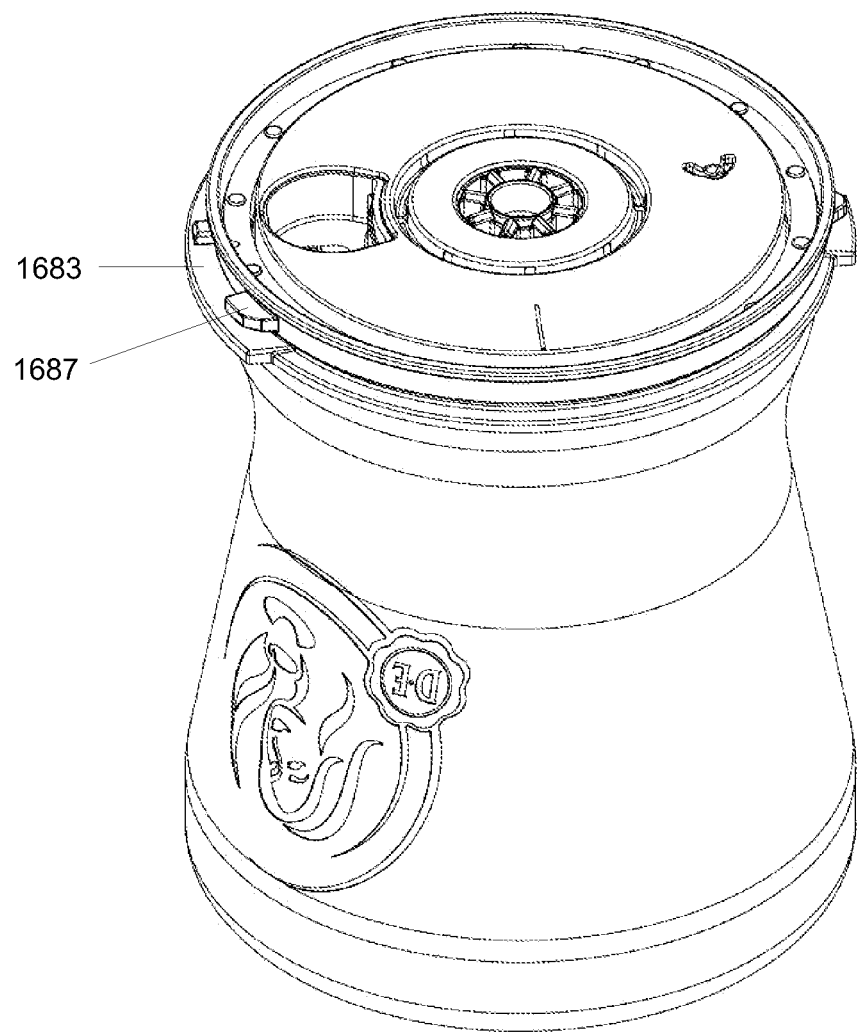
Figure 10:
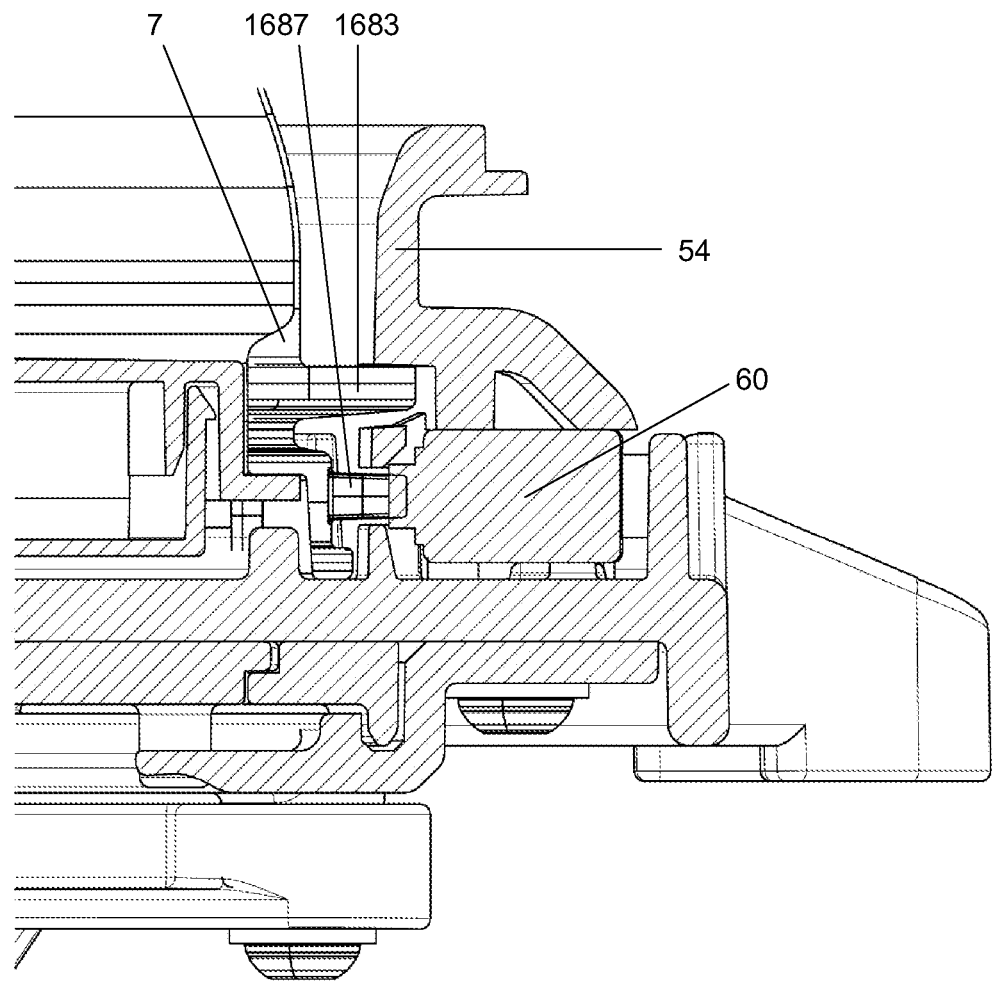
FIG. 10 shows a cross sectional view of the first coffee bean packaging cartridge connected to the coffee brewing apparatus.

Alternatively, as shown in FIGS. 4C, 6D and 10, the sensor is arranged to merely detect the presence and removal of a coffee bean packaging cartridge to the coffee brewing apparatus. The sensor used for this purpose may be a micro switch 60 hidden behind a first horizontal segment 62 and a second horizontal segment 64 in the side wall 54 protruding from the upper side of the coffee brewing apparatus 4. This is to prevent the activation of the micro switch with finger or other object. A protruding part 1687 (see FIG. 6D) below the large bayonet element 1683 of the cartridge 3 activates the micro switch, when the first coffee bean packaging cartridge is connected to the coffee brewing apparatus by rotating it to its final position. The protruding part 1687 exactly fits in the slit between the horizontal wall segments 62, 64. This signals the controller that a first coffee bean packaging cartridge is correctly connected to the coffee brewing apparatus. The controller may activate the dosing, grinding and brewing processes only when it has been detected that the first coffee bean packaging cartridge 3 has correctly been connected to the coffee brewing apparatus 4.

According to an example, the controller controls these processes as follows. In a first step the metering chamber is completely filled with coffee beans. Thereto, the controller controls the first motor 17 to drive the transportation means. The transportation means is driven longer than is required for filling the metering chamber with coffee beans. In this example in the first step the transportation means is driven longer than is required for completely filling or at least substantially completely filling the metering chamber (at least substantially means for example for more than 90%). This is possible, because of the use of the flexible vanes 13. The metering chamber is arranged for receiving a portion of coffee beans corresponding to a dosed amount of coffee beans which is preferably necessary for preparing a single serving of coffee beverage, such as a single cup coffee comprising 80-160 ml of coffee. A filled metering chamber comprises in this example one dose of coffee beans. One dose of coffee beans comprises 5-11, preferably 6-8 grams of coffee beans.

Then, in a second step which follows after the completion of the first step, the controller activates the grinder by activating the second motor 101. The grinder is activated longer than is required for emptying the metering chamber and for grinding all the coffee beans which were collected in the metering chamber during the first step. In this example in the second step the grinder is activated longer than required for completely emptying or at least substantially completely emptying the metering chamber (at least substantially completely emptying means for example for more than 90%).

Finally, in a third step which follows after the second step is completed the controller controls the brewing device to brew coffee based on the ground coffee and on heated water.

According to the present invention the coffee beverage system is further provided with a second coffee bean packaging cartridge which is also removably connectable to the coffee brewing apparatus. This second coffee bean packaging cartridge is arranged for being filled with and holding and supplying coffee beans. The second coffee bean packaging cartridge in general includes a container or housing comprising an interior volume and at least one exit opening defining a coffee bean outlet, the interior volume being arranged for holding coffee beans and transportation means adapted for enabling transportation of the coffee beans from the interior volume towards the exit opening of the second coffee bean packaging cartridge. Furthermore the second coffee bean packaging cartridge is adapted to the coffee brewing apparatus so that, if the second coffee bean packaging cartridge is connected to the coffee brewing apparatus, coffee beans which are transported with the aid of the transportation means of the second coffee bean packaging cartridge towards the exit opening of the second coffee bean packaging cartridge can be received by the coffee brewing apparatus via the entrance opening for preparing coffee, wherein the transportation means of the second coffee bean packaging cartridge are configured to be actuated independently from the coffee brewing apparatus.

A first embodiment of such a second coffee bean packaging cartridge 1102 will be described now with reference to FIGS. 11A-14B.

The second coffee bean packaging cartridge is specifically adapted to be connected to the coffee brewing apparatus 4. Thereto, the second coffee bean packaging cartridge is provided with connection elements (such as e.g. bayonet elements) similarly to the first coffee bean packaging cartridge 2. However, the second coffee bean packaging cartridge can in addition be connected to another external apparatus, e.g. a coffee grinder apparatus only used for grinding coffee beans but not for brewing coffee. In view of this the description which follows refers to an external apparatus to which the second coffee bean packaging apparatus can be connected rather than to the coffee brewing apparatus.

Figure 11A:
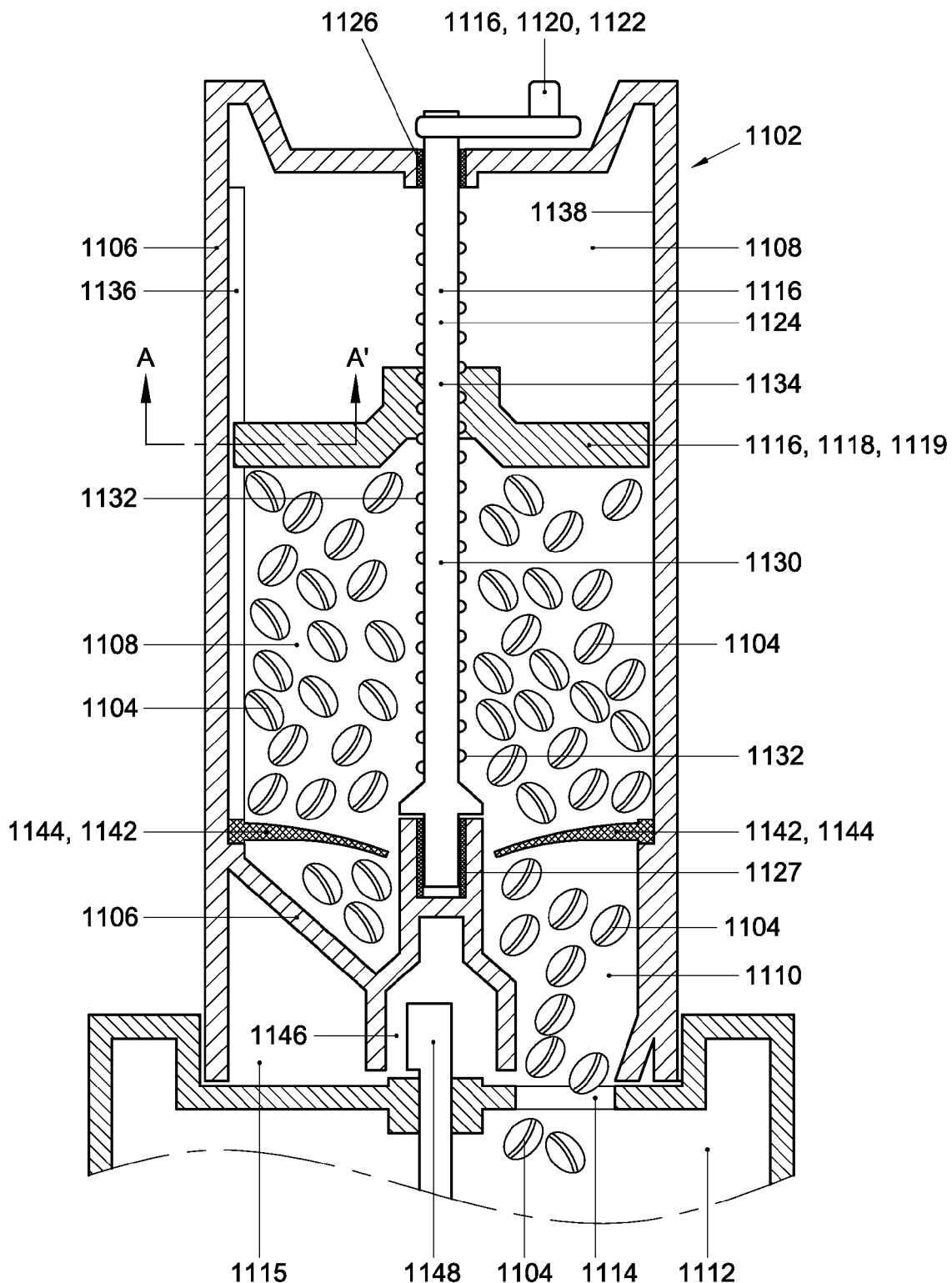
FIG. 11A shows in cross-section a second coffee bean packaging cartridge for holding and supplying coffee beans according to a first aspect of a first embodiment of the invention.

FIG. 11A shows in cross-section of the second coffee bean packaging cartridge 1102 for holding and supplying coffee beans according to a first aspect of the first embodiment. In this example, the cartridge 1102 is filled with roasted coffee beans 1104, being an example of coffee beans. However, alternatively or additionally to the coffee beans 1104, the cartridge 1102 can be filled with other types of coffee beans, such as broken roasted coffee beans, or ground roasted coffee beans.

The cartridge 1102 includes a container or housing 1106 that encloses an interior volume 1108 of the cartridge 1102. The container or housing 1106 may e.g. have a cylindrical shape. In the interior volume 1108, the coffee beans 1104 can be held. The housing 1106 has an outlet 1110 for releasing the coffee beans 1104 from the interior volume 1108. From the outlet 1110, the coffee beans 1104 can be supplied to a hosting external apparatus 1112. The external apparatus 1112 may be arranged for hosting the cartridge 1102 by means of a cavity 1115. The cavity 1115 may be present in a, in use, top part of the external apparatus 1112. The external apparatus 1112 may have an inlet 1114 through which the coffee beans 1104 can be received. The inlet 1114 of the external apparatus 1112 may be positioned in the cavity 1115.

The cartridge 1102 further includes transportation means 1116 for transporting the coffee beans 1104 towards the outlet 1110. The transportation means 1116 include a moveable structure 1118 for contacting the coffee beans 1104. As a result of such contacting, a force may be applied to the coffee beans 1104. However, alternatively, as a result of such contacting, movement of coffee beans can be blocked. Then, the force applied by the moveable structure 1118 may be a reaction force caused by another force that works on the coffee beans, such as gravity force. Thus, the contacting element can be used for actively transporting the coffee beans, and/or can be used for blocking the coffee beans and realizing transport of the coffee beans by releasing the blockage of the coffee beans. The moveable structure 1118 is at least partly, and in this example completely, present in the interior volume 1108. In this example, the moveable structure 1118 may form a plunger 1119.

The transportation means 1116 further include manually operable actuation means 1120, in this example a crank handle 1122, for manually actuating the moveable structure 1118. The manually operable actuation means 1120 are at least partly, and in this example completely, provided outside of the interior volume 1108. Their position outside the interior volume 1108 enables that the manually operable actuation means 1120 can be reached by hand by a user.

In the first example, the transportation means 1116 may further include a rotatable element, such as a rotatable axle 1124. The rotatable axle 1124 may be located at least partly, in this example completely, inside the interior volume 1108. Here, the rotatable axle 1124 in use rotates in a first bearing 1126 provided through the housing 1106, and in a second bearing 1127. The rotatable axle 1124 may be coupled, e.g. outside the housing 1106, to the crank handle 1122. In this way the crank handle 1122 may be arranged for rotating the rotatable axle 1124.

In the first example, the rotatable axle 1124 may be partly formed as a conveyor screw 1130, provided with screw thread 1132. Additionally, the plunger 1119 may includes a threaded bore 1134 through which the conveyor screw 1130 may be engaged. By rotating the conveyor screw 1103 by means of the crank handle 1122, the plunger 1119 may be moved downwards or upwards through the interior volume 1108. As a result of moving the plunger 1119 downwards, a downward force can be applied on the coffee beans 1104.

Figure 11B:
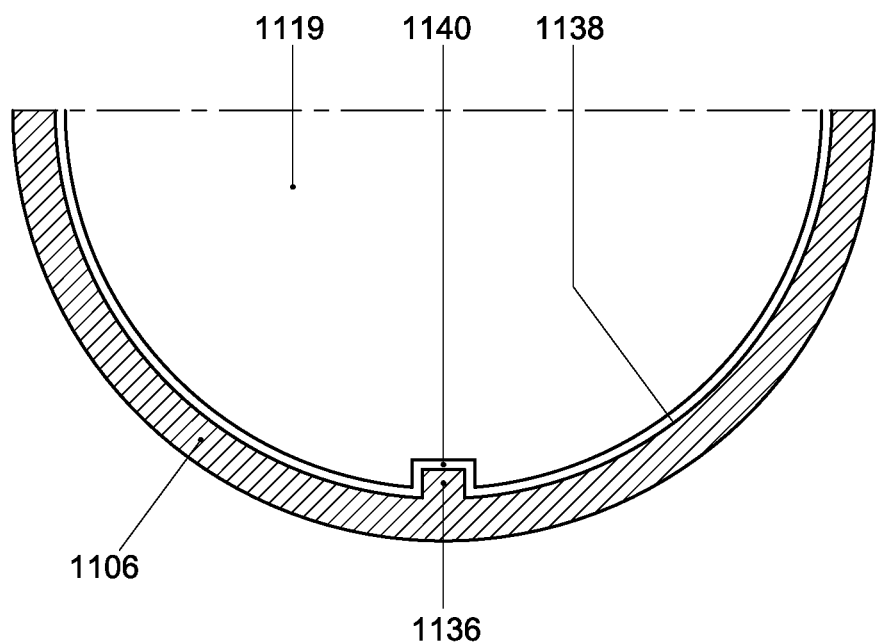
FIG. 11B shows a notch, a plunger, a ridge, and a container a cross-section.
Figure 11C:
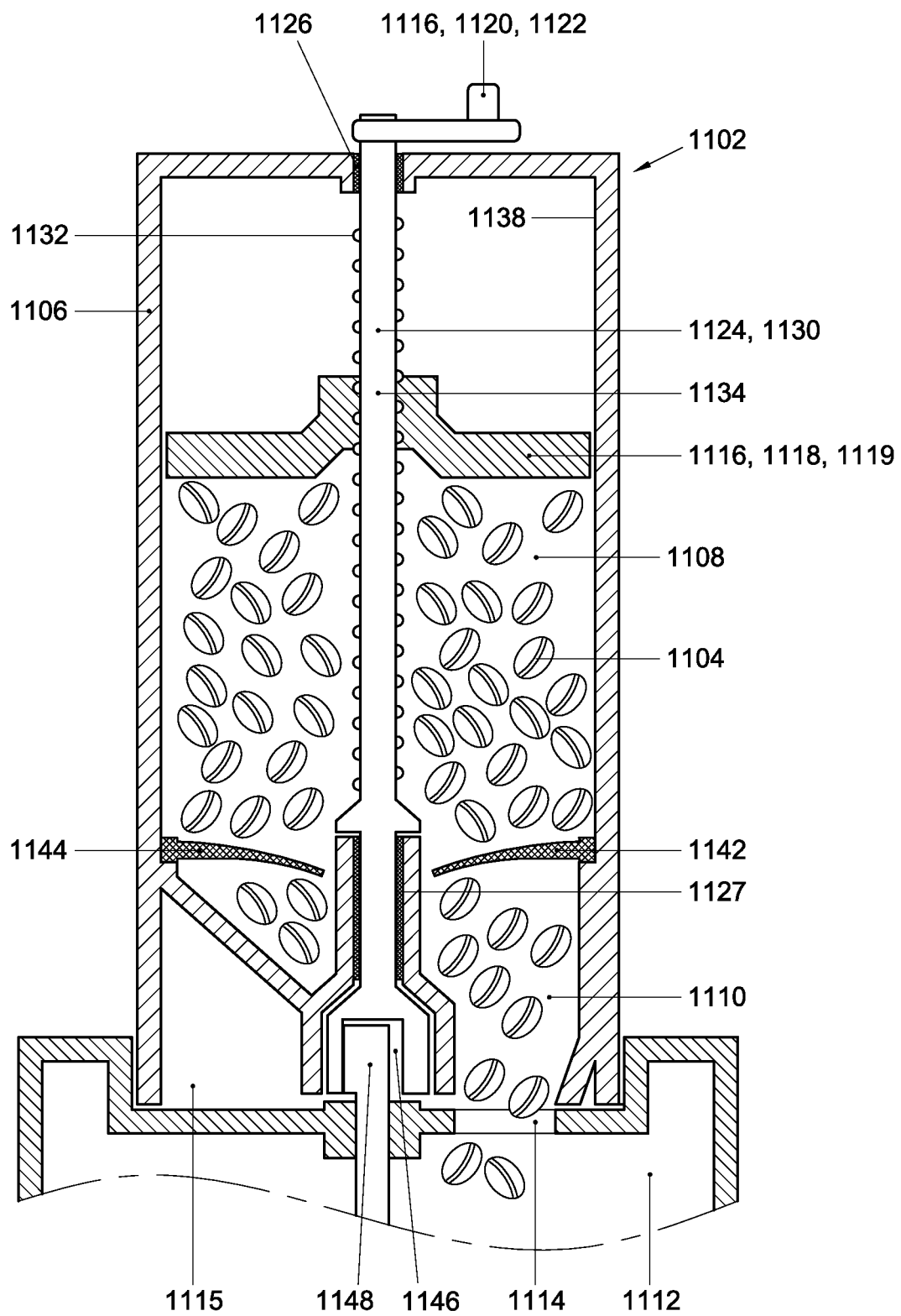
FIG. 11C shows a variation of the second coffee bean packaging cartridge according to the first aspect.

The second coffee bean packaging cartridge 1102 may further include a blocking element, such as a ridge, 1136 for substantially preventing movement of the moveable structure 1118 inside the interior volume 1108 in a direction transverse to an axis of rotation of the rotatable element. In this example, the blocking element is formed as the ridge 1136 that is rigidly attached to an interior side 1138 of the housing 1106. The ridge 1136 may extend along the interior side 1138 of the housing 1106, in a direction approximately parallel with the rotatable axle 1124. In use the ridge 1136 may engage with a notch 1140 in the plunger 1119. FIG. 11B shows the notch 1140, the plunger 1119, and the ridge 1136, and the housing 1106 in a cross-section A-A'. It may be clear however that the blocking element can be left out if the housing 1106 and the plunger 1119 have a rectangular shape, or if, more in general, the moveable structure 1118 and the housing 1106 are shaped for preventing movement of the moveable structure 1118 with respect to the housing 1106 in a direction transverse to a direction in which the conveyor screw 1130 extends.

The second coffee bean packaging cartridge 1102 may be provided with a valve 1142 for forming a barrier that hinders passage of the coffee beans 1104 towards the outlet 1110. The valve 1142 may be located inside the interior volume 1108. The valve 1142 may include one or more, e.g. a plurality of, flexible elements 1144 that are deformed when the valve 1142 is opened. The flexible elements 1144 may include an elastic material, for example rubber. By means of the valve 1142, the downward force that can be applied on the coffee beans 1104 by means of the plunger 1119, can in use at least partly be counteracted. The valve 1142 thus increases possibilities for control of the supply of the coffee beans 1104, as the valve 1142 may prevent uncontrolled movement of the coffee beans 1104 towards the outlet 1110.

The second coffee bean packaging cartridge 1102 may be provided with a recess 1146 in the housing 1106 for receiving an external drive member 1148 of the external apparatus 1112. In the first example, the housing 1106 is closed in the recess 1146. In FIG. 11A, the external drive member 1148 is received in the recess 1146. From FIG. 11A, it may be clear that the recess 1146 may be dimensioned for preventing mechanical contact between the second coffee bean packaging cartridge 1102, in particular the housing 1106 of the second coffee bean packaging cartridge 1102, and the external drive member 1148. In this way it is enabled that the second coffee bean packaging cartridge 1102 may be used in combination with the external apparatus 1112 that is provided with the external drive member 1148, while the second coffee bean packaging cartridge 1102 can also be used in combination with another external apparatus that is not provided with the external drive member 1148.

FIG. 11A also shows that the transportation means 1116, in particular the rotatable axle 1124, may be positioned for preventing, in use, mechanical contact with the external drive member 1148. E.g. in FIG. 11A an end of the rotatable axle 1124, which in this example is located in the second bearing 1127, is spaced apart from the recess 1146. In this way driving of the transportation means 1116 by means of the external drive member 1148 may be prevented. However, in a variation of the second coffee bean packaging cartridge 1102 in the first example shown in FIG. 11C, the transportation means 1116, in particular the rotatable axle 1124, may be positioned for establishing, in use, driving of the transportation means 1116 by means of the external drive member 1148. In the variation shown in FIG. 11C, the rotatable axle 1124 and the external drive member 1148 in use make mechanical contact. This enables driving of the rotatable axle 1124 by means of both the manually operable actuation means 1120 and the external drive member 1148.

Figure 12:
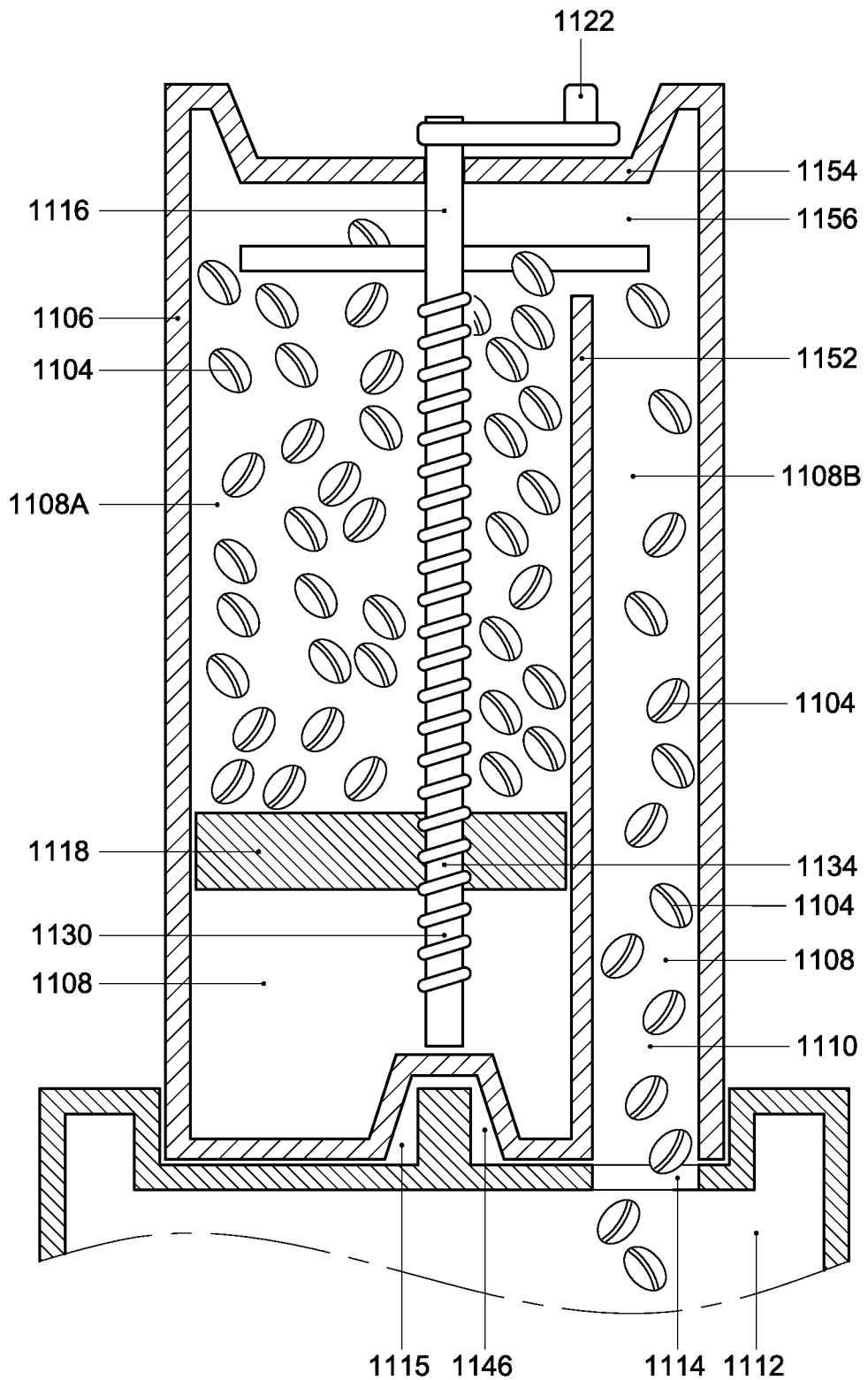
FIG. 12 shows in cross-section a second coffee bean packaging cartridge for holding and supplying coffee beans according to a second aspect of the first embodiment of the invention.

FIG. 12 shows in cross-section a second coffee bean packaging cartridge 1102 for holding and supplying coffee beans, e.g. the coffee beans 1104, according to a second aspect of the first embodiment. The second coffee bean packaging cartridge 1102 is provided with the housing 1106, the transportation means 1116, the moveable structure 1118, and the outlet 1110.

In the second example, the second coffee bean packaging cartridge 1102 may be provided in the interior volume 1108 with an internal wall 1152. The internal wall 1152 may be spaced apart from, in use, a top part 1154 of the housing 1106. Similar to the first example, the transportation means 1116 are provided with the conveyor screw 1130 provided in the threaded bore 1134 of the moveable structure 1118. By rotating the conveyor screw 1130 by means of the crank handle 1122, the moveable structure 1118 can be moved, in use, upwards. The transportation means 1116 are thus arranged for moving the coffee beans 1104 through a space 1156 between the, in use, top part 1154 of the housing 1106 and the internal wall 1152. Such moving through the space 1156 may occur if the coffee beans 1104 are lifted high enough by means of the moveable structure 1118. As a result of vibrations or sideward instability of the lifted pile of coffee beans 1104 that are not supported anymore by the internal wall 1152, coffee beans 1104 may move sideward over the internal wall 1152.

FIG. 12 further illustrates that the internal wall 1152 may separate a first part 1108A of the interior volume 1108 from a second part 1108B of the interior volume 1108. The moveable structure 18 may be arranged in the first part 1108A of the interior volume 1108. The outlet 1110 may be accessible via the second part 1108B of the interior volume 1108.

Figure 13:
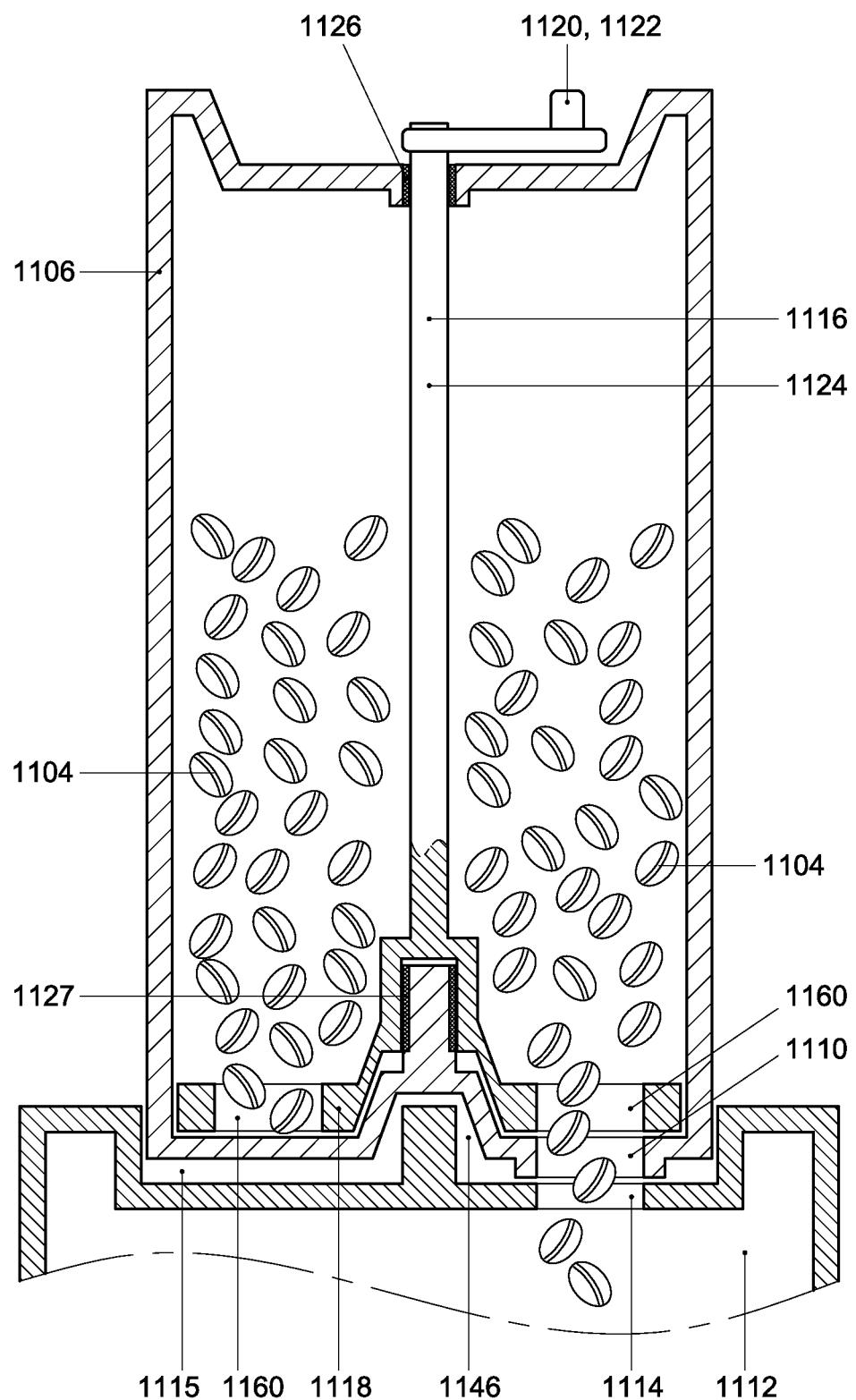
FIG. 13 shows in cross-section a second coffee bean packaging cartridge for holding and supplying coffee beans according to a third aspect of the first embodiment of the invention.

FIG. 13 shows in cross-section a second coffee bean packaging cartridge 1102 for holding and supplying coffee beans, e.g. the coffee beans 1104, according to a third aspect of the first embodiment. The second coffee bean packaging cartridge 1102 is provided with the housing 1106, the transportation means 1116, the moveable structure 1118, and the outlet 1110.

In the third example, the moveable structure 1118 may be rigidly connected to the rotatable element, e.g. the rotatable axle 1124. The moveable structure 1118 may e.g. be shaped like a disk. The moveable structure 1118 may be provided with at least one first aperture 1160 for letting the coffee beans 1104 pass there through. In FIG. 13, two first apertures 1160 are visible. A total amount of first apertures 1160 may be in a range from 1 to 6, in a range from 7 to 15, and/or larger than 15.

The second coffee bean packaging cartridge 1102 may be provided with at least one second aperture that is positioned, in use, above or below the at least one first aperture 1160 and that offers entrance to the outlet 1110. As a result of rotating the rotatable axle 1124, the at least one aperture can be aligned with the at least one second aperture. Then, coffee beans 1104 can fall through both the at least one first and the at least one second aperture. By further rotating the rotatable axle 1124, alignment of the at least first and the at least second apertures can, at least partly be cancelled. In this way supply of the coffee beans 1104 can be stopped. Thus, rotating the rotatable axle 1124 enables control of the supply of the coffee beans 1104.

In this example, the second aperture is formed by the outlet 1110, in use located below the first apertures 1160. However, alternatively, the at least one second aperture may be spaced apart from the outlet 1110. More in general, a total amount of the second apertures may be approximately equal to a total amount of the first apertures 1160. It may thus be clear that the outlet 1110 may include a plurality of apertures, which may or may not be mutually interconnected.

Figure 14A:
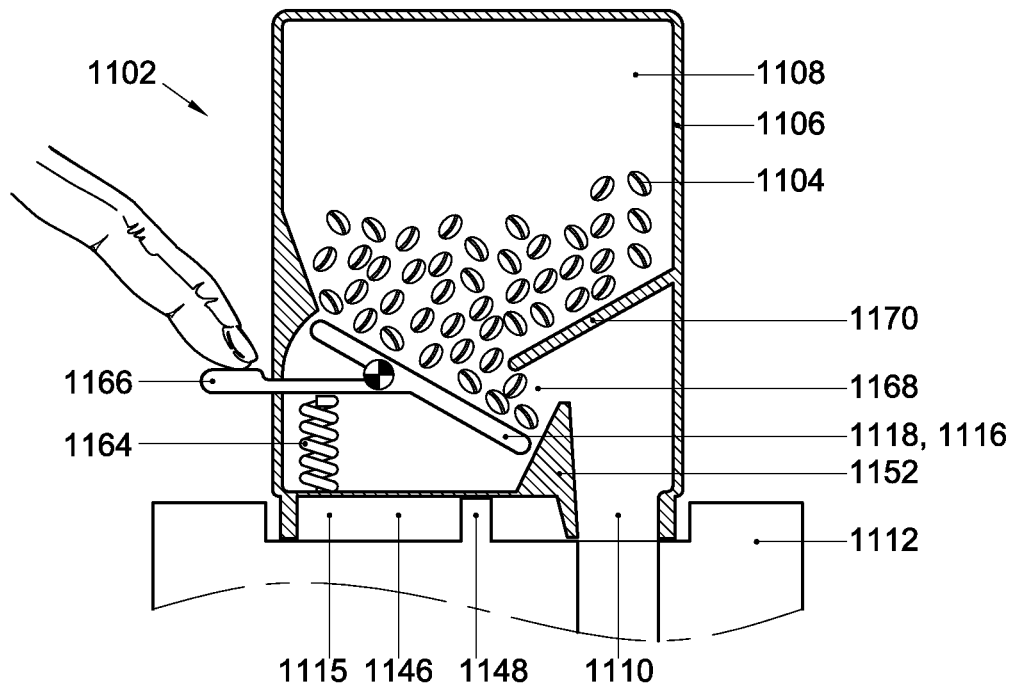
FIG. 14A shows in cross-section a second coffee bean packaging cartridge for holding and supplying coffee beans according to a fourth aspect of the first embodiment of the invention, with a moveable structure in a first position.
Figure 14B:
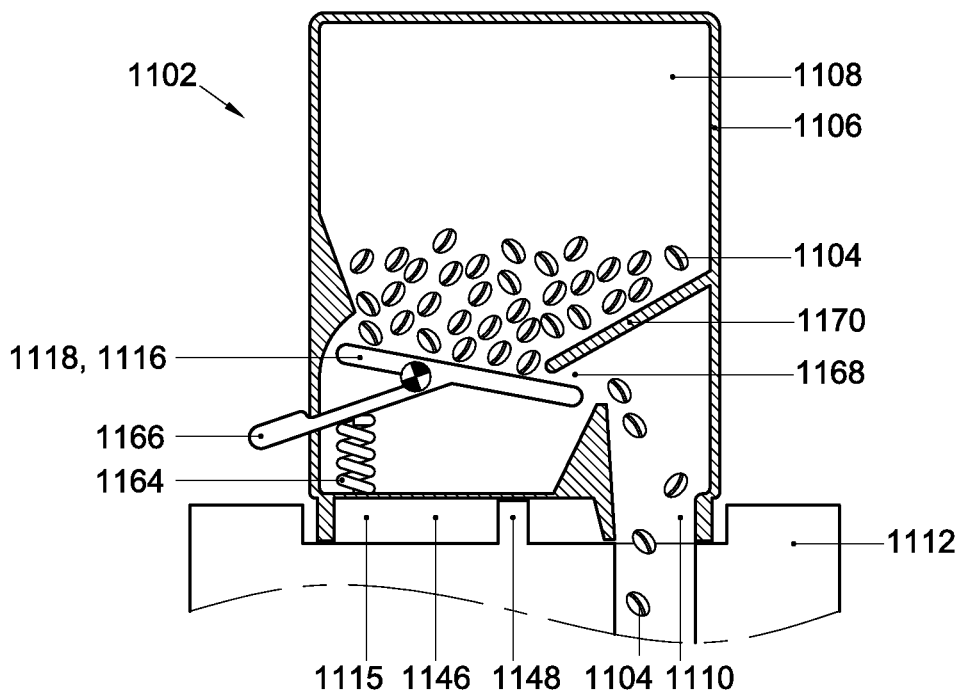
FIG. 14B shows in cross-section the second coffee bean packaging cartridge for holding and supplying coffee beans according to the fourth aspect of the first embodiment of the invention, with the moveable structure in a second position.

FIGS. 14A and 14B shows in cross-section a second coffee bean packaging cartridge 1102 for holding and supplying coffee beans, e.g. the coffee beans 1104, according to a fourth aspect of the first embodiment. The second coffee bean packaging cartridge 1102 is provided with the housing 1106, the transportation means 1116, the moveable structure 1118 of the transportation means 1116, and the outlet 1110.

In the fourth example, the moveable structure 1118 is resiliently attached to the second coffee bean packaging cartridge 1102 by means of a resilient member, here an elastic spring 1164. The moveable structure 1118 is moveable by means of the manually operable actuation means 1120, here comprising a lever 1166, repeatably from a first position to a second position and vice versa.

FIG. 14A shows the second coffee bean packaging cartridge 1102 in the fourth example with the moveable structure 1118 in the first position. FIG. 14B shows the second coffee bean packaging cartridge 1102 in the fourth example with the moveable structure 1118 in the second position. It may thus be clear that, by moving the moveable structure 1118 from the first position to the second position, the spring 1164 may be resiliently deformed.

The second coffee bean packaging cartridge 1102 in FIGS. 14A and 14B is provided in the interior volume 1108 with a passage 1168 for the coffee beans towards the outlet 1110. The passage 1168 may be formed by the internal wall 1152 and an additional wall 1170 that extends from the housing 1106 into the interior volume 1108. In this example, in the second position the passage 1168 is at least partly obstructed, in this example substantially completely obstructed, i.e. substantially blocked, by the moveable structure 1118. In this example, in the first position the passage 1168 is obstructed less by the moveable structure 1118 than in the second position. In this example, in the first position the passage 1168 is not obstructed by the moveable structure 1118. In a variation however, the first and second position may be reversed, so that in the first position the passage 1168 is at least partly obstructed by the moveable structure 1118 and in the second position the passage 1168 is obstructed less by the moveable structure 1118 than in the first position or is not obstructed by the moveable structure 1118.

In the fourth example, the first position is located, in use, below the second position. In addition, at least part of the coffee beans 1104 is located, in use, above the moveable structure 1118. As a result, repeatedly moving the moveable structure 1118 from the first position to the second position and vice versa, may result in a shaking motion of at least part of the coffee beans 1104 that are located above the moveable structure 1118. Such a shaking motion may promote movement of the coffee beans through the interior volume 1108.

The second coffee bean packaging cartridge 1102 in one of the first, second, first, and fourth examples can be used in a method. The method includes supplying coffee beans, e.g. the coffee beans 1104, from the second coffee bean packaging cartridge 1102 to the external apparatus 1112. The method further includes holding the coffee beans 1104 in the housing 1106 that encloses the interior volume 1108 of the second coffee bean packaging cartridge 1102. The method further includes transporting the coffee beans 1104 by means of the transportation means 1116 towards the outlet 1110 of the housing 1106. The method further includes releasing the coffee beans 1104 through the outlet 1110 from the interior volume 1108. In the method, transporting the coffee beans 1104 includes contacting the coffee beans 1104 by means of the moveable structure 1118 of the transportation means 1116. Here, the moveable structure 1118 is, at least partly, present in the interior volume 1108. The method further includes actuating the moveable structure 1118 by means of the manually operable actuation means 1120 of the transportation means 1116. Here, the manually operable actuation means 1120 are, at least partly, provided outside of the interior volume 1108. It may be clear however that the method can also be carried out by other embodiments of the second coffee bean packaging cartridge 1102. Alternatively, the method may be carried out without making use of the second coffee bean packaging cartridge 1102 in one of the example or variations described.

Figure 15A:
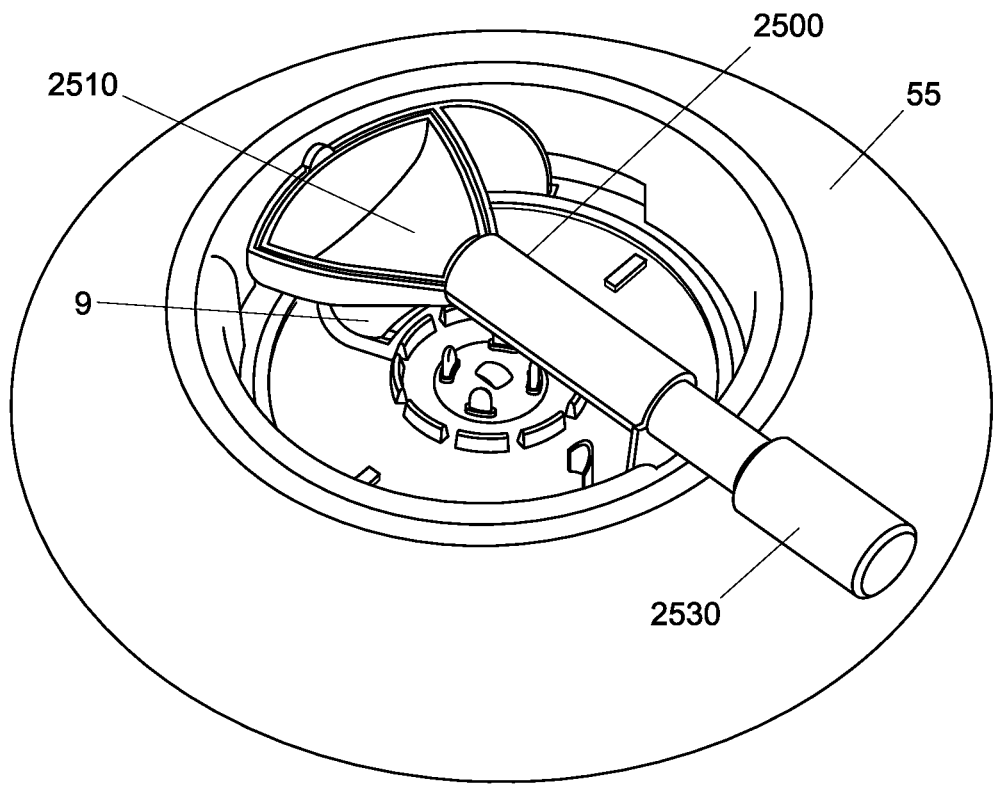
FIG. 15A shows a perspective view of a second coffee bean packaging cartridge according to a second embodiment of the invention mounted to the coffee brewing apparatus.
Figure 15B:
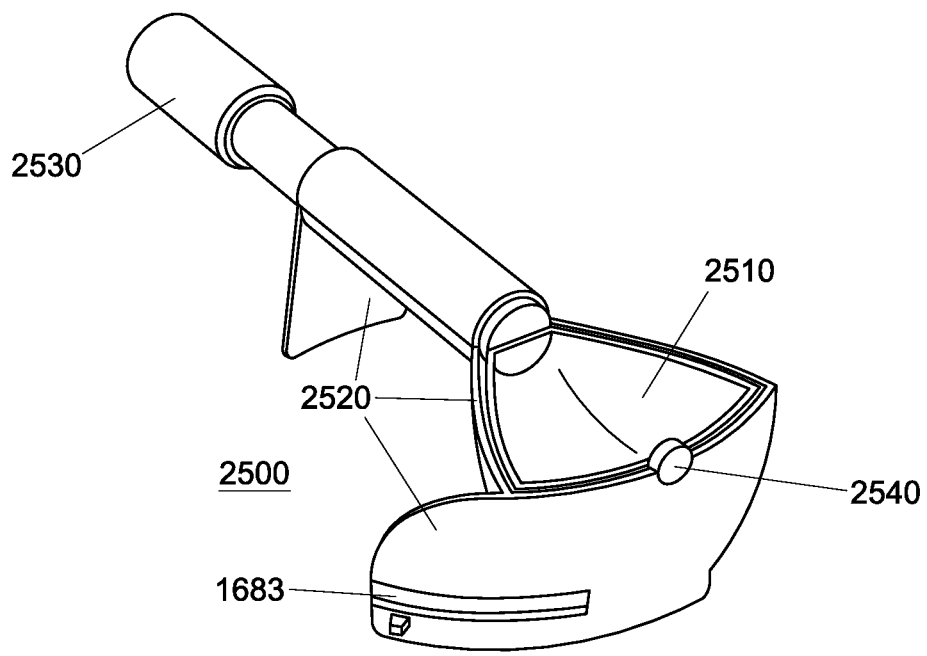
FIG. 15B shows a perspective view of the second coffee bean packaging cartridge shown in FIG. 15A disconnected from the coffee brewing apparatus.

A second embodiment of a second coffee bean packaging cartridge that can be connected to the coffee brewing apparatus (or in addition another external apparatus) will be described now with reference to FIGS. 15A-15D. As shown in FIGS. 15A and 15B the second coffee bean packaging cartridge 2500 comprises a scooper 2510 for holding and supplying the coffee beans 1140. The second coffee bean packaging cartridge 2500 comprises furthermore a body 2520 having bayonet elements (only one bayonet element 1683 is shown) for connecting the second coffee bean packaging cartridge 2500 to the coffee brewing apparatus 4 by placing the bayonet elements in the openings 58 in the side wall 54 of the recess 50 and rotating the second coffee bean packaging cartridge 2500 to its final position. In this final position, the scooper 2510 is aligned with the entrance opening 9 of the coffee brewing apparatus 4. The second coffee bean packaging cartridge 2500 comprises a handle 2530 for manually turning the scooper. The scooper 2510 is connected to the body by mans of a pivot 2540, enabling the scooper 2510 to rotate around a horizontal axis by actuating the handle 2530. Please note that throughout this description cartridge is intended to also encompass 'holder' so that the scooper which can hold an amount of coffee beans is also identified as cartridge.

Figure 15C:
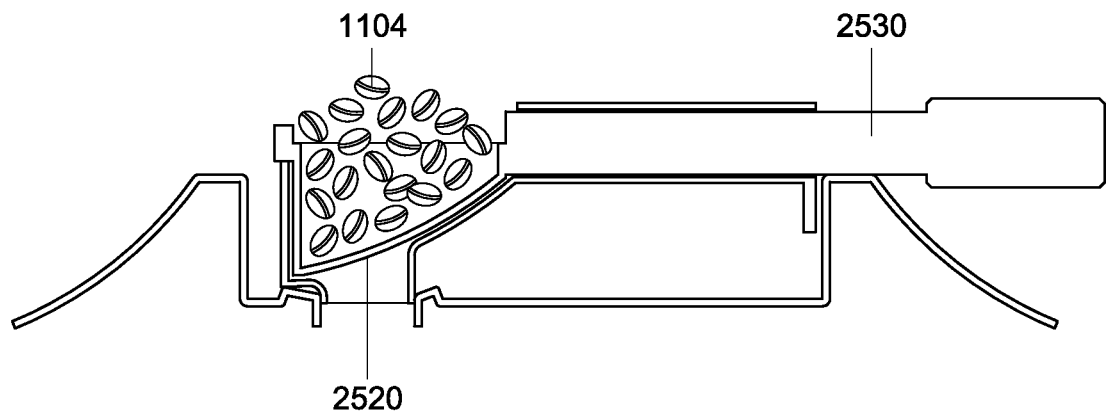
FIG. 15C shows in cross section the second coffee bean packaging cartridge shown in FIG. 15A holding coffee beans.
Figure 15D:
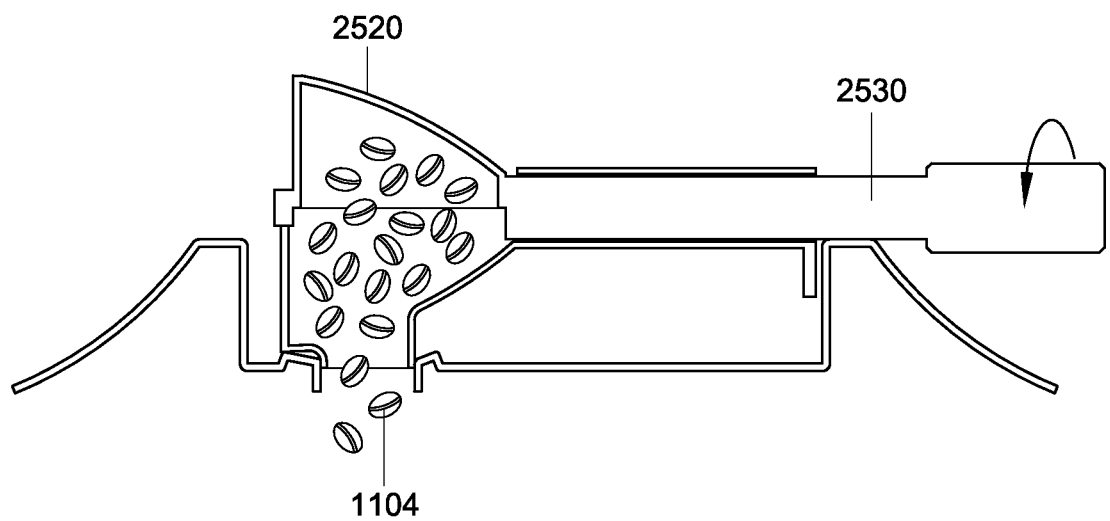
FIG. 15D shows in cross section the second coffee bean packaging cartridge shown in FIG. 15A supplying coffee beans to the coffee brewing apparatus.

FIG. 15C shows the scooper 2510 in its upright position holding a dose of coffee beans 1104. The user may supply the coffee beans to the coffee brewing apparatus 4 by simply turning the handle 2530 half, thereby emptying the scooper 2510 as shown in FIG. 15D. So, the scooper works as transportation means for transporting the coffee beans towards the coffee bean entrance 9 of the brewing apparatus 4.

Figure 16A:
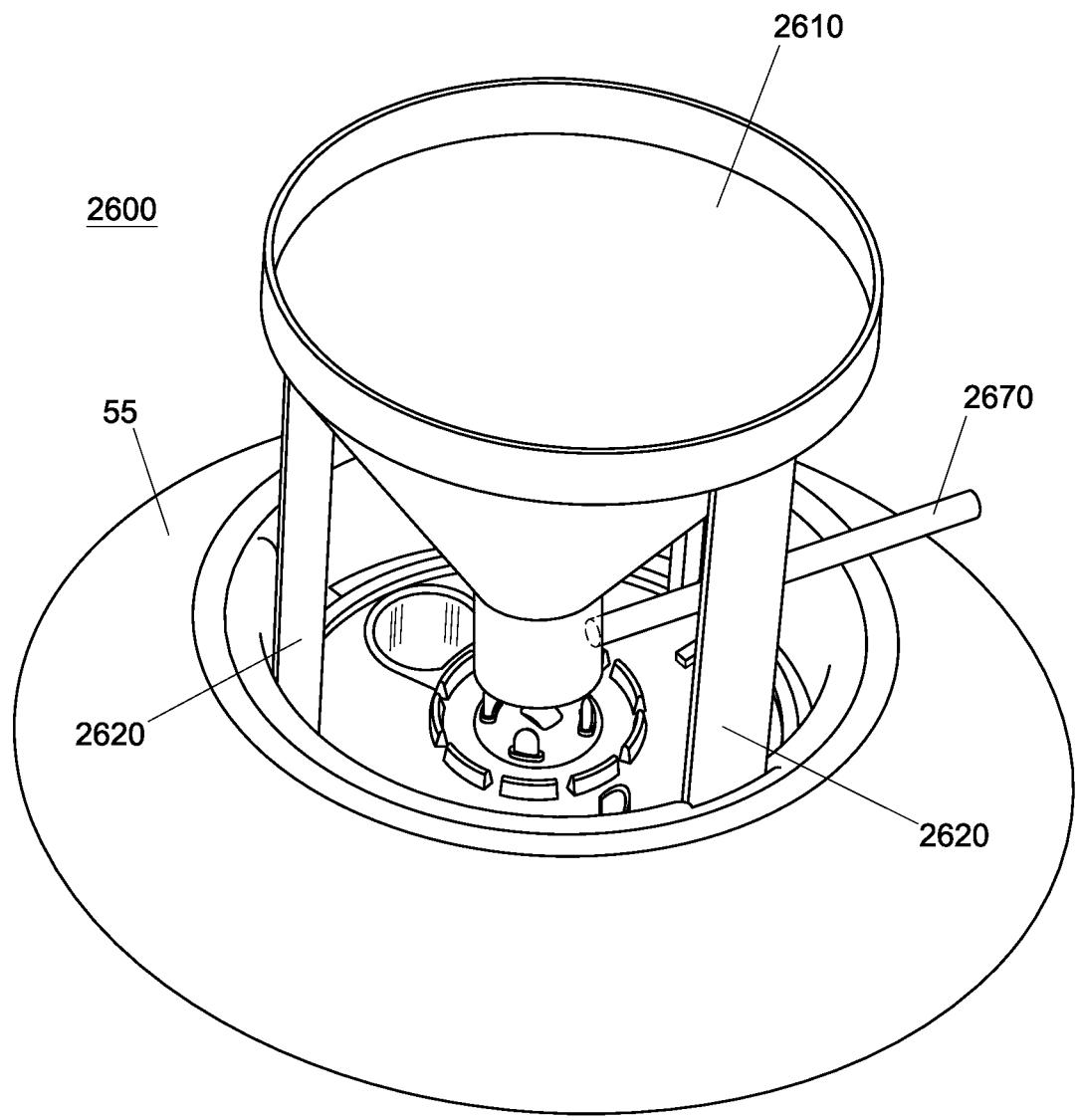
FIG. 16A shows a perspective view of a second coffee bean packaging cartridge according to a third embodiment of the invention mounted to the coffee brewing apparatus.
Figure 16B:
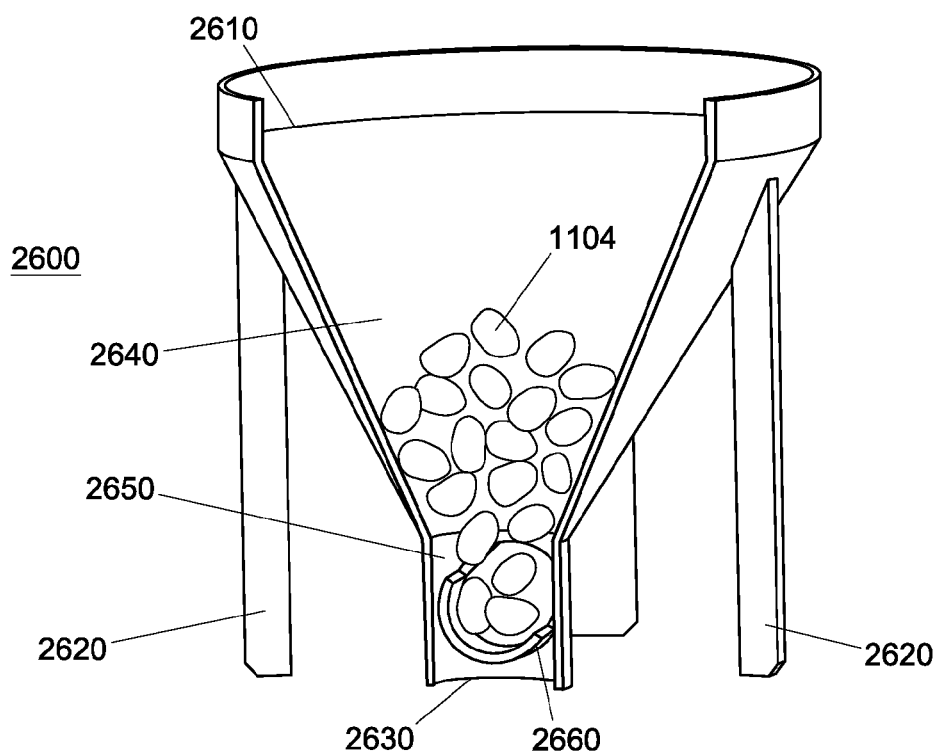
FIG. 16B shows the second coffee bean packaging cartridge shown in FIG. 16A holding coffee beans.
Figure 16C:
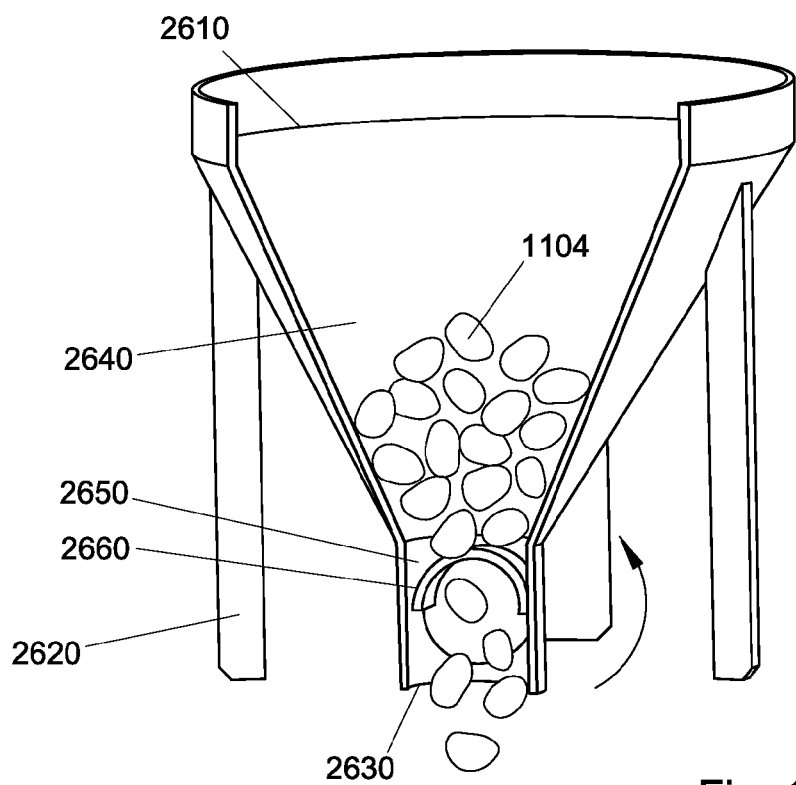
FIG. 16C shows the second coffee bean packaging cartridge shown in FIG. 16A supplying coffee beans to the coffee brewing apparatus.

A third embodiment of a second coffee bean packaging cartridge that can be connected to the coffee brewing apparatus will be described now with reference to FIGS. 16A-16C. As shown in FIG. 16A, the second coffee bean packaging cartridge 2600 comprises a hopper 2610 for holding coffee beans 1104 inserted by a user. The second coffee bean packaging cartridge 2600 comprises a plurality of legs 2620. Some or all of the legs are provided with a bayonet element (not shown) for connecting the second coffee bean packaging cartridge 2600 to the coffee brewing apparatus 4 by placing the bayonet elements in the openings 58 and subsequently rotating the second coffee bean packaging cartridge, as described herein above. When the second coffee bean packaging cartridge 2600 is in its final position an outlet 2630 of the hopper 2600, as shown in FIGS. 16B and 16C is aligned with the coffee bean entrance 9 of the coffee brewing apparatus 4. The transportation means comprise a closure plate 2660, which is manually rotatable around a horizontal axis by means of manually operable actuation means, such as a handle 2670. The closure plate forms a part, of a virtual cylinder, preferably approximately half of it. The other part of the virtual cylinder is open. In a first position as shown in FIG. 16B, the closure plate closes or substantially closes the outlet 2630, thereby hindering the passage of coffee beans 1104 from the hopper 2610 to the coffee brewing apparatus 4. In a second position as shown in FIG. 16C, the closure plate 2660 delimits or substantially delimits a first broader part 2640 of the interior volume of the hopper 2610 from a second narrower part 2650 of the interior volume of the hopper 2610. Thereby the passage of the coffee beans 1104 from the first part 2640 to the second part 2650 is hindered.

By rotating the closure plate between the first and the second positions the user can supply doses of coffee beans to the coffee brewing apparatus 4. Indeed, when the closure plate 2660 is in its first position as shown in FIG. 16B due to the gravity the coffee beans 1104 will enter the second part 2650 of the hopper. When the closure plate 2660 is rotated to its second position as shown in FIG. 16C, the coffee beans in the second part 2650 of the hopper due to the gravity will fall into the coffee brewing apparatus 4. So, one dose of coffee beans 1104 corresponds to the coffee beans that are held in the second part 2650 of the interior volume of the hopper 2610.

Figure 17A:
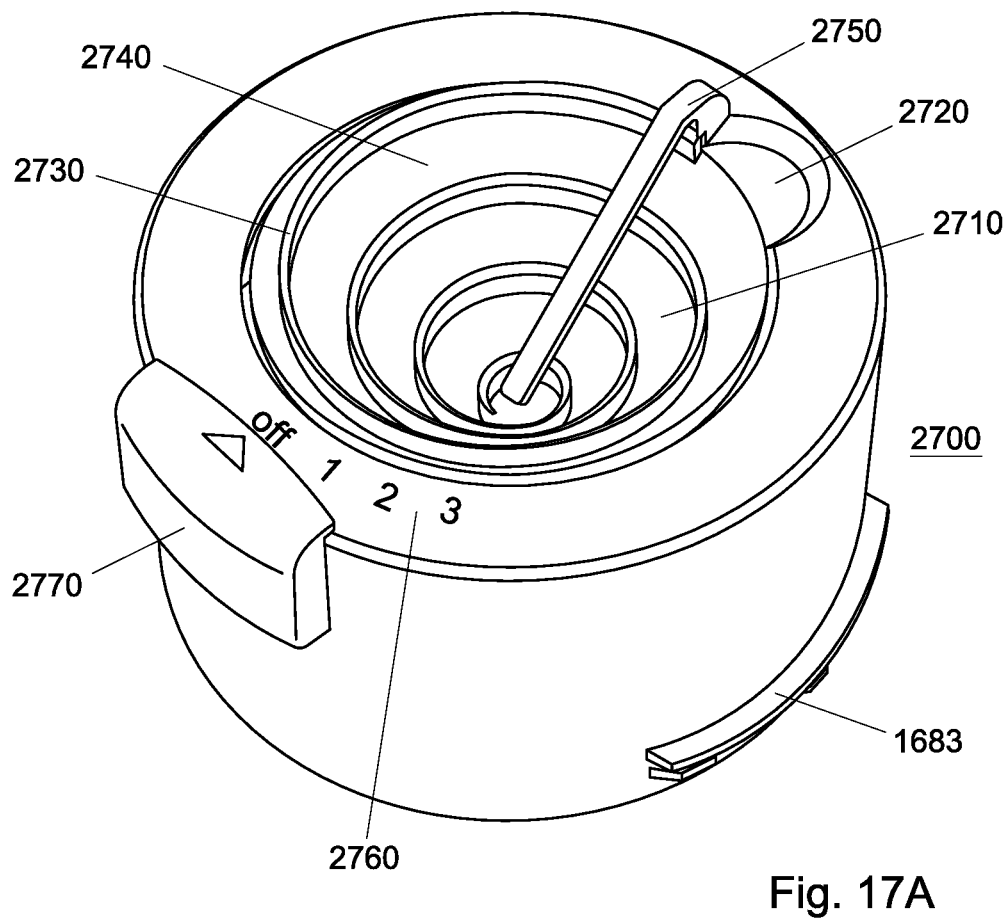
FIGS. 17A and 17B show two different perspective views of a second coffee bean packaging cartridge according to a fourth embodiment of the invention.
Figure 17B:
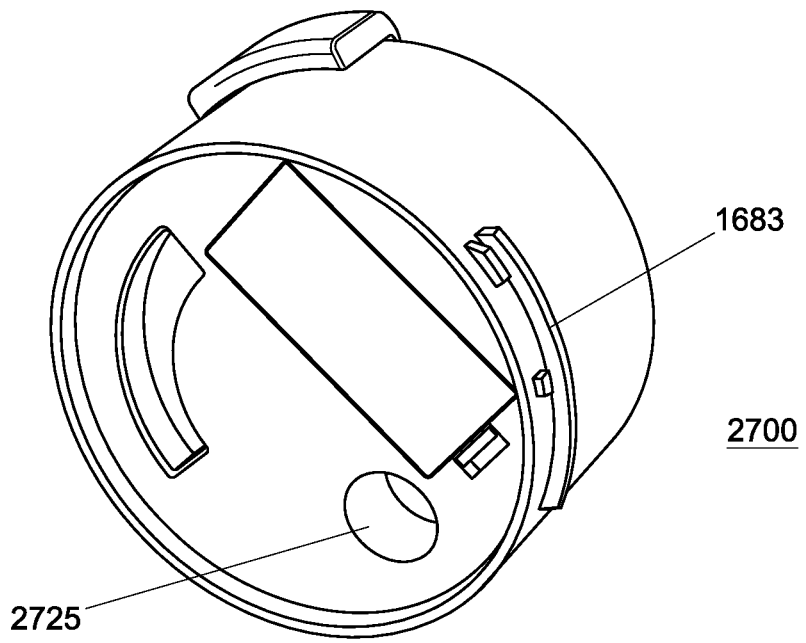
Figure 17C:
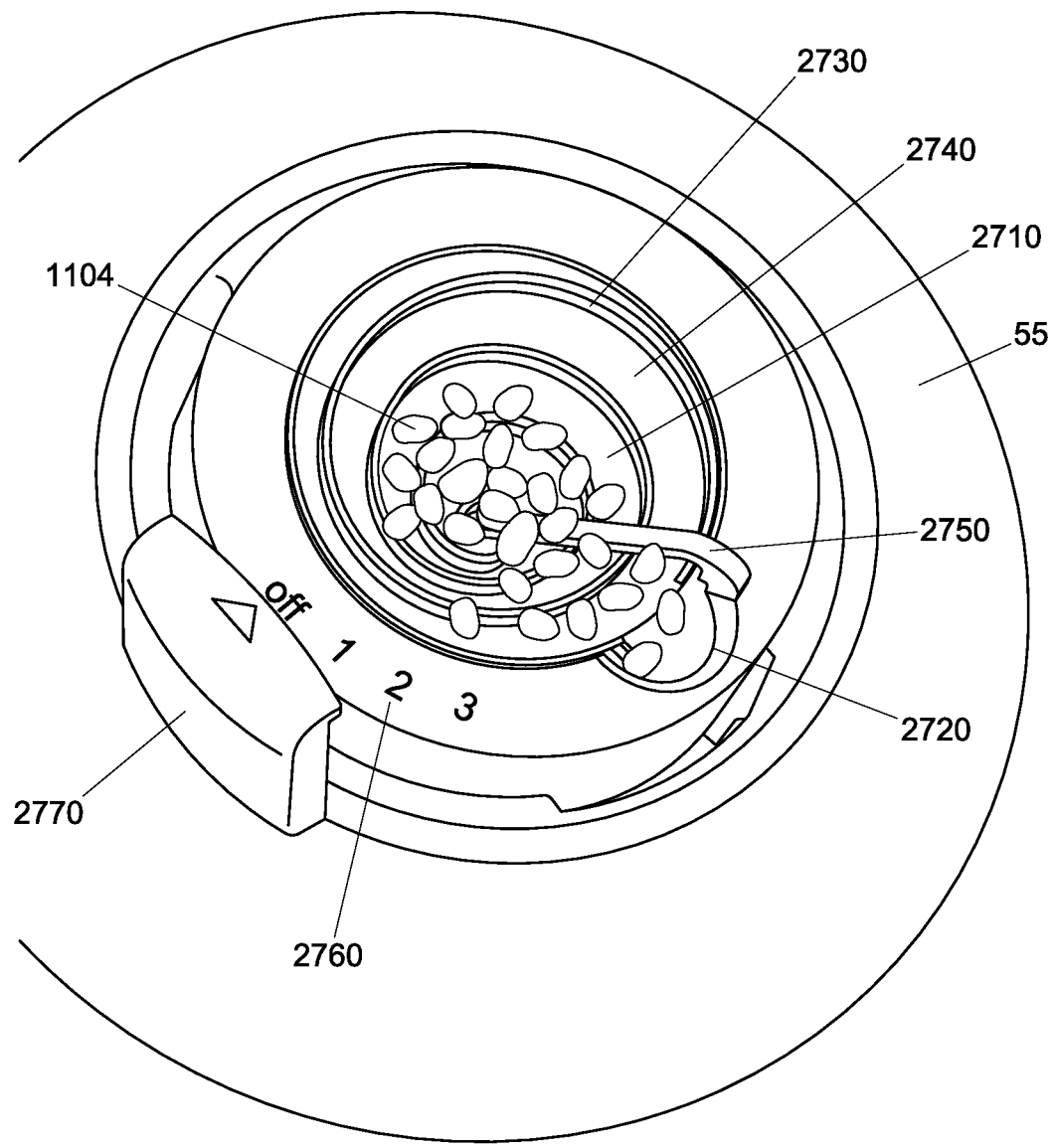
FIG. 17C shows how, in use, the coffee beans are supplied by the second coffee bean packaging cartridge shown in FIGS. 17A and 17B to the coffee brewing apparatus.

A fourth embodiment of a second coffee bean packaging cartridge that can be connected to the coffee brewing apparatus will be described now with reference to FIGS. 17A-17C. As shown in FIG. 17A, the second coffee bean packaging cartridge 2700 comprises a funnel shaped holder 2710 for holding the coffee beans. The second coffee bean packaging cartridge comprises an upper outlet 2720 at the upper end of the funnel shaped holder 2710, which upper outlet is connected by a tube (not shown) to a lower outlet 2725 (see FIG. 17B) for releasing the coffee beans 1104 from the holder. The second coffee bean packaging cartridge 2700 can be connected to the coffee brewing apparatus 4 by placing the bayonet elements (only one of them 1683 is shown in FIG. 17B) in the openings 58 and subsequently rotating the second coffee bean packaging cartridge, as described herein above. When the second coffee bean packaging cartridge 2700 is in its final position, the outlets 2720 and 2725 are aligned with the coffee bean entrance opening 9 of the coffee brewing apparatus 4. The transportation means consist of a spiral-shaped trajectory 2740 on the inner wall of the funnel shaped holder. The spiral shaped trajectory 2740 is obtained by a spiral-shaped edge 2730 protruding from the inner wall. The funnel shaped holder 2710 is, in use, rotated, as shown in FIG. 17C. A non-moving block element 2750 impedes the coffee beans to continue rotating on the inner wall. As a result, because the spiral shaped trajectory continues to be rotated, the coffee beans are driven to follow the spiral shaped trajectory 2740 upwards towards the outlet 2720.

Preferably, the actuation means for rotating the holder 2710 are formed by a battery operated motor, although in principle also manually operable actuation means may be used. The rotation of the holder may be initiated by moving the drive clutch 2770 to a position 2760, corresponding to the desired rotation speed. By selecting the rotation speed, the user can select the amount of coffee beans supplied to the coffee brewing apparatus and thereby adjust the coffee strength.

Alternatively, the operation of the motor may be initiated and ended, automatically by detecting the start and stop of the grinder in the coffee brewing apparatus 4. The detection may be implemented by means, known per se detecting the sound of the grinder or the vibration thereof. In this way, the coffee brewing apparatus is supplied with coffee beans as long as the grinder thereof is working.

According to a fifth embodiment of the invention, the first and/or the second coffee bean packaging cartridge comprises a first module, which is a coffee bean package and a second module, which comprises a motor. The first module is removably connectable to the coffee brewing apparatus and the second module is removably connectable to the first module, when the first module is connected to the coffee brewing apparatus. This embodiment will now be described with reference to the second coffee bean packaging cartridge as shown in FIGS. 18A-18F, but is also applicable to a first coffee bean packaging cartridge.

Figure 18A:
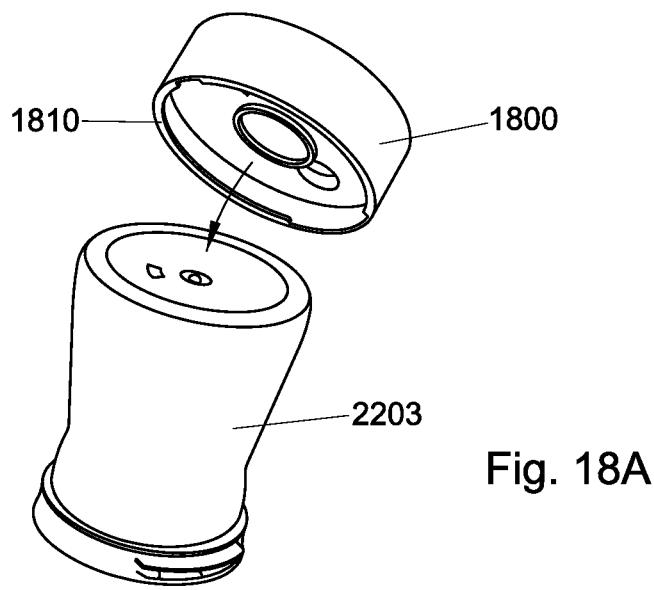
FIG. 18A shows in perspective view how a first module and a second module of a second coffee bean packaging cartridge according to a fifth embodiment of the invention should be connected to each other in a coffee bean supply mode.
Figure 18B:
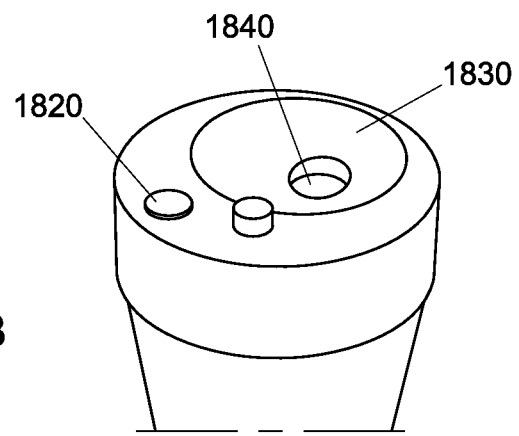
FIG. 18B shows a perspective view of the second coffee bean packaging cartridge shown in FIG. 18A with the first and the second module thereof connected to each other in the coffee bean supply mode.
Figure 18C:
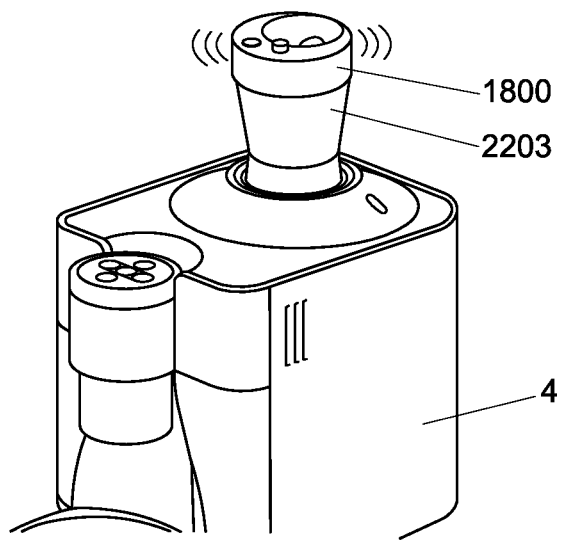
FIG. 18C shows a perspective view of the second coffee bean packaging cartridge shown in FIG. 18A mounted to the coffee brewing apparatus.

As shown in FIG. 18A, a second coffee bean packaging cartridge comprises a first module 2203 being a coffee bean package or container. A second module 1800 is removably connectable to the upper side of the first module 2203 by attaching an element 1810 thereto. When the second module 1800 is connected to the upper side of the first module 2203, the second coffee bean packaging cartridge is in a coffee bean supply mode. The second module comprises a batter driven unit with a vibration motor, similar to the ones used in mobile telephones. When the second module 1800 is placed on the first module 2203 as shown in FIG. 18B, the motor may be switched on by means of button 1820. The shaking or vibration of the second module encourages the coffee beans present in the first module 2203 to flow towards the outlet thereof, resulting in the supply of the coffee beans to the coffee brewing apparatus 4, as shown in FIG. 18C.

Figure 18D:
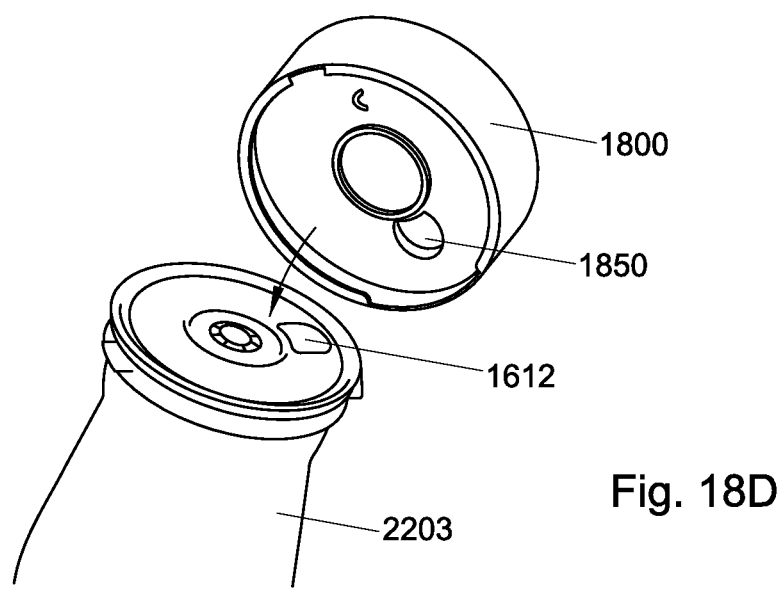
FIG. 18D shows in perspective view how the first module and the second module of a second coffee bean packaging cartridge shown in FIG. 18A should be connected to each other in a coffee bean refill mode.
Figure 18E:
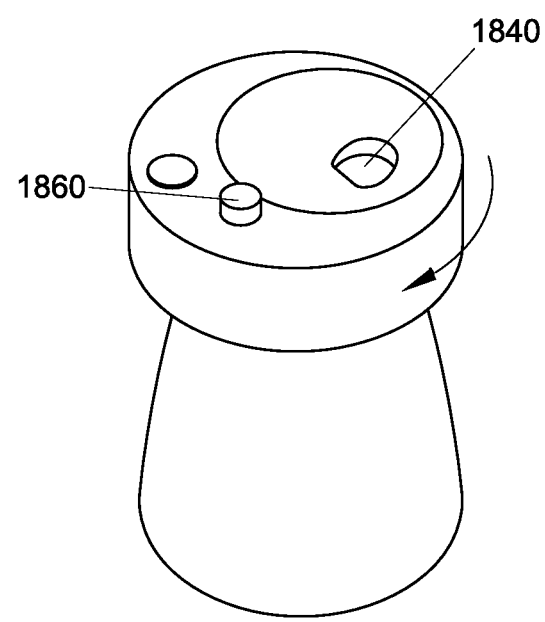
FIG. 18E shows a perspective view of the second coffee bean packaging cartridge shown in FIG. 18A with the first and the second module thereof connected to each other in the coffee bean refill mode.
Figure 18F:
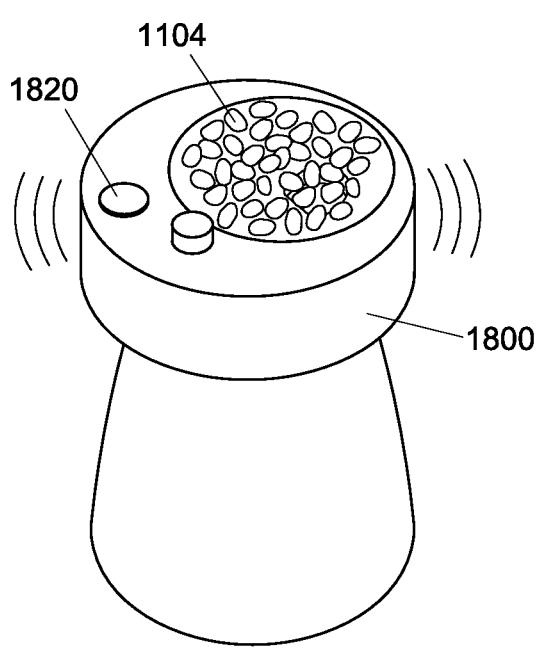
FIG. 18F shows how the second coffee bean packaging cartridge is refilled with coffee beans.

In order to bring the second coffee bean packaging cartridge in a coffee bean refill mode, the first module 2203 should be detached from the coffee brewing apparatus 4 and the second module should be connected to the bottom side of the first module, as shown in FIG. 18D. As described herein above, the outlet 1612 of the first module 2203 is open, when it is connected to the coffee brewing apparatus 4 and closed when it is disconnected. By connecting the second module in the coffee beans refill mode to the first module in the same or a similar way as the coffee brewing apparatus, the outlet of the first module 2203 may be opened and used refilling the cartridge with coffee beans. Thereto, the second module 1800 comprises a funnel shaped part 1830, for supplying the coffee beans by the user and a coffee bean inlet 1840. It furthermore comprises a coffee bean outlet 1850, which when the second module is connected to the first module 2203 in the coffee bean refill mode, is aligned with the outlet 1612 of the first module, which here has the function of coffee bean inlet. In order to connect the second module 1800 to the first module 2203, the user has to press button 1860, as shown in FIG. 18E. By turning the motor on, the coffee beans 1104 in the funnel shaped part 1830 are assisted into the first module 2203, as shown in FIG. 18F.

Figure 19A:
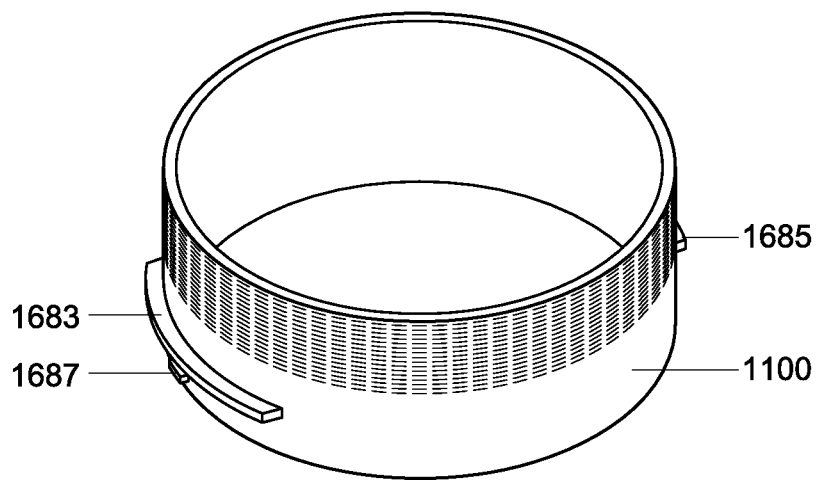
FIG. 19A shows an insert piece of a first type.
Figure 19B:
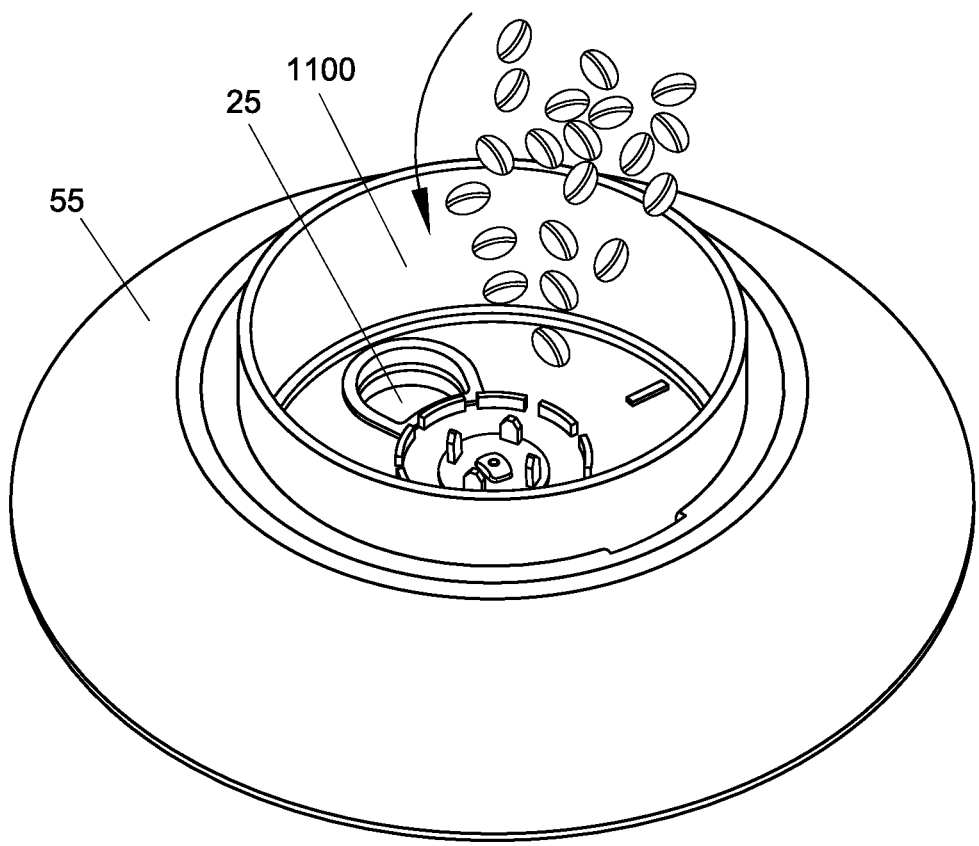
FIG. 19B shows the insert piece of FIG. 19A connected to the coffee brewing apparatus.

The system may further be provided with one or more insert pieces that can be connected to the coffee brewing apparatus in lieu of a coffee bean packaging cartridge. A first type of insert piece 1100 is depicted in FIG. 19A. It is a ring shaped element with at its outer surface the bayonet elements 1683, 1685 as well as the protruding part 1687 for activating the micro switch. It may be connected to the coffee brewing apparatus in the same way as a coffee bean packaging cartridge, i.e. by placing the bayonet elements in the corresponding openings 58 in the side wall 54 of the recess 50 in a initial position and then rotate the insert piece over 50 degrees until reaching the final position. When the insert piece is connected to the coffee brewing apparatus, the corresponding activation of the micro switch by the protruding part 1687 signals to the controller that a device is connected to the coffee brewing apparatus. The controller does not know if the activation of the micro switch is caused by a cartridge or by an insert piece. Therefore, when the insert piece 1100 is connected to the coffee brewing apparatus in the final position, as shown in FIG. 19B, the controller will activate the dosing, grinding and brewing processes, as if there were a coffee bean packaging cartridge connected to the brewing apparatus. So, the insert piece of the first type 1100 may be used to 'unlock' the coffee brewing apparatus.

In an alternative embodiment the insert piece may be a ring shaped element as described above which is integrally provided with a funnel which, when the insert piece is connected to the brewing apparatus, allows a user to manually feed coffee beans or ground coffee into the funnel.

Figure 20A:
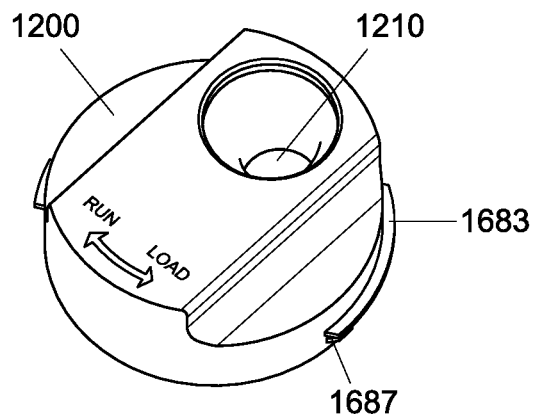
FIG. 20A shows an insert piece of a second type.
Figure 20B:
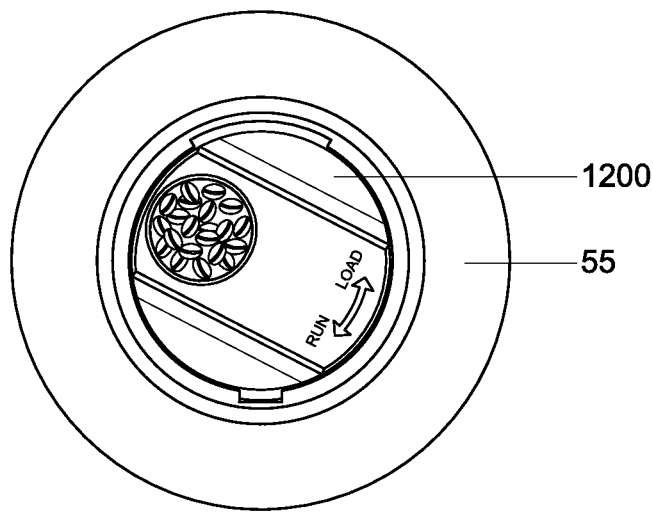
FIG. 20B shows the insert piece of FIG. 20A connected to the coffee brewing apparatus in an entry position.
Figure 20C:
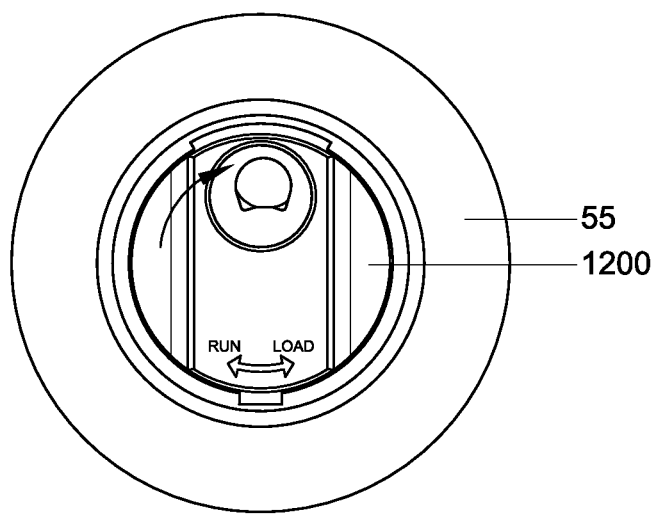
FIG. 20C shows the insert piece of FIG. 20A connected to the coffee brewing apparatus in a final position.

FIG. 20A shows a second type of insert piece 1200 that can be connected to the coffee brewing apparatus. It comprises a cavity 1210 with a size corresponding to a single dose of coffee beans. The insert piece comprises a closure member and closure disk arranged in the same way as in the coffee bean packaging cartridge, as described herein above. When the insert piece is placed in the recess with the bayonet elements in the initial position as shown in FIG. 20B, the cavity 1220 is closed at its bottom. In this position the user fills the cavity with coffee beans, preferably with round compressed beans or coated compresses ground beans, because the flow easily. Then the insert piece 1200 is rotated by the user to its final position as shown in FIG. 20C, thereby opening the coffee bean outlet of the cavity and aligning it with the coffee bean entry of the coffee brewing apparatus. As a result, the single dose of coffee beans falls into the coffee brewing apparatus and can be ground.

It is thus believed that the operation and construction of the present invention will be apparent from the foregoing description. The invention is not limited to any embodiment herein described and, within the purview of the skilled person; modifications are possible which should be considered within the scope of the appended claims.

Similarly all kinematic inversions are considered inherently disclosed and to be within the scope of the present invention. The term "comprising" when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A coffee beverage system, including a coffee brewing apparatus and a first coffee bean packaging cartridge, wherein the first coffee bean packaging cartridge is removably connected to the coffee brewing apparatus, the first coffee bean packaging cartridge being filled with coffee beans and arranged for holding and supplying the coffee beans, the first coffee beans packaging cartridge including:

a first coffee bean packaging cartridge container comprising an first coffee bean packaging cartridge interior volume and at least one first coffee bean packaging cartridge exit opening defining a first coffee bean packaging cartridge coffee bean outlet, the first coffee bean packaging cartridge interior volume holding the coffee beans;

first coffee bean packaging cartridge transportation means adapted for enabling transportation of the coffee beans from the first coffee bean packaging cartridge interior volume towards the at least first coffee bean packaging cartridge exit opening of the first coffee bean packaging cartridge;

wherein the coffee brewing apparatus comprises an entrance opening for receiving the coffee beans which are transported with the aid of the first coffee bean packaging cartridge transportation means towards the at least one first coffee bean packaging cartridge exit opening, a grinder for grinding the coffee beans which have entered the coffee brewing apparatus via the entrance opening and a brewing device for brewing coffee on the basis of ground coffee obtained by means of the grinder, wherein the coffee beverage system is further provided with a metering chamber for receiving the coffee beans which are transported with the aid of the first coffee bean packaging cartridge transportation means into the metering chamber, wherein the metering chamber has a volume and comprises a bottom portion which forms a part of the grinder, said bottom portion being arranged in the coffee brewing apparatus for rotating around a first vertical axis extending in a vertical direction wherein the coffee beverage system is arranged such that upon activation of the grinder the bottom portion is rotating around the first vertical axis for transporting the coffee beans from the metering chamber into the grinder and for grinding the coffee beans;

a second coffee bean packaging cartridge which is also removably connectable to the coffee brewing apparatus, the second coffee bean packaging cartridge being filled with coffee beans and being arranged for being filled with and holding and supplying the coffee beans, the second coffee bean packaging cartridge including:

a second coffee bean partridge cartridge container comprising an second coffee bean packaging cartridge interior volume and at least one second coffee bean packaging cartridge exit opening defining a second coffee bean packaging cartridge coffee bean outlet, the second coffee bean packaging cartridge interior volume being arranged for holding the coffee beans;

second coffee bean packaging cartridge transportation means adapted for enabling transportation of the coffee beans from the second coffee bean packaging cartridge interior volume towards the at least one second coffee bean packaging cartridge exit opening of the second coffee bean packaging cartridge;

wherein the second coffee bean packaging cartridge is adapted to the coffee brewing apparatus so that, when the second coffee bean packaging cartridge is connected to the coffee brewing apparatus, the coffee beans which are transported with the aid of the second coffee bean packaging cartridge transportation means of the second coffee bean packaging cartridge towards the at least one second coffee bean packaging cartridge exit opening of the second coffee bean packaging cartridge are receivable by the coffee brewing apparatus via the entrance opening for preparing coffee, wherein the second coffee bean packaging cartridge transportation means of the second coffee bean packaging cartridge are configured to be actuated independently from the coffee brewing apparatus.

2. The coffee beverage system according to claim 1, wherein the bottom portion has a conical shape such that the bottom portion extends downwardly in a direction extending perpendicular to and away from the first vertical axis.

3. The coffee beverage system according to claim 2, wherein the bottom part with the conical shape lies in the direction of the first vertical axis, wherein the conical part rotates around the first vertical axis upon driving the grinder.

4. The coffee beverage system according to claim 3, wherein the grinder comprises the bottom portion, a lower grinding disk extending around the bottom portion and an upper grinding disk extending above the lower grinding disk.

5. The coffee beverage system according to claim 4, wherein the grinder is rotationally driven by a second motor, resulting in the rotation of the bottom part with the conical shape and the lower grinding disk.

6. The coffee beverage system according to claim 5, wherein upon driving the bottom portion and lower grinding disk the coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

7. The coffee beverage system according to claim 2, wherein the first vertical axis runs centrally through the bottom portion of the metering chamber and in that the bottom portion extends downwardly in a direction extending perpendicular to and away from the first vertical axis all around the first vertical axis or in that the first vertical axis runs centrally through the bottom portion of the second chamber portion and in that the bottom portion extends downwardly in a direction extending perpendicular to and away from the first vertical axis all around the first vertical axis.

8. The coffee beverage system according to claim 1, wherein the metering chamber is divided in a first chamber portion which is part of the first coffee bean packaging cartridge or the second coffee bean packaging cartridge and a second chamber portion which is part of the coffee brewing apparatus wherein the second chamber comprises the bottom portion which forms a part of the grinder, said bottom portion being arranged in the coffee brewing apparatus for rotating around the first vertical axis extending in a vertical direction.

9. The coffee beverage system according to claim 8, wherein the first chamber portion comprises the at least one first coffee bean packaging cartridge exit opening or the at least one second coffee bean packaging cartridge exit opening and the second chamber portion comprises the entrance opening wherein the first chamber portion is located above the second chamber portion wherein the at least one first coffee bean packaging cartridge exit opening or the at least one second coffee bean packaging cartridge exit opening extends above the entrance opening.

10. The coffee beverage system according to claim 8, wherein the first chamber portion is provided with a top wall which limits the volume of the metering chamber in an upwardly vertical direction wherein the bottom portion of the second chamber portion limits the volume of the metering chamber in a downwardly vertical direction.

11. The coffee beverage system according to claim 8, wherein the first chamber portion and the second chamber portion are each provided with at least one upstanding side wall limiting the volume of the metering chamber.

12. The coffee beverage system according to claim 8, wherein the first chamber portion is provided with an upstanding side wall comprising an inlet opening for entering the coffee beans by means of the first coffee bean packaging cartridge transportation means or the second coffee bean packaging cartridge transportation means into the metering chamber.

13. The coffee beverage system according to claim 8, wherein the grinder is positioned centrically with respect to the metering chamber or in that the grinder is positioned centrically with respect to the second chamber portion.

14. The coffee beverage system according to claim 8, wherein the second chamber portion comprises about 100-X % of the volume of the metering chamber and the first chamber portion comprises about X % of the volume of the metering chamber wherein X is in the range of 2-50%.

15. The coffee beverage system according to claim 14, wherein X is in the range of 5-40%.

16. The coffee beverage system according to claim 15, wherein X is in the range of 15-30%.

17. The coffee beverage system according to claim 1, wherein the coffee beverage system is arranged such that after having received the coffee beans the metering chamber will hold a portion of the coffee beans or in that the metering chamber is arranged for receiving a portion of coffee beans corresponding to a dosed amount of the coffee beans.

18. The coffee beverage system according to claim 1, wherein the first coffee bean packaging cartridge transportation means or the second coffee bean packaging cartridge transportation means comprise a part which is movable relative to the metering chamber for transporting the coffee beans towards and into the metering chamber upon driving of the first coffee bean packaging cartridge transportation means or the second coffee bean packaging cartridge transportation means.

19. The coffee beverage system according to claim 18, wherein the coffee brewing apparatus is provided with a first motor and a vertically extending drive shaft wherein the vertically extending drive shaft is releasable connected with the first coffee bean packaging cartridge transportation means of the first coffee bean packaging cartridge for driving and thereby moving the first coffee bean packaging cartridge transportation means upon rotation of the vertically extending drive shaft by means of the first motor.

20. The coffee beverage system according to claim 19, wherein the coffee brewing apparatus comprises connection means for the removable connection to the first coffee bean packaging cartridge or the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge or the second coffee bean packaging cartridge, and wherein the recess comprises rotatable protruding edges at its center, which are fixed at the vertically extending drive shaft wherein the first coffee bean packaging cartridge transportation means of the first coffee bean packaging cartridge is provided with recesses for receiving the protruding edges such that upon rotation of the vertically extending drive shaft the rotating protruding edges drive the first coffee bean packaging cartridge transportation means.

21. The coffee beverage system according to claim 19, wherein the coffee brewing apparatus is provided with a control device, and wherein the control device is arranged for controlling the first motor and the grinder.

22. The coffee beverage system according to claim 21, wherein the control device is arranged such that, in use, in a first step the first coffee bean packaging cartridge transportation means of the first coffee bean packaging cartridge is driven for filling the metering chamber with the coffee beans and that in a second step which follows after the completion of the first step the grinder is activated for emptying the metering chamber and for grinding the coffee beans which were collected in the metering chamber during the first step.

23. The coffee beverage system according to claim 22, wherein the control device is arranged such that, in use, in the first step the first coffee bean packaging cartridge transportation means of the first coffee bean packaging cartridge is driven longer than is required for filling the metering chamber with the coffee beans or that in the second step the grinder is activated longer than is required for emptying the metering chamber and for grinding all the coffee beans which were collected in the metering chamber during the first step.

24. The coffee beverage system according to claim 23, wherein in the first step the first coffee bean packaging cartridge transportation means of the first coffee bean packaging cartridge is driven longer than is required for completely filling the metering chamber with the beans.

25. The coffee beverage system according to claim 21, further comprising a sensor arranged for detecting connection of the first coffee bean packaging cartridge or the second coffee bean packaging cartridge to the coffee brewing apparatus, and wherein the controller is arranged for controlling the first motor and the grinder so that they are actuatable only when connection of the first coffee bean packaging cartridge or the second coffee bean packaging cartridge to the coffee brewing apparatus has been detected.

26. The coffee beverage system according to claim 22, wherein the coffee brewing apparatus is arranged such that the control device controls the brewing device wherein the control device is arranged such that, in use, in a third step which follows after that the second step is completed the brewing device is brewing coffee based on the ground coffee and heated water heated by a heating device of the coffee brewing apparatus.

27. The coffee beverage system according to claim 23, wherein the volume of the metering chamber is such that when it is filled with the coffee beans in the first step an amount of the coffee beans corresponds with one dose of the coffee beans for preparing a cup of coffee.

28. The coffee beverage system according to claim 18, wherein the movable part comprises a bottom and a plurality of vanes which rotate around a second vertical axis upon driving the first coffee bean packaging cartridge transportation means or the second coffee bean packaging cartridge transportation means.

29. The coffee beverage system according to claim 18, wherein the first coffee bean packaging cartridge transportation means or the second coffee bean packaging cartridge transportation means comprise a part which is movable relative to the metering chamber for transporting the coffee beans towards and into the metering chamber upon driving of said first coffee bean packaging cartridge transportation means or the second coffee bean packaging cartridge transportation means, and wherein the first coffee bean packaging cartridge transportation means or the second coffee bean packaging cartridge transportation means comprise a funnel of the first coffee bean packaging cartridge container or the second coffee bean packaging cartridge container and the part which is movable relative to the metering chamber.

30. The coffee beverage system according to claim 1, wherein the first coffee bean packaging cartridge transportation means or the second coffee bean packaging cartridge transportation means comprise a downwardly extending bottom wall for transporting the coffee beans towards the metering chamber under the influence of gravity.

31. The coffee beverage system according to claim 1, wherein the first coffee bean packaging cartridge transportation means or the second coffee bean packaging cartridge transportation means comprise a downwardly extending bottom wall for transporting the coffee beans towards the metering chamber under the influence of gravity only.

32. The coffee beverage system according to claim 1, wherein the first coffee bean packaging cartridge transportation means or the second coffee bean packaging cartridge transportation means are arranged for transporting the coffee beans at least in a horizontal direction for transporting the coffee beans into the metering chamber.

33. The coffee beverage system according to claim 32, wherein the first chamber portion is provided with an upstanding side wall comprising an inlet opening for entering the coffee beans by means of the first coffee bean packaging cartridge transportation means or the second coffee bean packaging cartridge transportation means into the metering chamber, and wherein the first coffee bean packaging cartridge transportation means or the second coffee bean packaging cartridge transportation means are arranged for transporting the coffee beans at least in a horizontal direction towards the inlet opening of the metering chamber.

34. The coffee beverage system according to claim 33, wherein the first coffee bean packaging cartridge transportation means or the second coffee bean packaging cartridge transportation means comprise a part which is movable relative to the metering chamber for transporting the coffee beans towards and into the metering chamber upon driving of said first coffee bean packaging cartridge transportation means or the second coffee bean packaging cartridge transportation means, and wherein the movable part of the first coffee bean packaging cartridge transportation means or the second coffee bean packaging cartridge transportation means is arranged for transporting the coffee beans at least in a horizontal direction.

35. The coffee beverage system according to claim 33, wherein the first coffee bean packaging cartridge or the second coffee bean packaging cartridge is filled with one dose of coffee beans.

36. The coffee beverage system according to claim 1, wherein the first coffee bean packaging cartridge or the second coffee bean packaging cartridge comprises first coffee bean packaging cartridge closing means or second coffee bean packaging cartridge closing means for closing the first coffee bean packaging cartridge coffee bean outlet or the second coffee bean packaging cartridge coffee bean outlet when the first coffee bean packaging cartridge or the second coffee bean packaging cartridge is not connected to the coffee brewing apparatus.

37. The coffee beverage system according to claim 36, wherein the first coffee bean packaging cartridge closing means or second coffee bean packaging cartridge closing means are configured for opening the first coffee bean packaging cartridge coffee bean outlet or the second coffee bean packaging cartridge coffee bean outlet when the first coffee bean packaging cartridge or the second coffee bean packaging cartridge is connected to the coffee brewing apparatus.

38. The coffee beverage system according to claim 37, wherein in order to connect the first coffee bean packaging cartridge or the second coffee bean packaging cartridge to the coffee brewing apparatus the opening of the rotatable closing disk is brought in a position aligned with the first coffee bean packaging cartridge coffee bean outlet or the second coffee bean packaging cartridge coffee bean outlet.

39. The coffee beverage system according to claim 38, wherein the closure member comprises a pair of fletching arms and the closure disk comprises a detent, which in the closed position is caught behind the fletching arms.

40. The coffee beverage system according to claim 36, wherein the first coffee bean packaging cartridge closing means or second coffee bean packaging cartridge closing means comprises a closure member at the bottom side of the first coffee bean packaging cartridge container or the second coffee bean packaging cartridge container comprising the first coffee bean packaging cartridge coffee bean outlet or the second coffee bean packaging cartridge coffee bean outlet and a rotatable closing disk having an opening.

41. The coffee beverage system according claim 1, wherein the metering chamber is divided in a first chamber portion which is part of the first coffee bean packaging cartridge or the second coffee bean packaging cartridge and a second chamber portion which is part of the coffee brewing apparatus wherein the second chamber comprises the bottom portion which forms a part of the grinder, said bottom portion being arranged in the coffee brewing apparatus for rotating around the first vertical axis extending in a vertical direction wherein the at least one first coffee bean packaging cartridge exit opening or the at least one second coffee bean packaging cartridge exit opening is associated with a removable sealing element sealing the first coffee bean packaging cartridge interior volume or the second coffee bean packaging cartridge interior volume prior to activation of the first coffee bean packaging cartridge or the second coffee bean packaging cartridge wherein said sealing element prevents gasses to escape from the first coffee bean packaging cartridge or the second coffee bean packaging cartridge.

42. The coffee beverage system according to claim 41, further including means for disrupting and displacing the sealing element.

43. The coffee beverage system according to claim 42, wherein the means for disrupting and displacing is a pull tab.

44. The coffee beverage system according to claim 41, wherein the sealing element is a sealing membrane.

45. The coffee beverage system according to claim 1, wherein the grinder is a no contamination grinder, comprising an exit location for ground coffee out into a ground coffee chute, which is a funnel pointing downwards into the brewing device of the coffee brewing apparatus.

46. The coffee beverage system according to claim 1, wherein the coffee brewing apparatus comprises connection means for the removable connection to the first coffee bean packaging cartridge or the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge or the second coffee bean packaging cartridge.

47. The coffee beverage system according to claim 46, wherein the side wall protrudes from the upper side of the coffee brewing apparatus.

48. The coffee beverage system according to claim 47, wherein the coffee brewing apparatus comprises a housing surrounding the protruding side wall.

49. The coffee beverage system according to claim 46, wherein the side wall comprises openings for receiving bayonet elements of the first coffee bean packaging cartridge or the second coffee bean packaging cartridge.

50. The coffee beverage system according to claim 49, wherein the first coffee bean packaging cartridge or the second coffee bean packaging cartridge comprises the bayonet elements.

51. The coffee beverage system according to claim 50, further comprising a sensor arranged for detecting connection of the first coffee bean packaging cartridge or the second coffee bean packaging cartridge to the coffee brewing apparatus, wherein the sensor is a switch, wherein the first coffee bean packaging cartridge or the second coffee bean packaging cartridge comprises a protruding part for activating the switch when the first coffee bean packaging cartridge or the second coffee bean packaging cartridge is connected to the coffee brewing apparatus, and wherein the protruding part is located below or above one of the bayonet elements.

52. The coffee beverage system according to claim 49, wherein the first coffee bean packaging cartridge or the second coffee bean packaging cartridge should be inserted into the recess such that the bayonet elements are inserted in the openings and then rotated in order to be connected to the coffee brewing apparatus, wherein the side wall comprises blocking elements for impeding a further rotation of the first coffee bean packaging cartridge or the second coffee bean packaging cartridge, when the first coffee bean packaging cartridge or the second coffee bean packaging cartridge has reached its final position.

53. The coffee beverage system according to claim 52, wherein the first coffee bean packaging cartridge or the second coffee bean packaging cartridge should be rotated approximately 50 degrees in order to reach its final position.

54. The coffee beverage system according to claim 52, further comprising a sensor arranged for detecting connection of the first coffee bean packaging cartridge or the second coffee bean packaging cartridge to the coffee brewing apparatus, wherein the sensor is a switch, wherein the first coffee bean packaging cartridge or the second coffee bean packaging cartridge comprises a protruding part for activating the switch when the first coffee bean packaging cartridge or the second coffee bean packaging cartridge is connected to the coffee brewing apparatus, and wherein the protruding part activates the switch when the first coffee bean packaging cartridge or the second coffee bean packaging cartridge reaches its final position.

55. The coffee beverage system according to claim 52, further comprising an insert piece that is removable connectable to the coffee brewing apparatus in lieu of the first coffee bean packaging cartridge or the second coffee bean packaging cartridge, wherein the sensor is a switch, and wherein the insert piece comprises a protruding part for activating the switch when it is connected to the coffee brewing apparatus, and wherein the protruding part activates the switch when the insert piece reaches its final position.

56. The coffee beverage system according to claim 55, wherein the insert piece comprises an insert piece cavity having an insert piece interior volume and at least one insert piece exit opening defining an insert piece coffee bean outlet, the insert piece interior volume being arranged for receiving the coffee beans, the insert piece further comprising insert piece closing means for closing the insert piece coffee bean outlet when the insert piece is not connected to the coffee brewing apparatus or not connected to the coffee brewing apparatus in its final position.

57. The coffee beverage system according to claim 56, wherein the insert piece closing means are configured for opening the insert piece coffee bean outlet when the insert piece is connected to the coffee brewing apparatus in its final position.

58. The coffee beverage system according to claim 56, wherein the insert piece closing means comprises an insert piece closure member at the bottom side of the insert piece cavity comprising the insert piece coffee bean outlet and in that the insert piece closing means furthermore comprises a rotatable insert piece closing disk having an opening.

59. The coffee beverage system according to claim 58, wherein when the insert piece is connected to the coffee brewing apparatus in its final position, the opening of the rotatable insert piece closing disk is in a position aligned with the insert piece coffee bean outlet.

60. The coffee beverage system according to claim 49, further comprising a sensor arranged for detecting connection of the first coffee bean packaging cartridge or the second coffee bean packaging cartridge to the coffee brewing apparatus, wherein the sensor is a switch, wherein the first coffee bean packaging cartridge or the second coffee bean packaging cartridge comprises a protruding part for activating the switch when the first coffee bean packaging cartridge or the second coffee bean packaging cartridge is connected to the coffee brewing apparatus, and wherein the switch is located in an opening in the sidewall surrounding the recess at the upper side of the coffee brewing apparatus, the protruding part activating the switch through the opening.

61. The coffee beverage system according to claim 60, wherein the switch is hidden behind horizontal wall segments in the side wall and in that the opening is a slit between the horizontal wall segments, the protruding part fitting in the slit.

62. The coffee beverage system according to claim 1, wherein the coffee brewing apparatus is provided with a control device.

63. The coffee beverage system according to claim 1, further comprising a sensor arranged for detecting connection of the first coffee bean packaging cartridge or the second coffee bean packaging cartridge to the coffee brewing apparatus.

64. The coffee beverage system according to claim 63, wherein the coffee brewing apparatus is provided with a control device, and wherein the sensor is configured to signal a result of the detection to the control device.

65. The coffee beverage system according to claim 63, wherein the sensor is a switch.

66. The coffee beverage system according to claim 65, wherein the switch is a micro switch.

67. The coffee beverage system according to claim 65, wherein the first coffee bean packaging cartridge or the second coffee bean packaging cartridge comprises a protruding part for activating the switch when the first coffee bean packaging cartridge or the second coffee bean packaging cartridge is connected to the coffee brewing apparatus.

68. The coffee beverage system according to claim 1, further comprising an insert piece that is removable connectable to the coffee brewing apparatus in lieu of the first coffee bean packaging cartridge or the second coffee bean packaging cartridge.

69. The coffee beverage system according claim 68, wherein the insert piece is connectable to the coffee brewing apparatus in a same or similar way as the first coffee bean packaging cartridge or the second coffee bean packaging cartridge.

70. The coffee beverage system according to claim 69, wherein the insert piece comprises insert piece bayonet elements.

71. The coffee beverage system according to claim 70, further comprising a sensor arranged for detecting connection of the first coffee bean packaging cartridge or the second coffee bean packaging cartridge to the coffee brewing apparatus;
    wherein the sensor is a switch, and wherein the protruding part is located below or above one of the insert piece bayonet elements.

72. The coffee beverage system according to claim 68, further comprising a sensor arranged for detecting connection of the first coffee bean packaging cartridge or the second coffee bean packaging cartridge to the coffee brewing apparatus;
    wherein the sensor is a switch, and wherein the insert piece comprises a protruding part for activating the switch when it is connected to the coffee brewing apparatus.

73. The coffee beverage system according to claim 1, wherein the coffee beverage system is arranged such that upon activation of the grinder the bottom portion is rotating around the first vertical axis for transporting the dose of the coffee beans from the metering chamber into the grinder and for grinding the coffee beans.

74. The coffee beverage system according to claim 73, wherein the one dose of the coffee beans comprises 5-11 grams of the coffee beans.

75. The coffee beverage system according to claim 1, wherein the coffee beverage system is arranged such that, in use, the grinder is activated for emptying the metering chamber and for grinding the coffee beans collected in the metering chamber.

76. The coffee beverage system according to claim 75, wherein the coffee beverage system is arranged such that in use the grinder is activated longer than is required for emptying the metering chamber and for grinding all the coffee beans collected in the metering chamber.

77. The coffee beverage system according to claim 75, wherein previous to the emptying of the metering chamber and the grinding of the coffee beans, in a first step the first coffee bean packaging cartridge transportation means of the first coffee bean packaging cartridge is driven for filling the metering chamber with the coffee beans.

78. The coffee beverage system according to claim 77, wherein the first coffee bean packaging cartridge transportation means of the first coffee bean packaging cartridge is driven longer than is required for completely filling the metering chamber with the coffee beans.

79. The coffee beverage system according to claim 1, wherein the first coffee bean cartridge or the second coffee bean packaging cartridge is filled with multiple servings of the coffee beans.

80. The coffee beverage system according to claim 1, wherein the second coffee bean packaging cartridge transportation means of the second coffee packaging cartridge are configured to be actuated manually.

81. The coffee beverage system according to claim 80, wherein the second coffee bean packaging cartridge transportation means of the second coffee bean packaging cartridge include a second coffee bean packaging cartridge transportation means moveable structure that is, at least partly, present in the second coffee bean packaging cartridge interior volume for contacting the coffee beans, and wherein the second coffee bean packaging cartridge transportation means further include manually operable second coffee bean packaging cartridge actuation means that are, at least partly, provided outside of the second coffee bean packaging cartridge interior volume for manually actuating the second coffee bean packaging cartridge transportation means moveable structure.

82. The coffee beverage system according to claim 81, wherein the second coffee bean packaging cartridge transportation means of the second coffee bean packaging cartridge include a second coffee bean packaging cartridge transportation means rotatable element that is at least partly located inside the second coffee bean packaging cartridge interior volume.

83. The coffee beverage system according to claim 82, wherein the manually operable second coffee bean packaging cartridge transportation means actuation means are arranged for rotating the second coffee bean packaging cartridge transportation means rotatable element.

84. The coffee beverage system according to claim 83, wherein the manually operable second coffee bean packaging cartridge transportation means actuation means include a crank handle connected to the second coffee bean packaging cartridge transportation means rotatable element.

85. The coffee beverage system according to claim 82, wherein the second coffee bean packaging cartridge transportation means rotatable element is at least partly formed as a conveyor screw.

86. The coffee beverage system according to claim 85, wherein the second coffee bean packaging cartridge transportation means moveable structure includes a threaded bore through which the conveyor screw is engaged.

87. The coffee beverage system according to claim 82, wherein the second coffee bean packaging cartridge transportation means moveable structure is rigidly connected to the second coffee bean packaging cartridge transportation means rotatable element, and wherein the second coffee bean packaging cartridge transportation means moveable structure is provided with at least one first aperture for letting the coffee beans pass there through, wherein the second coffee bean packaging cartridge is provided with at least one second coffee bean packaging cartridge exit opening that is positioned, in use, above or below the at least one first aperture and that offers entrance to the second coffee bean packaging cartridge coffee outlet, wherein, as a result of rotating the second coffee bean packaging cartridge transportation means rotatable element, the at least one first aperture is aligned with the at least one second coffee bean packaging cartridge exit opening.

88. The coffee beverage system according to claim 87, wherein the at least one second coffee bean packaging cartridge exit opening is formed by the second coffee bean packaging cartridge coffee bean outlet.

89. The coffee beverage system according to claim 81, wherein the second coffee bean packaging cartridge transportation means moveable structure includes a plunger.

90. The coffee beverage system according to claim 81, further provided with a barrier in the second coffee bean packaging cartridge interior volume arranged for hindering passage of the coffee beans towards the second coffee bean packaging cartridge coffee bean outlet.

91. The coffee beverage system according to claim 90, wherein the barrier includes a valve for hindering passage of the coffee beans towards the second coffee bean packaging cartridge coffee bean outlet.

92. The coffee beverage system according to claim 91, wherein the valve includes a flexible element that is deformed when the valve is opened.

93. The coffee beverage system according to claim 90, wherein the barrier includes an internal wall spaced apart from, in use, a top part of the second coffee bean packaging cartridge container, wherein the second coffee bean packaging cartridge transportation means are arranged for moving the coffee beans through a space between the, in use, top part of the second coffee bean packaging cartridge container and the internal wall.

94. The coffee beverage system according to claim 93, wherein the internal wall separates a first part of the second coffee bean packaging cartridge interior volume from a second part of the second coffee bean packaging cartridge interior volume, wherein the second coffee bean packaging cartridge transportation means moveable structure is arranged in the first part of the second coffee bean packaging cartridge interior volume, and wherein the outlet is reachable via the second part of the second coffee bean packaging cartridge interior volume.

95. The coffee beverage system according to claim 81, wherein the second coffee bean packaging cartridge transportation means moveable structure of the second coffee bean packaging cartridge is resiliently attached to the second coffee bean packaging cartridge by means of a resilient member, so that the second coffee bean packaging cartridge transportation means moveable structure is moveable by means of the manually operable second coffee bean packaging cartridge transportation means actuation means repeatably between a first position and a second position while deforming the resilient member.

96. The coffee beverage system according to claim 95, provided in the second coffee bean packaging cartridge interior volume with a passage for the coffee beans towards the second coffee bean packaging cartridge coffee bean outlet, wherein in the second position the passage is at least partly obstructed by the second coffee bean packaging cartridge transportation means moveable structure and in the first position the passage is obstructed less by the second coffee bean packaging cartridge transportation means moveable structure than in the second position or is not obstructed by the second coffee bean packaging cartridge transportation means moveable structure.

97. The coffee beverage system according to claim 96, wherein the first position is located, in use, above or below the second position.

98. The coffee beverage system according to claim 95, provided in the second coffee bean packaging cartridge interior volume with a passage for the coffee beans towards the second coffee bean packaging cartridge coffee bean outlet, wherein in the first position the passage is at least partly obstructed by the second coffee bean packaging cartridge transportation moveable structure and in the second position the passage is obstructed less by the second coffee bean packaging transportation means moveable structure than in the first position or is not obstructed by the second coffee bean packaging cartridge transportation means moveable structure.

99. The coffee beverage system according to claim 81, wherein at least part of the coffee beans is located, in use, above the second coffee bean packaging cartridge transportation means moveable structure of the second coffee bean packaging cartridge.

100. The coffee beverage system according to claim 81, wherein the second coffee bean packaging cartridge is provided with a recess in the second coffee bean packaging cartridge container for receiving the vertically extending drive shaft of the coffee brewing apparatus.

101. The coffee beverage system according to claim 100, wherein the second coffee bean packaging cartridge container is closed in the recess.

102. The coffee beverage system according to claim 100, wherein the recess is dimensioned for preventing mechanical contact between the second coffee bean packaging cartridge and the vertically extending drive shaft.

103. The coffee beverage system according to claim 100, wherein the second coffee bean packaging cartridge transportation means are positioned for preventing, in use, driving of the second coffee bean packaging cartridge transportation means by means of the vertically extending drive shaft of the coffee brewing apparatus.

104. The coffee beverage system according to claim 80, wherein the second coffee bean packaging cartridge comprises a scooper for holding and supplying the coffee beans, the scooper, when connected to the coffee brewing apparatus, being aligned with the entrance opening thereof, the scooper being configured to work also as second coffee bean packaging cartridge transportation means by turning around its axis, thereby emptying the coffee beans into the entrance opening.

105. The coffee beverage system according to claim 104, wherein the second coffee bean packaging cartridge comprises a handle for manually turning the scooper.

106. The coffee beverage system according to claim 80, wherein the second coffee bean packaging cartridge comprises a hopper for holding the coffee beans, the hopper having a hopper outlet, which is aligned with the entrance opening of the coffee brewing apparatus, when the second coffee bean packaging cartridge is connected thereto, wherein the second coffee bean packaging cartridge transportation means comprise a closure plate, which in a first position at least to a large extent closes the hopper outlet, thereby hindering passage of the coffee beans towards the entrance opening and in a second position does not obstruct the hopper outlet and wherein the second coffee bean packaging cartridge transportation means further include manually operable second coffee bean packaging cartridge transportation means actuation means for actuating the closure plate from the first to the second position and vice versa.

107. The coffee beverage system according to claim 106, wherein the closure plate in the second position delimits a first part of an interior volume of the hopper from a second part of the interior volume of the hopper, thereby hindering the passage of the coffee beans from the first part to the second part.

108. The coffee beverage system according to claim 106, wherein the closure plate forms the first part of a virtual cylinder, another part of the cylinder being open, wherein the manually operable second coffee bean packaging cartridge transportation means actuation means are configured for rotating the closure plate to the first and second position, respectively.

109. The coffee beverage system according to claim 1, wherein at least one of the first and second coffee bean packaging cartridges comprises a funnel shaped holder for holding the coffee beans and an funnel shaped holder outlet for releasing the coffee beans from the funnel shaped holder, the funnel shaped holder outlet being positioned at an upper end of the funnel shaped holder and, when the at least one of the first and second coffee bean packaging cartridge is connected to the coffee brewing apparatus being aligned with the entrance opening thereof, wherein the coffee bean packaging cartridge transportation means of the at least one of the first and second coffee bean packaging cartridges are spiral shaped transportation means and, in use, rotatably actuated for driving the coffee beans out of the funnel shaped holder towards the funnel shaped holder outlet.

110. The coffee beverage system according to claim 109, wherein the spiral shaped transportation means are formed by a spiral shaped trajectory for the coffee beans on the inner wall of the funnel shaped holder, obtained by a spiral shaped protruding edge on the inner wall.

111. The coffee beverage system according to claim 110, wherein the spiral shaped transportation means comprise a non-moving block element, impeding the coffee beans to continue rotating on the inner wall, thereby driving the coffee beans to follow the spiral shaped trajectory upwards towards the funnel shaped holder outlet.

112. The coffee beverage system according to claim 1, wherein at least one of the first and second coffee bean packaging cartridges is configured for shaking or vibrating the coffee beans to encourage flow thereof towards the coffee bean packaging cartridge coffee bean outlet of the at least one of the first and second coffee bean packaging cartridges for releasing the coffee beans.

113. The coffee beverage system according to claim 112, wherein the at least one of the first and second coffee bean packaging cartridges comprises a first module, which is a coffee bean package and a second module, which comprises a second module motor, the first module being removably connectable to the coffee brewing apparatus and the second module being removably connectable to the first module, when the first module is connected to the coffee brewing apparatus.

114. The coffee beverage system according to claim 113, wherein the coffee bean packaging cartridge coffee bean outlet of the at least one of the first and second coffee bean packaging cartridges is open when it is connected to the coffee brewing apparatus and closed when it is disconnected, and wherein the second module is connectable to the first module in lieu of the coffee brewing apparatus.

115. The coffee beverage system according to claim 114, wherein the second module is connected in a same or similar way to the first module as the coffee brewing apparatus, resulting in an outlet of the first module being open.

116. The coffee beverage system according to claim 1, wherein the coffee brewing apparatus comprises coffee brewing apparatus closing means which are configured for opening or closing the entrance opening of the coffee brewing apparatus, said coffee brewing apparatus closing means are configured to be controlled by the coffee brewing apparatus or the (dis)connection of the first coffee bean packaging cartridge or the second coffee bean packaging cartridge (from) to the coffee brewing apparatus.

117. A coffee beverage system comprising a coffee brewing apparatus and a second coffee bean packaging cartridge which is removably connectable to the coffee brewing apparatus, the second coffee bean packaging cartridge being filled with coffee beans and being arranged for being filled with and holding and supplying the coffee beans, the second coffee bean packaging cartridge including: a second coffee bean packaging cartridge container comprising a second coffee bean packaging cartridge interior volume and at least one second coffee bean packaging cartridge exit opening defining a second coffee bean packaging cartridge coffee bean outlet, the second coffee bean packaging cartridge interior volume being arranged for holding the coffee beans; second coffee bean packaging cartridge transportation means adapted for enabling transportation of the coffee beans from the second coffee bean packaging cartridge interior volume towards the at least one second coffee bean packaging cartridge exit opening of the second coffee bean packaging cartridge; wherein the coffee brewing apparatus comprises an entrance opening for receiving the coffee beans which are transported with the aid of the second coffee bean packaging cartridge transportation means towards the at least one second coffee bean packaging cartridge exit opening, a grinder for grinding the coffee beans which have entered the coffee brewing apparatus via the entrance opening and a brewing device for brewing coffee on the basis of ground coffee obtained by means of the grinder, wherein the coffee beverage system is further provided with a metering chamber for receiving the coffee beans which are transported with the aid of the second coffee bean packaging cartridge transportation means into the metering chamber, wherein the metering chamber has a volume and comprises a bottom portion which forms a part of the grinder, said bottom portion being arranged in the coffee brewing apparatus for rotating around a first vertical axis extending in a vertical direction wherein the coffee beverage system is arranged such that upon activation of the grinder the bottom portion is rotating around the first vertical axis for transporting the coffee beans from the metering chamber into the grinder and for grinding the coffee beans; wherein the second coffee bean packaging cartridge is adapted to the coffee brewing apparatus so that, when the second coffee bean packaging cartridge is connected to the coffee brewing apparatus, the coffee beans which are transported with the aid of the second coffee bean packaging cartridge transportation means of the second coffee bean packaging cartridge towards the at least one second coffee bean packaging cartridge exit opening of the second coffee bean packaging cartridge is receivable by the coffee brewing apparatus via the entrance opening for preparing coffee, wherein the second coffee bean packaging cartridge transportation means of the second coffee bean packaging cartridge are configured to be actuated independently from the coffee brewing apparatus.

118. A second coffee bean packaging cartridge being filled with coffee beans and being arranged for holding and supplying the coffee beans and including transportation means adapted for enabling transportation of the coffee beans towards a second coffee bean packaging cartridge coffee bean outlet of the second coffee bean packaging cartridge, the second coffee bean packaging cartridge comprising second coffee bean packaging cartridge bayonet elements wherein the second coffee bean packaging cartridge transportation means are configured to be actuated autonomously.

119. The second coffee bean packaging cartridge according to claim 118, wherein the second coffee bean packaging cartridge transportation means are configured to be actuated manually.

120. The second coffee bean packaging cartridge according to claim 118, wherein the second coffee bean packaging cartridge includes a second coffee bean packaging cartridge housing enclosing a second coffee bean packaging cartridge interior volume filled with the coffee beans, and the second coffee bean packaging cartridge coffee bean outlet for releasing the coffee beans from the second coffee bean packaging cartridge interior volume, which is located in the second coffee bean packaging cartridge housing, wherein the second coffee bean packaging cartridge transportation means include a second coffee bean packaging cartridge transportation means moveable structure that is, at least partly, present in the second coffee bean packaging cartridge interior volume for contacting the coffee beans, and wherein second coffee bean packaging cartridge the transportation means further include manually operable second coffee bean packaging cartridge transportation means actuation means that are, at least partly, provided outside of the second coffee bean packaging cartridge interior volume for manually actuating the second coffee bean packaging cartridge transportation means moveable structure.

121. The second coffee bean packaging cartridge according to claim 120, further comprising a scooper for holding and supplying the coffee beans, the scooper being configured to work also as second coffee bean packaging cartridge transportation means by turning around its axis.

122. The second coffee bean packaging cartridge according to claim 121, further comprising a handle for manually turning the scooper.

123. The second coffee bean packaging cartridge according to claim 122, wherein the closure plate forms a first part of a virtual cylinder, another part of the cylinder being open, wherein the manually operable second coffee bean packaging cartridge transportation means actuation means are configured for rotating the closure plate to the first and second position, respectively.

124. The second coffee bean packaging cartridge according to claim 121, further comprising a hopper for holding the coffee beans, the hopper having a hopper outlet, wherein the second coffee bean packaging cartridge transportation means comprise a closure plate, which in a first position at least to a large extent closes the hopper outlet, thereby hindering passage of the coffee beans and in a second position does not obstruct the hopper outlet and wherein the second coffee bean packaging cartridge transportation means further include manually operable second coffee bean packaging cartridge transportation means actuation means for actuating the closure plate from the first to the second position and vice versa.

125. The second coffee bean packaging cartridge according to claim 124, wherein the closure plate in the second position delimits a first part of an interior volume of the hopper from a second part of the interior volume of the hopper, thereby hindering the passage of the coffee beans from the first part to the second part.

126. The second coffee bean packaging cartridge according to claim 120, wherein the second coffee bean packaging cartridge transportation means include a second coffee bean packaging cartridge transportation means rotatable element that is at least partly located inside the second coffee bean packaging cartridge interior volume.

127. The second coffee bean packaging cartridge according to claim 126, wherein the manually operable second coffee bean packaging cartridge transportation means actuation means are arranged for rotating the second bean packaging cartridge transportation means rotatable element.

128. The second coffee bean packaging cartridge according to claim 127, wherein the manually operable second coffee bean packaging cartridge transportation means actuation means include a crank handle connected to the second coffee bean packaging cartridge transportation means rotatable element.

129. The second coffee bean packaging cartridge according to claim 128, wherein the second coffee bean packaging cartridge transportation means rotatable element is at least partly formed as a conveyor screw.

130. The second coffee bean packaging cartridge according to claim 129, wherein the second coffee bean packaging cartridge transportation means moveable structure includes a threaded bore through which the conveyor screw is engaged.

131. The second coffee bean packaging cartridge according to claim 130, wherein the second coffee bean packaging cartridge transportation means moveable structure is rigidly connected to the second coffee bean packaging cartridge transportation means rotatable element, and wherein the second coffee bean packaging cartridge transportation means moveable structure is provided with at least one first aperture for letting the coffee beans pass there through, wherein the second coffee bean packaging cartridge is provided with at least one second coffee bean packaging cartridge exit opening that is positioned, in use, above or below the at least one first aperture and that offers entrance to the second coffee bean packaging cartridge coffee bean outlet, wherein, as a result of rotating the second coffee bean packaging cartridge transportation means rotatable element, the at least one aperture aligned with the at least one second coffee bean packaging cartridge exit opening.

132. The second coffee bean packaging cartridge according to claim 131, wherein the second coffee bean packaging cartridge exit opening is formed by the second coffee bean packaging cartridge coffee bean outlet.

133. The second coffee bean packaging cartridge according to claim 120, wherein the second coffee bean packaging cartridge transportation means moveable structure includes a plunger.

134. The second coffee bean packaging cartridge according to claim 120, further provided with a barrier in the second coffee bean packaging cartridge interior volume arranged for hindering passage of the coffee beans towards the second coffee bean packaging cartridge coffee bean outlet.

135. The second coffee bean packaging cartridge according to claim 134, wherein the barrier includes a valve for hindering passage of the coffee beans towards the second coffee bean packaging cartridge coffee bean outlet.

136. The second coffee bean packaging cartridge according to claim 135, wherein the valve includes a flexible element that is deformed when the valve is opened.

137. The second coffee bean packaging cartridge according to claim 134, wherein the barrier includes an internal wall spaced apart from, in use, a top part of the second coffee bean packaging cartridge housing, wherein the second coffee bean packaging cartridge transportation means are arranged for moving the coffee beans through a space between the, in use, top part of the second coffee bean packaging cartridge housing and the internal wall.

138. The second coffee bean packaging cartridge according to claim 137, wherein the internal wall separates a first part of the second coffee bean packaging cartridge interior volume from a second part of the second coffee bean packaging cartridge interior volume, wherein the second coffee bean packaging cartridge transportation means moveable structure is arranged in the first part of the second coffee bean packaging cartridge interior volume, and wherein the second coffee bean packaging cartridge coffee bean outlet is reachable via the second part of the second coffee bean packaging cartridge interior volume.

139. The second coffee bean packaging cartridge according to claim 120, wherein the second coffee bean packaging cartridge transportation means moveable structure is resiliently attached to the second coffee bean packaging cartridge by means of a resilient member, so that the second coffee bean packaging cartridge transportation means moveable structure is moveable by means of the manually operable second coffee bean packaging cartridge transportation means actuation means repeatably between a first position and a second position while deforming the resilient member.

140. The second coffee bean packaging cartridge according to claim 139, provided in the second coffee bean packaging cartridge interior volume with a passage for the coffee beans towards the second coffee bean packaging cartridge coffee bean outlet, wherein in the second position the passage is at least partly obstructed by the second coffee bean packaging cartridge transportation means moveable structure and in the first position the passage is obstructed less by the second coffee bean packaging cartridge transportation means moveable structure than in the second position or is not obstructed by the second coffee bean packaging cartridge transportation means moveable structure.

141. The second coffee bean packaging cartridge according to claim 140, wherein the first position is located, in use, above or below the second position.

142. The second coffee bean packaging cartridge according to claim 139, provided in the second coffee bean packaging cartridge interior volume with a passage for the coffee beans towards the second coffee bean packaging cartridge coffee bean outlet, wherein in the first position the passage is at least partly obstructed by the second coffee bean packaging cartridge transportation means moveable structure and in the second position the passage is obstructed less by the second coffee bean packaging cartridge transportation means moveable structure than in the first position or is not obstructed by the second coffee bean packaging cartridge transportation means moveable structure.

143. The second coffee bean packaging cartridge according to claim 120, wherein at least part of the coffee beans is located, in use, above the second coffee bean packaging cartridge transportation means moveable structure.

144. The second coffee bean packaging cartridge according to claim 120, wherein the coffee brewing apparatus is provided with a drive member.

145. The second coffee bean packaging cartridge according to claim 144, provided with a second coffee bean packaging cartridge housing recess in the second coffee bean packaging cartridge housing for receiving the drive member of the coffee brewing apparatus.

146. The second coffee bean packaging cartridge according to claim 145, wherein the second coffee bean packaging cartridge housing is closed in the second coffee bean packaging cartridge housing recess.

147. The second coffee bean packaging cartridge according to claim 145 in combination with the coffee brewing apparatus, wherein the drive member of the coffee brewing apparatus is received in the second coffee bean packaging cartridge housing recess, wherein the second coffee bean packaging cartridge housing recess is dimensioned for preventing mechanical contact between the second coffee bean packaging cartridge and the drive member of the coffee brewing apparatus.

148. The second coffee bean packaging cartridge according to claim 144 in combination with the coffee brewing apparatus, wherein the second coffee bean packaging cartridge transportation means are positioned for preventing, in use, driving of the second coffee bean packaging cartridge transportation means by means of the drive member of the coffee brewing apparatus.

149. The second coffee bean packaging cartridge according to claim 120, comprising second coffee bean packaging cartridge actuation means for actuating the second coffee bean packaging cartridge transportation means, the second coffee bean packaging cartridge actuation means comprising a second coffee bean packaging cartridge motor different from any motor of the brewing apparatus.

150. The second coffee bean packaging cartridge according to claim 149, comprising a funnel shaped holder for holding the coffee beans and a funnel shaped holder outlet for releasing the coffee beans from the second coffee bean packaging cartridge interior volume, the funnel shaped holder outlet being positioned at an upper end of the funnel shaped holder and, when the second coffee bean packaging cartridge is connected to the coffee brewing apparatus is aligned with the entrance opening thereof, wherein the second coffee bean packaging cartridge transportation means are spiral shaped transportation means and, in use, rotatably actuated by the second coffee bean packaging cartridge motor for driving the coffee beans out of the funnel shaped holder towards the funnel shaped holder outlet.

151. The second coffee bean packaging cartridge according to claim 150, wherein the spiral shaped transportation means are formed by a spiral shaped trajectory for the coffee beans on the inner side of the funnel shaped holder, obtained by a spiral shaped protruding edge on the inner side.

152. The second coffee bean packaging cartridge to claim 151, wherein the spiral shaped transportation means comprise a non-moving block element, impeding the coffee beans to continue rotating on the inner side, thereby driving the coffee beans to follow the spiral shaped trajectory upwards towards the funnel shaped holder outlet.

153. The second coffee bean packaging cartridge according to claim 118, wherein the second coffee bean packaging cartridge is filled with one dose of the coffee beans.

154. The second coffee bean packaging cartridge according to claim 118, wherein the second coffee bean packaging cartridge is filled with multiple servings of the coffee beans.

155. A first coffee bean packaging cartridge being filled with coffee beans and arranged for holding and supplying the coffee beans, the first coffee bean packaging cartridge including: a first coffee bean packaging cartridge container comprising a first coffee bean packaging cartridge interior volume and at least one first coffee bean packaging cartridge exit opening defining a first coffee bean packaging cartridge coffee bean outlet, the first coffee bean packaging cartridge interior volume holding the coffee beans; first coffee bean packaging cartridge transportation means adapted for enabling transportation of the coffee beans from the first coffee bean packaging cartridge interior volume towards the at least one first coffee bean packaging cartridge exit opening of the first coffee bean packaging cartridge, the first coffee bean packaging cartridge, being configured for shaking or vibrating the coffee beans to encourage flow thereof towards the first coffee back packaging cartridge coffee bean outlet of the first coffee bean packaging cartridge for releasing the coffee beans.

156. The first coffee bean packaging cartridge according to claim 155, comprising a first module, which is a coffee bean package and a second module, which comprises a second module motor, the second module being removably connectable to the first module.

157. The first coffee bean packaging cartridge according to claim 155, wherein the first coffee bean packaging cartridge coffee bean outlet of the first coffee bean packaging cartridge is arranged to be open when it is connected to a coffee brewing apparatus and closed when it is disconnected from the coffee brewing apparatus, and wherein the second module is connectable to the first module.

158. The first coffee bean packaging cartridge according to claim 157, wherein the second module is connectable to the first module, such that an outlet of the first module is open.

159. A coffee beverage system comprising;
a coffee brewing apparatus and a second coffee bean packaging cartridge which is removably connectable to the coffee brewing apparatus, the second coffee bean packaging cartridge being filled with coffee beans and being arranged for being filled with and holding and supplying the coffee beans, the second coffee bean packaging cartridge including: a second coffee bean packaging cartridge container comprising a second coffee bean packaging cartridge interior volume and at least one second coffee bean packaging cartridge exit opening defining a second coffee bean packaging cartridge coffee bean outlet, the second coffee bean packaging cartridge interior volume being arranged for holding the coffee beans; second coffee bean packaging cartridge transportation means adapted for enabling transportation of the coffee beans from the second coffee bean packaging cartridge interior volume towards the at least one second coffee bean packaging cartridge exit opening of the second coffee bean packaging cartridge; wherein the coffee brewing apparatus comprises an entrance opening for receiving the coffee beans which are transported with the aid of the second coffee bean packaging cartridge transportation means towards the at least one second coffee bean packaging cartridge exit opening, a grinder for grinding the coffee beans which have entered the coffee brewing apparatus via the entrance opening and a brewing device for brewing coffee on the basis of ground coffee obtained by means of the grinder, wherein the coffee beverage system is further provided with a metering chamber for receiving the coffee beans which are transported with the aid of the second coffee bean packaging cartridge transportation means into the metering chamber, wherein the metering chamber has a volume and comprises a bottom portion which forms a part of the grinder, said bottom portion being arranged in the coffee brewing apparatus for rotating around a first vertical axis extending in a vertical direction wherein the coffee beverage system is arranged such that upon activation of the grinder the bottom portion is rotating around the first vertical axis for transporting the coffee beans from the metering chamber into the grinder and for grinding the coffee beans; wherein the second coffee bean packaging cartridge is adapted to the coffee brewing apparatus so that, when the second coffee bean packaging cartridge is connected to the coffee brewing apparatus, the coffee beans which are transported with the aid of the second coffee bean packaging cartridge transportation means of the second coffee bean packaging cartridge towards the at least one second coffee bean packaging cartridge exit opening of the second coffee bean packaging cartridge is receivable by the coffee brewing apparatus via the entrance opening for preparing coffee, wherein the second coffee bean packaging cartridge transportation means of the second coffee bean packaging cartridge are configured to be actuated independently from the coffee brewing apparatus,
the second coffee bean packaging cartridge comprising second coffee bean packaging cartridge bayonet elements to be inserted into openings of a side wall, which protrudes from an upper side of the coffee brewing apparatus for connecting the second coffee bean packaging cartridge to the coffee brewing apparatus, wherein the second coffee bean packaging cartridge transportation means are configured to be actuated independently from the coffee brewing apparatus.

160. A coffee bean material packaging cartridge filled with coffee bean material and for holding and supplying coffee bean material, including a housing enclosing an interior volume for holding the coffee bean material, the housing having an outlet for releasing the coffee bean material from the interior volume and for supplying the coffee bean material to a hosting external apparatus, wherein the coffee bean material packaging cartridge further includes conveyor means for transporting the coffee bean material towards the outlet, wherein the conveyor means include a moveable structure that is, at least partly, present in the interior volume for contacting the coffee bean material, and wherein the conveyor means further include manually operable actuation means that are, at least partly, provided outside of the interior volume for manually actuating the moveable structure.

161. The coffee bean material packing cartridge according to claim 160, wherein the conveyor means include a rotatable element that is at least partly located inside the interior volume.

162. The coffee bean material packaging cartridge according to claim 161, wherein the actuation means are arranged for rotating the rotatable element.

163. The coffee bean material packaging cartridge according to claim 162, wherein the actuation means include a crank handle connected to the rotatable element.

164. The coffee bean material packaging cartridge according to claim 161, wherein the rotatable element is at least partly formed as a conveyor screw.

165. The coffee bean material packaging cartridge according to claim 164, wherein the moveable structure includes a threaded bore through which the conveyor screw is engaged.

166. The coffee bean material packaging cartridge according to claim 161, wherein the moveable structure is rigidly connected to the rotatable element, and wherein the moveable structure is provided with at least one first aperture for letting the coffee bean material pass there through, wherein the coffee bean material packaging cartridge is provided with at least one second aperture that is positioned, in use, above or below the at least one first aperture and that offers entrance to the outlet, wherein, as a result of rotating the rotatable element, the at least one aperture is aligned with the at least one second aperture.

167. The coffee bean material packaging cartridge according to claim 166, wherein the second aperture is formed by the outlet.

168. The coffee bean material packaging cartridge according to claim 160, wherein the moveable structure includes a plunger.

169. The coffee bean material packaging cartridge according to claim 160, further provided with a barrier in the interior volume arranged for hindering passage of the coffee bean material towards the outlet.

170. The coffee bean material packaging cartridge according to claim 169, wherein the barrier includes a valve for hindering passage of the coffee bean material towards the outlet.

171. The coffee bean material packaging cartridge according to claim 170, wherein the valve includes a flexible element that is deformed when the valve is opened.

172. The coffee bean material packaging cartridge according to claim 169, wherein the barrier includes an internal wall spaced apart from, in use, a top part of the housing, wherein the conveyor means are arranged for moving the coffee bean material through a space between the, in use, top part of the housing and the internal wall.

173. The coffee bean material packaging cartridge according to claim 172, wherein the internal wall separates a first part of the interior volume from a second part of the interior volume, wherein the moveable structure is arranged in the first part of the interior volume, and wherein the outlet is reachable via the second part of the interior volume.

174. The coffee bean material packaging cartridge according to claim 160, wherein the moveable structure is resiliently attached to the coffee bean material packaging cartridge by means of a resilient member, so that the moveable structure is moveable by means of the actuation means repeatably between a first position and a second position while deforming the resilient member.

175. The coffee bean material packaging cartridge according to claim 174, provided in the interior volume with a passage for the coffee bean material towards the outlet, wherein in the second position the passage is at least partly obstructed by the moveable structure and in the first position the passage is obstructed less by the moveable structure than in the second position or is not obstructed by the moveable structure.

176. The coffee bean material packaging cartridge according to claim 175, wherein the first position is located, in use, above or below the second position.

177. The coffee bean material packaging cartridge according to claim 174, provided in the interior volume with a passage for the coffee bean material towards the outlet, wherein in the first position the passage is at least partly obstructed by the moveable structure and in the second position the passage is obstructed less by the moveable structure than in the first position or is not obstructed by the moveable structure.

178. The coffee bean material packaging cartridge according to claim 160, wherein at least part of the coffee bean material is located, in use, above the moveable structure.

179. The coffee bean material packaging cartridge according to claim 160, wherein the hosting external apparatus is provided with an external drive member.

180. The coffee bean material packaging cartridge according to claim 179, provided with a recess in the housing for receiving the external drive member of the hosting external apparatus.

181. The coffee bean material packaging cartridge according to claim 180, wherein the housing is closed in the recess.

182. The coffee bean material packaging cartridge according to claim 181 in combination with the hosted external apparatus, wherein the external drive member is received in the recess, wherein the recess is dimensioned for preventing mechanical contact between the coffee bean material packaging cartridge and the external drive member.

183. The coffee bean material packaging cartridge according to claim 179 in combination with the hosting external apparatus, wherein the conveyor means are positioned for preventing, in use, driving of the conveyor means by means of the external drive member of the hosting external apparatus.

184. The coffee bean material packaging cartridge according to claim 160, wherein the hosting external apparatus is a grinder for grinding the coffee bean material.

185. A second coffee bean packaging cartridge being filled with coffee beans and arranged for holding and supplying the coffee beans, the second coffee bean packaging cartridge including: a second coffee bean packaging cartridge container comprising a second coffee bean packaging cartridge interior volume and at least one second coffee bean packaging cartridge exit opening defining a second coffee bean packaging cartridge coffee bean outlet, the second coffee bean packaging cartridge interior volume holding the coffee beans; second coffee bean packaging cartridge transportation means adapted for enabling transportation of the coffee beans from the second coffee bean packaging cartridge interior volume towards the at least one second coffee bean packaging cartridge exit opening of the second coffee bean packaging cartridge, wherein the second coffee bean packaging cartridge transportation means are configured to be actuated autonomously, and wherein the second coffee bean packaging cartridge is configured for shaking or vibrating the coffee beans to encourage flow thereof towards the second coffee bean packaging cartridge coffee bean outlet of the second coffee bean packaging cartridge for releasing the coffee beans.

186. The second coffee bean packaging cartridge according to claim 185, comprising a first module, which is a coffee bean package and a second module, which comprises a second module motor, the second module being removably connectable to the first module.

187. The coffee bean packaging cartridge according to claim 186, wherein the second coffee bean packaging cartridge coffee bean outlet of the second coffee bean packaging cartridge is open when it is connected to a coffee brewing apparatus and closed when it is disconnected from the coffee brewing apparatus, and wherein the second module is connectable to the first module.

188. The second coffee bean packaging cartridge according to claim 187, wherein the second module is connectable to the first module, such that an outlet of the first module is open.

* * * * *